(12) United States Patent
Kim

(10) Patent No.: US 12,096,019 B2
(45) Date of Patent: *Sep. 17, 2024

(54) IMAGE ENCODING/DECODING METHOD AND APPARATUS

(71) Applicant: B1 INSTITUTE OF IMAGE TECHNOLOGY, INC., Seoul (KR)

(72) Inventor: Ki Baek Kim, Daejeon (KR)

(73) Assignee: B1 INSTITUTE OF IMAGE TECHNOLOGY, INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,620

(22) Filed: Jul. 14, 2023

(65) Prior Publication Data
US 2023/0362401 A1    Nov. 9, 2023

Related U.S. Application Data

(63) Continuation of application No. 17/252,019, filed as application No. PCT/KR2019/007982 on Jul. 1, 2019, now Pat. No. 11,758,175.

(30) Foreign Application Priority Data

Jun. 30, 2018    (KR) .................. 10-2018-0076176
Jul. 24, 2018    (KR) .................. 10-2018-0085681

(51) Int. Cl.
*H04N 19/51*     (2014.01)
*H04N 19/105*    (2014.01)
(Continued)

(52) U.S. Cl.
CPC .......... *H04N 19/51* (2014.11); *H04N 19/105* (2014.11); *H04N 19/159* (2014.11); *H04N 19/176* (2014.11)

(58) Field of Classification Search
CPC .... H04N 19/51; H04N 19/105; H04N 19/159; H04N 19/176
See application file for complete search history.

(56) References Cited

U.S. PATENT DOCUMENTS

2012/0057632 A1*    3/2012    Sato ................. H04N 19/51
                                                 375/E7.125
2013/0003849 A1*    1/2013    Chien ............... H04N 19/52
                                                 375/E7.113
(Continued)

FOREIGN PATENT DOCUMENTS

CN    103299642 A    9/2013
CN    103858428 A    6/2014
(Continued)

OTHER PUBLICATIONS

International Search Report issued on Oct. 16, 2019 in counterpart International Patent Application No. PCT/KR2019/007982 (2 pages in English and 2 pages in Korean).

*Primary Examiner* — Jeremiah C Hallenbeck-Huber
(74) *Attorney, Agent, or Firm* — NSIP Law

(57) ABSTRACT

An image encoding/decoding method and apparatus according to the present invention may determine a motion information encoding mode of a target block, configure a motion information prediction candidate group according to the motion information encoding mode, select one candidate from the motion information prediction candidate group so as to induce the selected candidate as motion information of the target block, and perform inter-prediction on the target block on the basis of the motion information of the target block.

6 Claims, 13 Drawing Sheets

(51) Int. Cl.
*H04N 19/159* (2014.01)
*H04N 19/176* (2014.01)

(56) References Cited

U.S. PATENT DOCUMENTS

| | | | |
|---|---|---|---|
| 2016/0286232 A1* | 9/2016 | Li | H04N 19/52 |
| 2018/0041768 A1* | 2/2018 | Koo | H04N 19/119 |
| 2018/0070102 A1* | 3/2018 | Zhang | H04N 19/196 |
| 2018/0098063 A1* | 4/2018 | Chen | H04N 19/52 |
| 2019/0082191 A1* | 3/2019 | Chuang | H04N 19/52 |
| 2020/0186805 A1* | 6/2020 | Lee | H04N 19/176 |

FOREIGN PATENT DOCUMENTS

| | | |
|---|---|---|
| CN | 107409225 A | 11/2017 |
| KR | 10-2013-0113400 A | 10/2013 |
| KR | 10-2014-0011477 A | 1/2014 |
| KR | 10-2014-0018953 A | 2/2014 |
| KR | 10-2014-0082969 A | 7/2014 |
| KR | 10-2018-0007345 A | 1/2018 |

* cited by examiner

[FIG. 1]
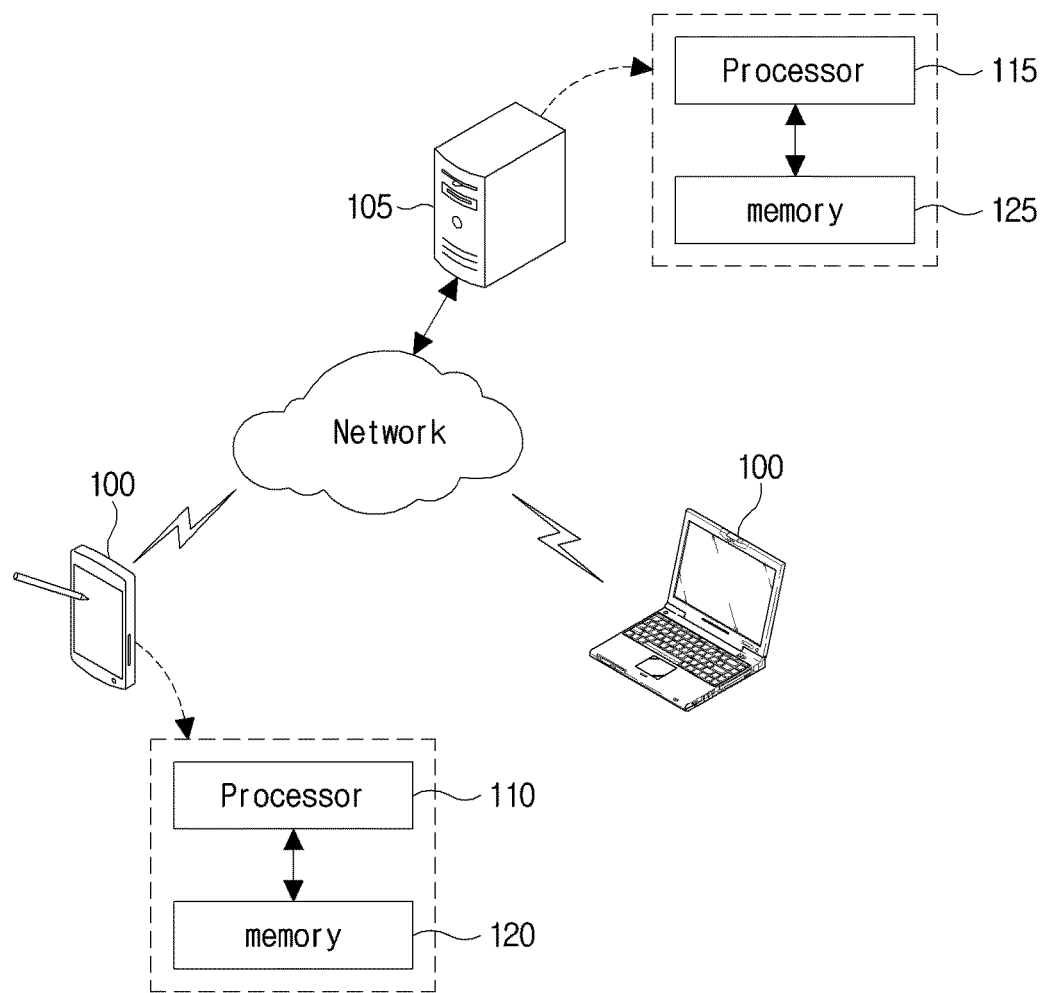

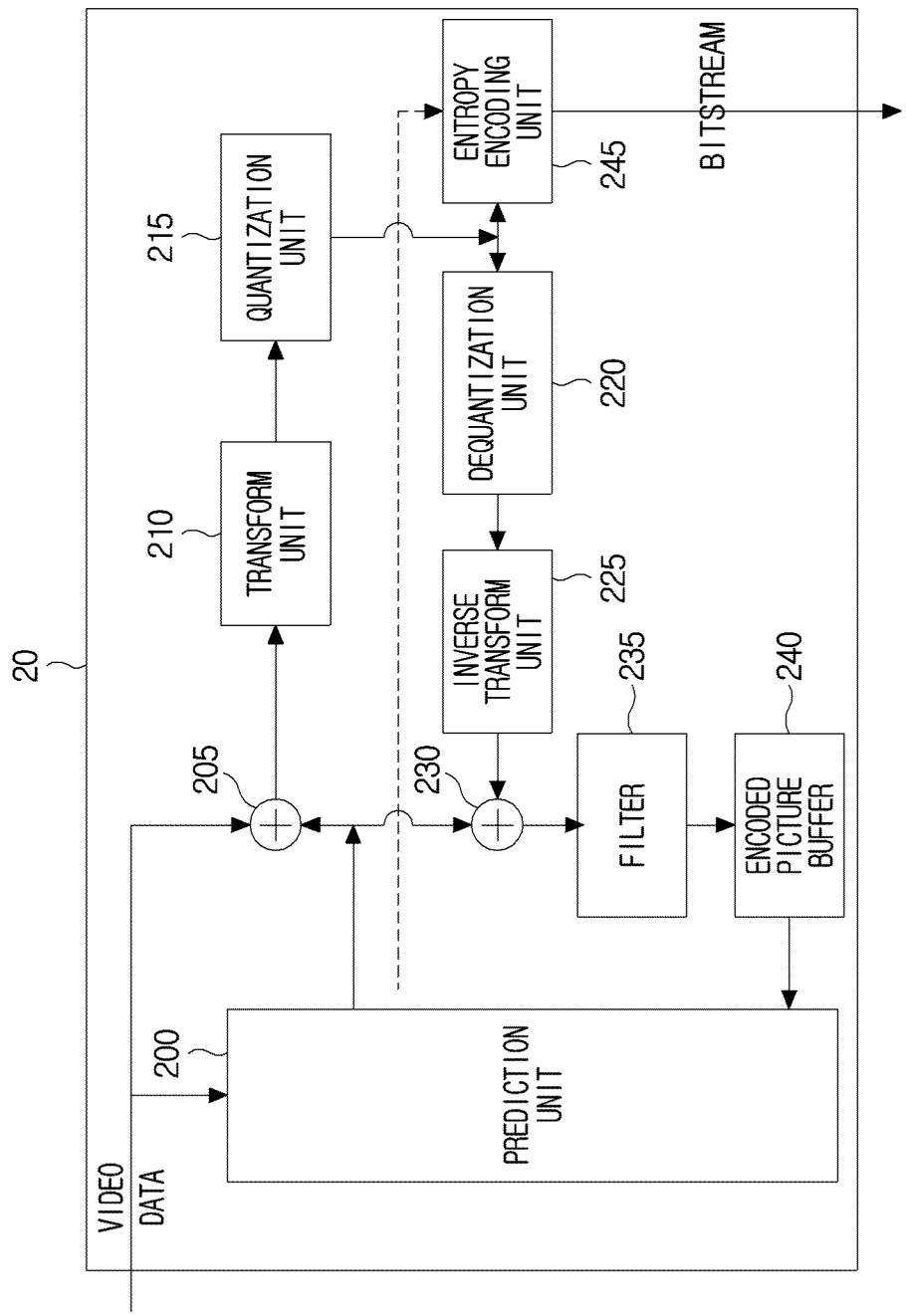
[FIG. 2]

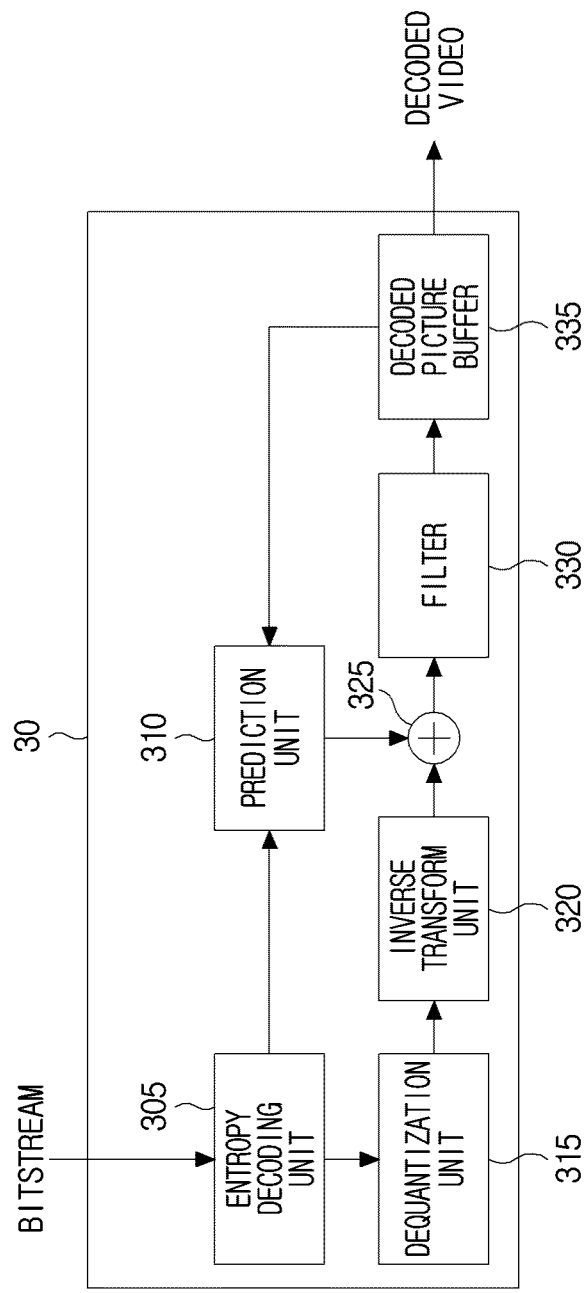
[FIG. 3]

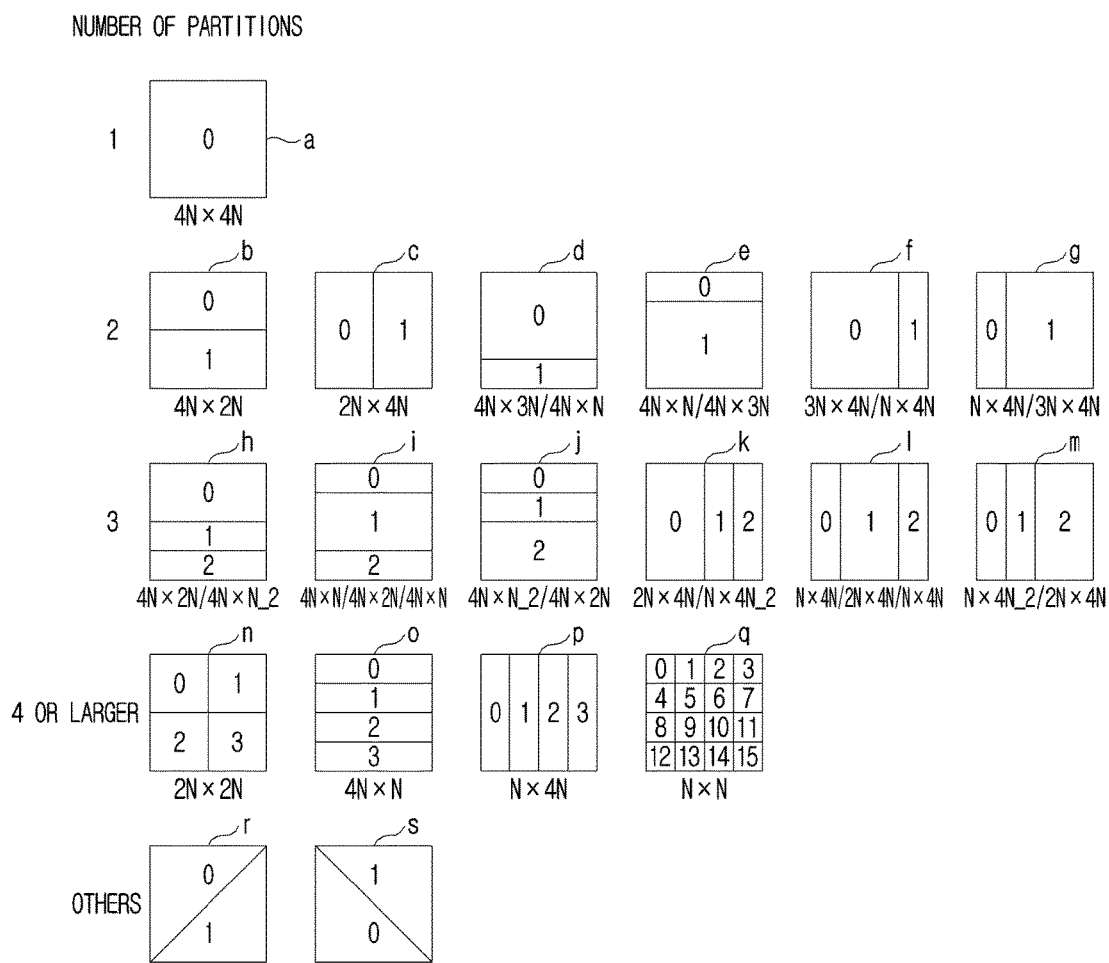
[FIG. 4]

【FIG. 5】
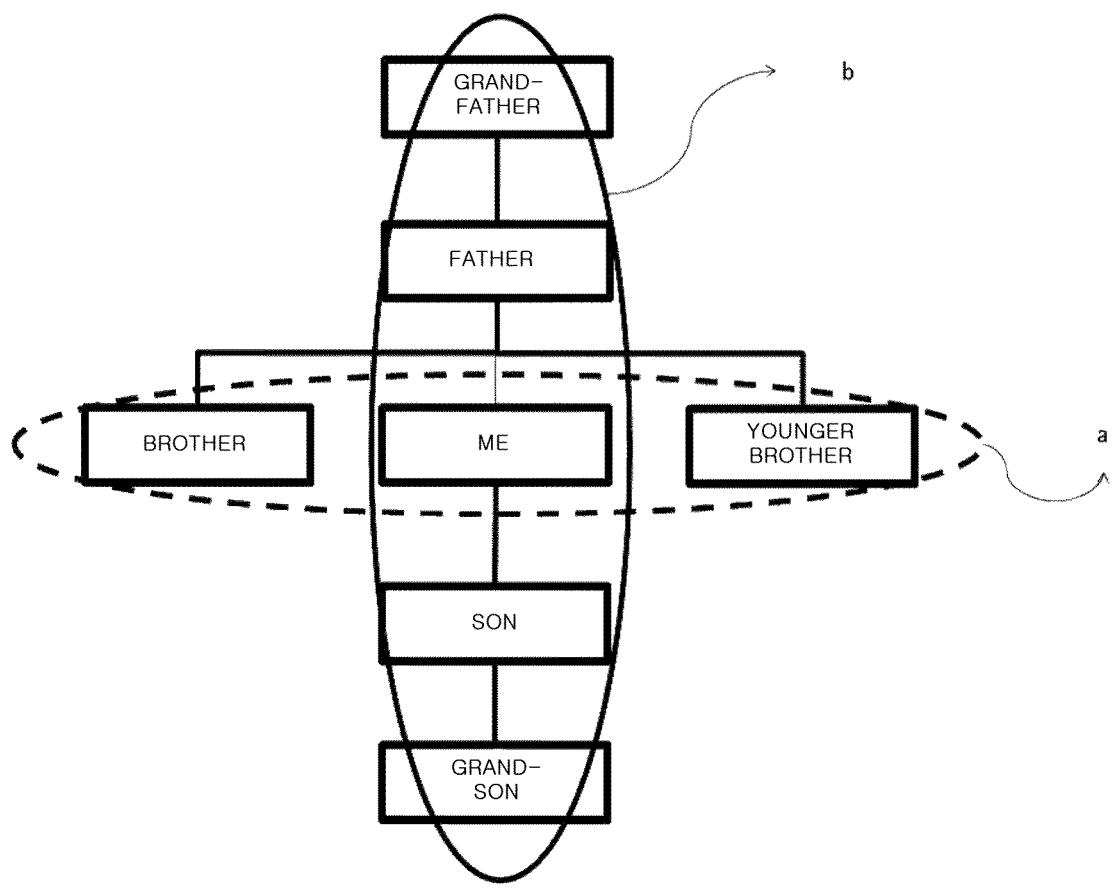

[FIG. 6]
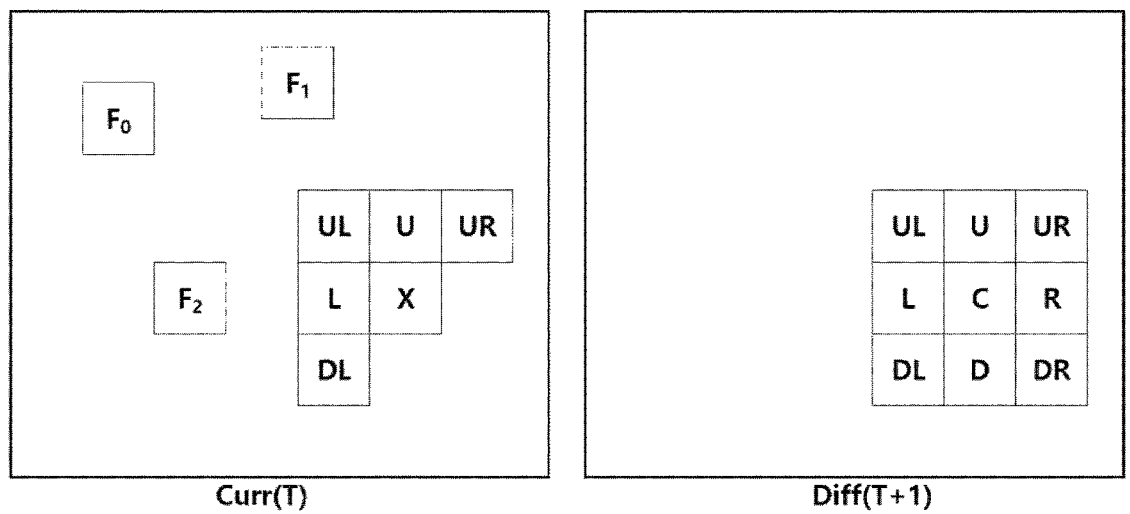
[FIG. 7]
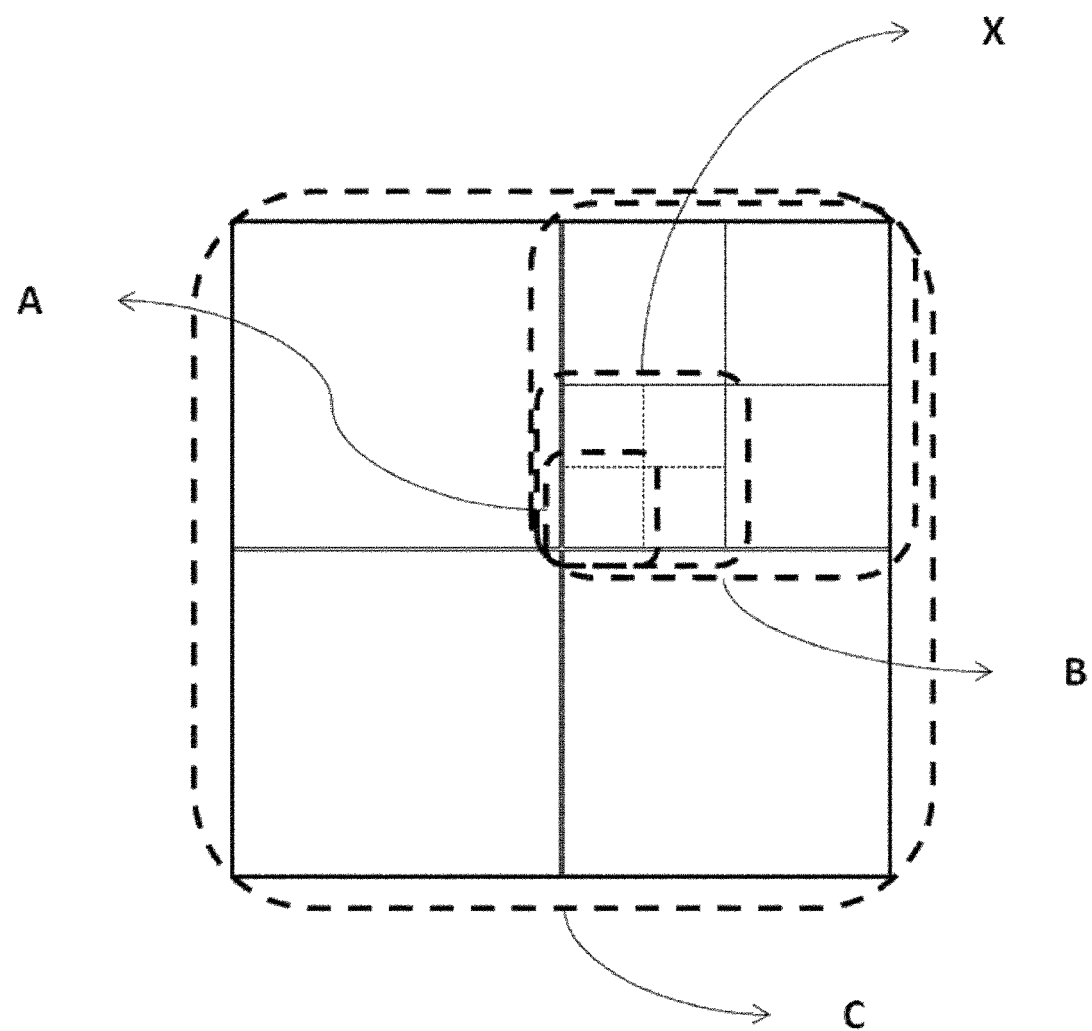

【FIG. 8】
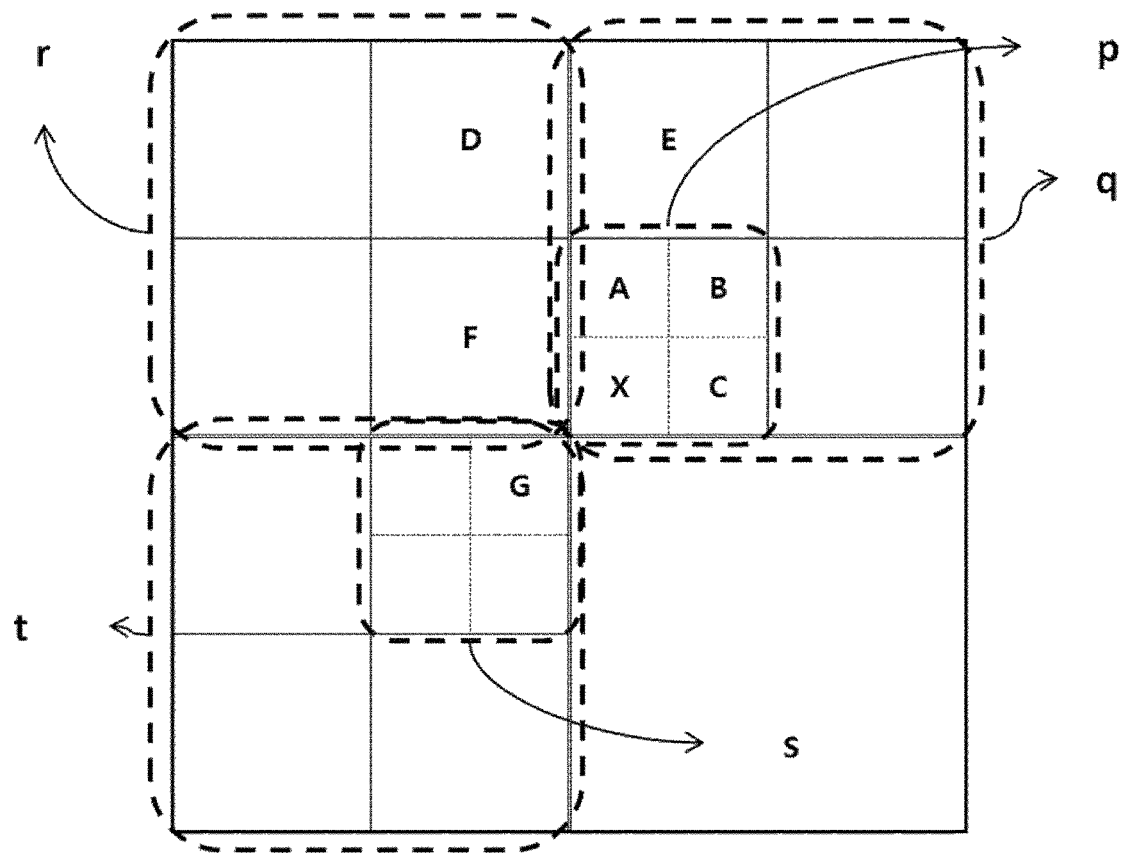

[FIG. 9]
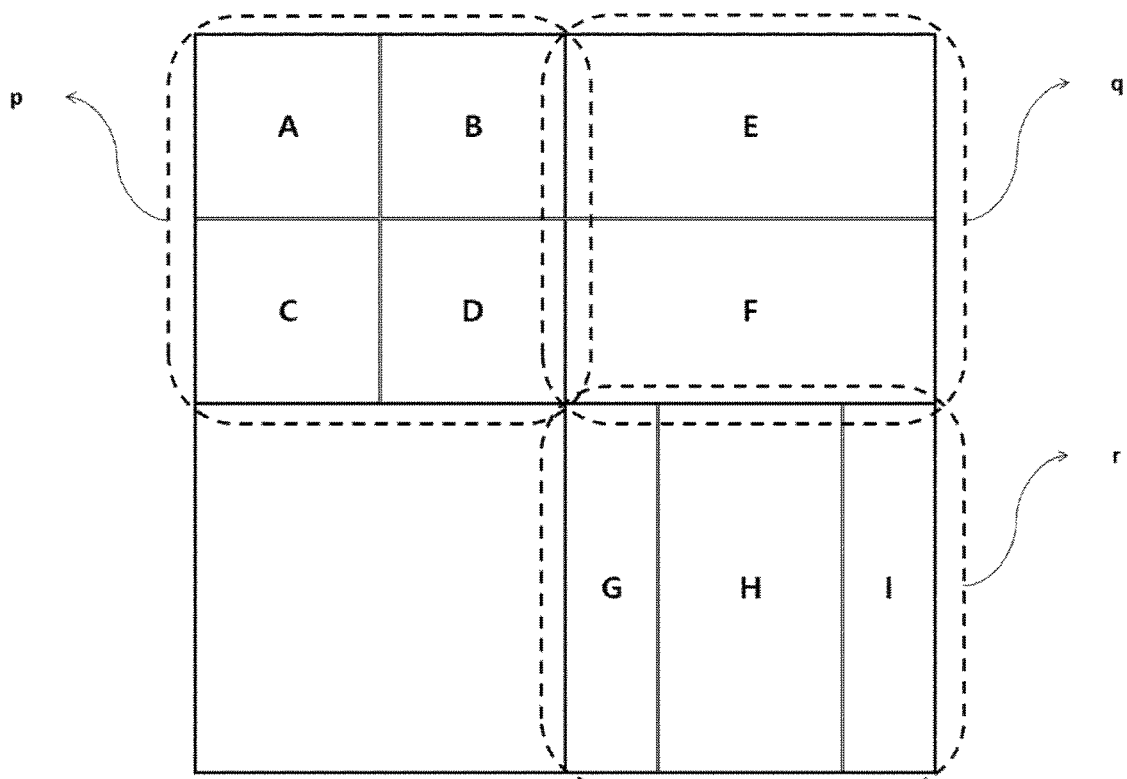

[FIG. 10]
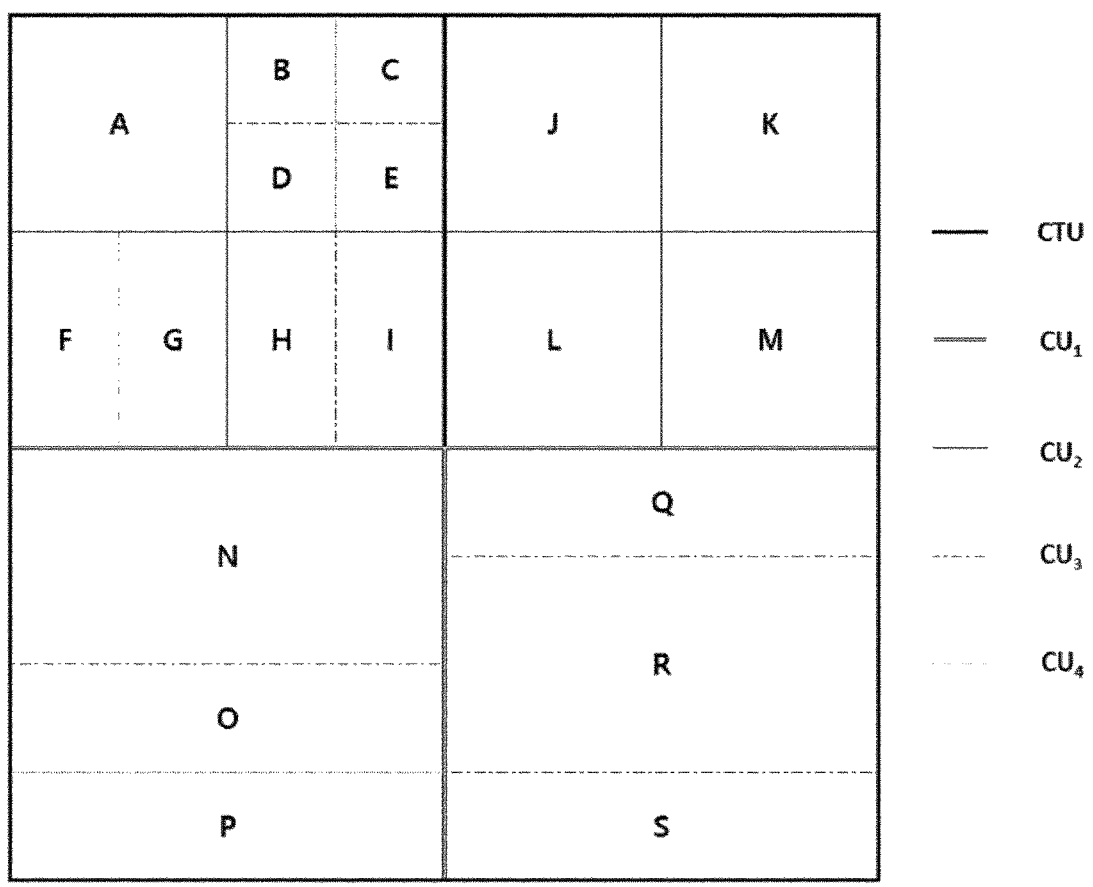

BT/TT/ABT

QT/BT + TT

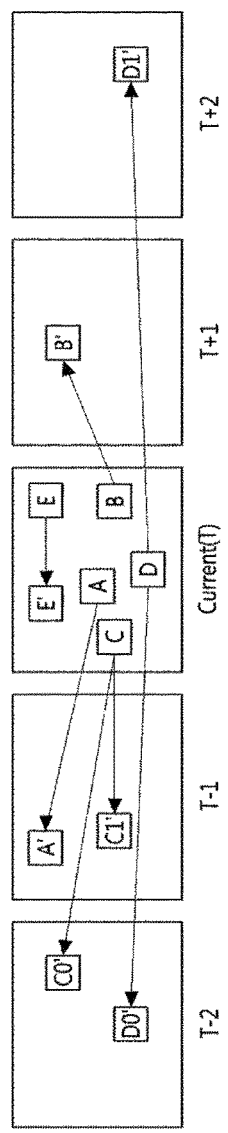
[FIG. 12]

【FIG. 13】
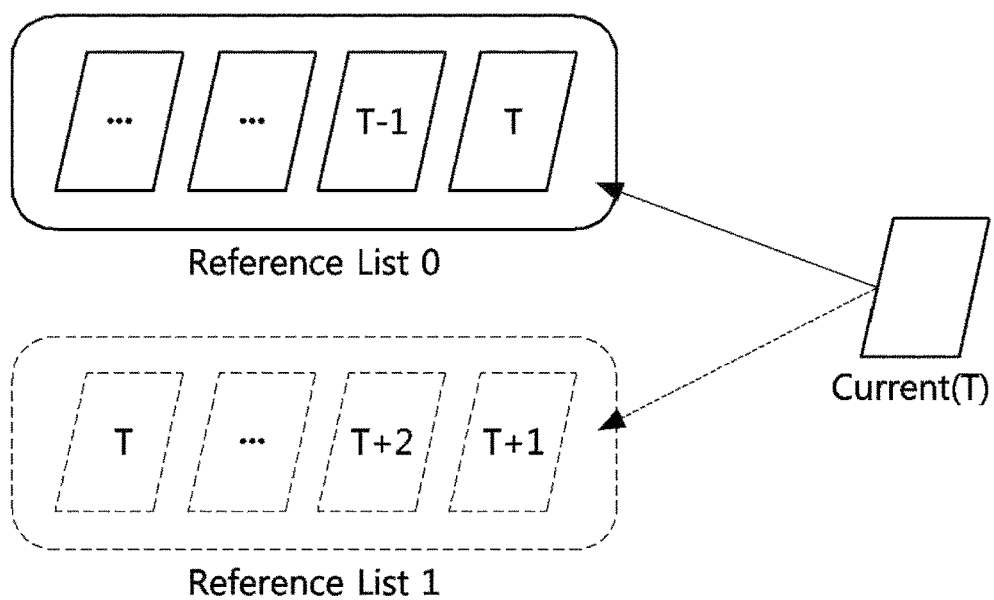
【FIG. 14】
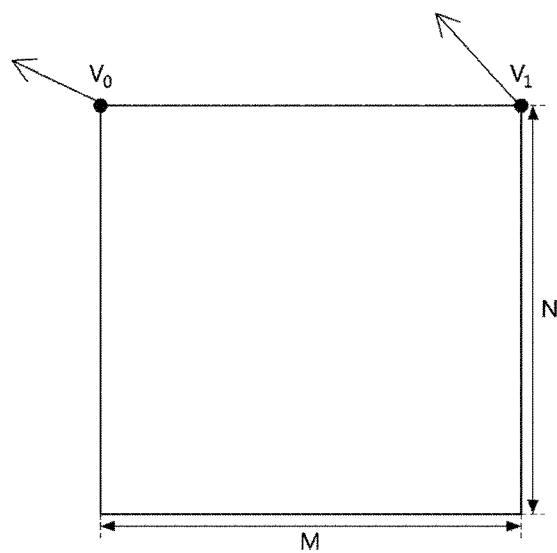

【FIG. 15】
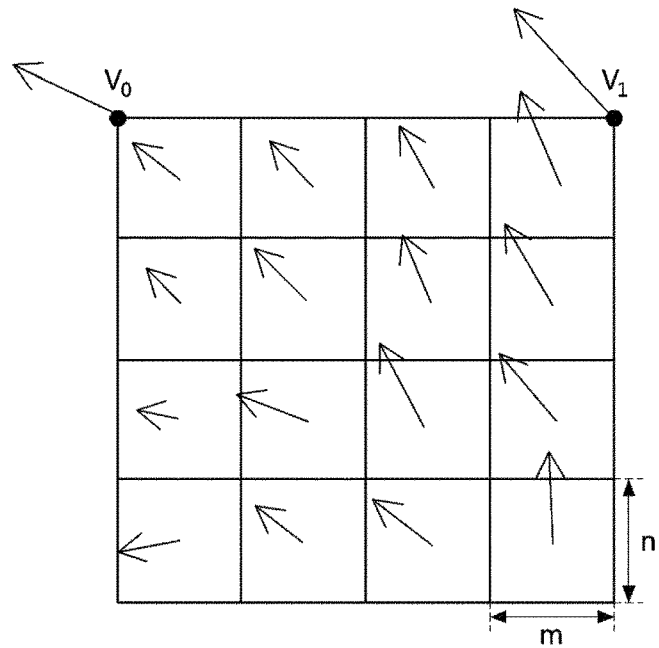
【FIG. 16】
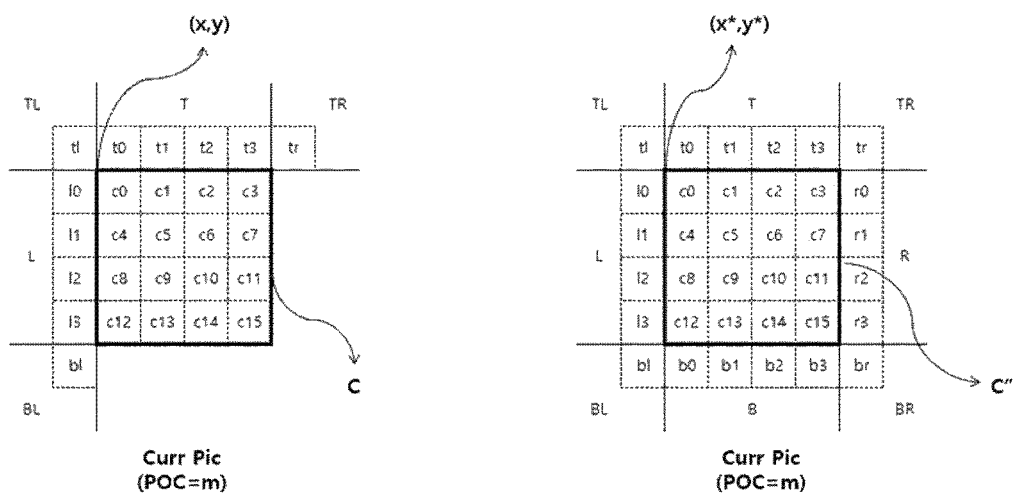

IMAGE ENCODING/DECODING METHOD AND APPARATUS

CROSS REFERENCE TO RELATED APPLICATIONS

This application is a continuation of application Ser. No. 17/252,019 filed on Dec. 14, 2020, which is a U.S. National Stage Application of International Application No. PCT/KR2019/007982, filed on Jul. 1, 2019, which claims the benefit under 35 USC 119(a) and 365(b) of Korean Patent Application No. 10-2018-0076176, filed on Jun. 30, 2018, and Korean Patent Application No. 10-2018-0085681, filed on Jul. 24, 2018, in the Korean Intellectual Property Office, the entire disclosure of which is incorporated herein by reference for all purposes.

TECHNICAL FIELD

The present disclosure relates to an image encoding and decoding technology, and in more detail, to an image encoding/decoding method and device in inter prediction.

BACKGROUND ART

As the Internet and mobile terminals have been supplied and information and communication technologies have been developed, the use of multimedia data has rapidly increased. Accordingly, a need for improving the performance and efficiency of an image processing system has considerably increased to perform a variety of services or works through image prediction in all kinds of systems, but results from research and development which may respond to this atmosphere have been not enough.

As such, in the image encoding and decoding method and device of a traditional technology, it is required to improve performance for image processing, especially for image encoding or image decoding.

DISCLOSURE

Technical Problem

A purpose of the present disclosure is to provide an inter prediction method.

In addition, the present disclosure provides a method and a device of configuring a motion information prediction candidate group for inter prediction.

In addition, the present disclosure provides a method and a device of performing inter prediction according to a motion information encoding mode.

Technical Solution

An image encoding/decoding method and device according to the present disclosure may determine a motion information encoding mode of a target block, configure a motion information prediction candidate group according to the motion information encoding mode, derive motion information of the target block by selecting one candidate of the motion information prediction candidate group and perform inter prediction of the target block based on motion information of the target block.

Advantageous Effects

When the inter prediction according to the present disclosure is used, encoding performance may be improved because a motion information prediction candidate group may be effectively configured to derive the reduction of a bit representing motion information of a target block.

DESCRIPTION OF DRAWINGS

FIG. 1 is a conceptual diagram on an image encoding and decoding system according to an embodiment of the present disclosure.

FIG. 2 is a component block diagram on an image encoding device according to an embodiment of the present disclosure.

FIG. 3 is a component block diagram on an image decoding device according to an embodiment of the present disclosure.

FIG. 4 is an exemplary diagram showing various partition shapes which may be obtained in a block partition unit of the present disclosure.

FIG. 5 is an example of a family tree for describing a genetic trait of a member in one family and characters in a blood relationship.

FIG. 6 is an example on various arrangements of a relative block in a horizontal relationship with a target block.

FIG. 7 is an example on various arrangements of a relative block in a vertical relationship with a target block.

FIG. 8 is an example on various arrangements of a relative block in a vertical relationship and a horizontal relationship with a target block.

FIG. 9 is an exemplary diagram on block partition which is obtained according to a tree type. In this case, p to r represent an example on block partition of QT, BT, TT.

FIG. 10 is an exemplary diagram on block partition which is obtained by QT, BT, TT.

FIG. 12 is an exemplary diagram showing a variety of cases in which a prediction block is obtained by inter prediction.

FIG. 13 is an exemplary diagram configuring a reference picture list according to an embodiment of the present disclosure.

FIG. 14 is a conceptual diagram showing a non-translation motion model according to an embodiment of the present disclosure.

FIG. 15 is an exemplary diagram showing motion prediction in a unit of a sub-block according to an embodiment of the present disclosure.

FIG. 16 is an exemplary diagram on an arrangement of a block which is spatially or temporally adjacent to a base block according to an embodiment of the present disclosure.

BEST MODE

Figure 11A:
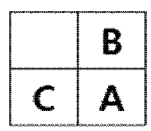
FIG. 11 is an exemplary drawing for confirming a correlation between blocks based on a partition method and a partition setting.

An image encoding/decoding method and device according to the present disclosure may determine a motion information encoding mode of a target block, configure a motion information prediction candidate group according to the motion information encoding mode, derive motion information of the target block by selecting one candidate of the motion information prediction candidate group and perform inter prediction of the target block based on motion information of the target block.

MODE FOR INVENTION

The present invention may be changed and modified variously and be illustrated with reference to different exemplary embodiments, some of which will be described and shown in the drawings. However, these embodiments are not intended for limiting the invention but are construed as including includes all modifications, equivalents and replacements which belong to the spirit and technical scope of the invention. Like reference numerals in the drawings refer to like elements throughout.

Although the terms first, second, etc. may be used to describe various elements, these elements should not be limited by these terms. These terms are used only to distinguish one element from another element. For example, a first element could be termed a second element and a second element could be termed a first element likewise without departing from the teachings of the present invention. The term "and/or" includes any and all combinations of a plurality of associated listed items.

It will be understood that when an element is referred to as being "connected to" or "coupled to" another element, the element can be directly connected or coupled to another element or intervening elements. On the contrary, when an element is referred to as being "directly connected to" or "directly coupled to" another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein including technical or scientific terms mean the same as generally understood by those with ordinary skills in the art to which the present disclosure pertains. The terms which are generally used and are defined in a dictionary should be interpreted as having the same contextual meaning as a related technology and unless clearly defined in the present disclosure, they are not interpreted as being ideal or excessively formal.

Generally, one or more color spaces may be configured according to a color format of an image. One or more pictures with a certain size or, one or more pictures with a different size may be configured according to the color format. In an example, in a YCbCr color configuration, a color format such as 4:4:4, 4:2:2, 4:2:0, Monochrome (configured with only Y), etc. may be supported. In an example, for YCbCr 4:2:0, 1 luma component (in this example, Y) and 2 chroma components (in this example, Cb/Cr) may be configured and in this case, a configuration ratio of a chroma component and a luma component may be an aspect ratio of 1:2. In an example, for 4:4:4, it may have the same aspect ratio. When it is configured with one or more color spaces as in the above example, a picture may perform partition into each color space.

As an image may be classified into I, P, B, etc. according to an image type (e.g., a picture type, a slice type, a tile group type, a tile type, a brick type, etc.), an image type I may mean an image which is self-encoded without using a reference picture, an image type P may mean an image which is encoded by using a reference picture, but allows only forward prediction and an image type B may mean an image which is encoded by using a reference picture and allows a forward/backward prediction, but a part of the above types may be combined according to a coding setting (combining P and B) or an image type in other configuration may be supported.

A variety of encoded/decoded information generated in the present disclosure may be explicitly or implicitly processed. In this connection, it may be understood that an explicit processing may generate selection information indicating one candidate of a plurality of candidate groups on encoded information in a sequence, a slice, a tile group, a tile, a brick, a block, a sub-block, etc. to store it in a bitstream and parses related information in the same unit as an encoder in a decoder to reconstruct it into decoded information. In this case, it may be understood that an implicit processing processes encoded/decoded information in the same process, rule, etc. in an encoder and a decoder.

FIG. 1 is a conceptual diagram on an image encoding and decoding system according to an embodiment of the present disclosure.

In reference to FIG. 1, an image encoding device 105 and decoding device 100 may be a user terminal such as a personal computer (PC), a notebook, a personal digital assistant (PDA), a portable multimedia player (PMP), a PlayStation Portable (PSP), a wireless communication terminal, a smart phone or TV, etc. or a server terminal such as an application server, a service server, etc. and may include various devices equipped with a communication device such as a communication modem, etc. for communicating with various instruments or an wire and wireless communication network, a memory (120, 125) for storing all kinds of programs and data for inter or intra prediction to encode or decode an image or a processor (110, 115) for program operation and control by running it, etc.

In addition, an image encoded in a bitstream by an image encoding device 105 may be transmitted to an image decoding device 100 through a wire and wireless communication network, etc. such as the Internet, a wireless local area network, a wireless Lan network, a wibro network or a mobile radio communication network, etc. or through various communication interfaces such as a cable or an universal serial bus, etc. in real-time or in non-real-time and decoded in an image decoding device 100. And it may be reconstructed into an image and played. In addition, an image encoded in a bitstream by an image encoding device 105 may be transmitted to an image decoding device 100 from an image encoding device 105 through a computer-readable recording medium.

The above-mentioned image encoding device and image decoding device may be separate devices, respectively, but they may be made as one image encoding/decoding device according to an embodiment. In this case, some configurations of an image encoding device may be embodied to include at least the same structure or perform at least the same function as some configurations of an image decoding device as a substantially identical technical element.

Accordingly, in a detailed explanation on the following technical elements and their operating principles, etc., an overlapping explanation on the corresponding technical elements will be omitted. In addition, as an image decoding device corresponds to a computing device which applies an image encoding method performed in an image encoding device to decoding, an image encoding device will be mainly described as follows.

A computing device may include a memory which stores a program or a software module embodying an image encoding method and/or an image decoding method and a processor which is connected to a memory to execute a program. In this case, an image encoding device may be referred to as an encoder and an image decoding device may be referred to as a decoder, respectively.

FIG. 2 is a component block diagram on an image encoding device according to an embodiment of the present disclosure.

In reference to FIG. 2, an image encoding device 20 may include a prediction unit 200, a subtraction unit 205, a transform unit 210, a quantization unit 215, a dequantization unit 220, an inverse transform unit 225, an add unit 230, a filter unit 235, an encoding picture buffer 240 and an entropy encoding unit 245.

A prediction unit 200 may be embodied by using a prediction module, a software module, and may generate a prediction block in an intra prediction method or an inter prediction method for a block which will be encoded. A prediction unit 200 may generate a prediction block by predicting a target block which is currently to be encoded in an image. In other words, a prediction unit 200 may generate a prediction block with the predicted pixel value of each pixel generated by predicting the pixel value of each pixel in a target block which is to be encoded in an image according to intra prediction or inter prediction. In addition, a prediction unit 200 may make an encoding unit encode information on a prediction mode by transmitting information necessary to generate a prediction block like information on a prediction mode such as an intra prediction mode or an inter prediction mode to an encoding unit. In this case, a processing unit in which prediction is performed and a processing unit in which a prediction method and a concrete content are determined may be determined according to an encoding setting. For example, a prediction method, a prediction mode, etc. may be determined in a prediction unit and prediction may be performed in a transform unit.

An intra prediction unit may have a directional prediction mode such as a horizontal mode, a vertical mode, etc. which is used according to a prediction direction and a non-directional prediction mode such as DC, Planar using a method such as average, interpolation, etc. of a reference pixel. An intra prediction mode candidate group may be configured by directional and non-directional modes and one of a variety of candidates such as 35 prediction modes (33 directional prediction modes+2 non-directional prediction modes) or 67 prediction modes (65 directional prediction modes+2 non-directional prediction modes), 131 prediction modes (129 directional prediction modes+2 non-directional prediction modes), etc. may be used as a candidate group.

An intra prediction unit may include a reference pixel construction unit, a reference pixel filter unit, a reference pixel interpolation unit, a prediction mode determination unit, a prediction block generation unit and a prediction mode encoding unit. A reference pixel construction unit may configure a pixel which belongs to a block neighboring a target block and is adjacent to a target block as a reference pixel for intra prediction. According to an encoding setting, one most adjacent reference pixel line may be configured as reference pixels, other one adjacent reference pixel line may be configured as reference pixels, or a plurality of reference pixel lines may be configured as reference pixels. When some of the reference pixels is unavailable, a reference pixel may be generated by using an available reference pixel and when all are unavailable, a reference pixel may be generated by using a preset value (e.g., a central value in a range of a reference value represented by a bit depth, etc.)

A reference pixel filter unit of an intra prediction unit may perform filtering for a reference pixel to reduce residual degradation in an encoding process. In this case, a filter may be a low-pass filter such as a 3-tap filter [¼, ½, ¼], a 5-tap filter [2/16, 3/16, 6/16, 3/16, 2/16], etc. According to encoding information (e.g., a size or a shape of a block, a prediction mode, etc.), whether filtering is applied, a filtering type, etc. may be determined.

A reference pixel interpolation unit of an intra prediction unit may generate a pixel in a decimal unit in a linear interpolation process of a reference pixel according to a prediction mode and an interpolation filter which is applied may be determined according to encoding information. In this case, the interpolation filter may include a 4-tap Cubic filter, a 4-tap Gaussian filter, a 6-tap Wiener filter, a 8-tap Kalman filter, etc. It is general to perform interpolation separately from a process of performing a low-pass filter, but a filtering process may be performed by integrating filters applied to two processes into one.

A prediction mode determination unit of an intra prediction unit may select at least one optimum prediction mode from the prediction mode candidate group by considering encoding expenses. A prediction block generation unit may generate a prediction block by using the corresponding prediction mode. In a prediction mode encoding unit, the optimum prediction mode may be encoded based on a prediction value. In this case, prediction information may be adaptively encoded according to a case in which a prediction value is exact and a case in which a prediction value is not exact.

In an intra prediction unit, the prediction value may be referred to as MPM (Most Probable Mode) and among all modes belonging to a prediction mode candidate group, some of modes may be configured as a MPM candidate group. A MPM candidate group may include a preset prediction mode (e.g., DC, Planar, a vertical, a horizontal, a diagonal mode, etc.) or a prediction mode of a spatially adjacent block (e.g., a left, a top, a top-left, a top-right, a bottom-left block, etc.), etc. In addition, a mode (for a directional mode, a difference by +1, −1, etc.) derived from a mode which is pre-included in a MPM candidate group may be configured as a MPM candidate group.

There may be a priority of a prediction mode for configurating a MPM candidate group. An order to be included in a MPM candidate group may be determined according to the priority. A configuration of the MPM candidate group may be terminated if the number of MPM candidates (determined according to the number of prediction mode candidates) is filled according to the priority. In this case, a priority may be determined in an order of a prediction mode of a spatially adjacent block, a preset prediction mode and a mode derived from a prediction mode pre-included in a MPM candidate group, but other modifications may be also possible.

For example, it may be included in a candidate group in an order of a left-top-bottom left-top right-top left block, etc. among spatially adjacent blocks, it may be included in a candidate group in an order of a DC-Planar-vertical-horizontal mode, etc. among preset prediction modes and a mode obtained by adding +1, −1, etc. to a pre-included mode may be included in a candidate group to configure a total of 6 modes as a candidate group. Alternatively, it may be included in a candidate group in one priority of left-top-DC-Planar-bottom left-top right-top left-(left+1)-(left−1)-(top+1), etc. to configure a total of 7 modes as a candidate group.

The subtraction unit 205 may generate a residual block by subtracting the prediction block from the target block. In other words, the subtraction unit 205 may calculate the difference between the pixel value of each pixel in the target block to be encoded and the predicted pixel value of a corresponding pixel in the prediction block generated by the prediction unit to generate a residual signal in the form of a block, that is, the residual block. Further, the subtraction unit 205 may generate a residual block in a unit other than a block obtained through the later-described block division unit.

The transform unit 210 may transform a spatial signal to a frequency signal. The signal obtained by the transform process is referred to as transform coefficients. For example, the residual block with the residual signal received from the subtraction unit may be transformed to a transform block with transform coefficients, and the input signal is determined according to an encoding setting, not limited to the residual signal.

The transform unit may transform the residual block by, but not limited to, a transform scheme such as Hadamard transform, discrete sine transform (DST)-based transform, or DCT-based transform. These transform schemes may be changed and modified in various manners.

At least one of the transform schemes may be supported, and at least one sub-transform scheme of each transform scheme may be supported. The sub-transform scheme may be obtained by modifying a part of a base vector in the transform scheme.

For example, in the case of DCT, one or more of sub-transform schemes DCT-1 to DCT-8 may be supported, and in the case of DST, one or more of sub-transform schemes DST-1 to DST-8 may be supported. A transform scheme candidate group may be constructed with a part of the sub-transform schemes. For example, DCT-2, DCT-8, and DST-7 may be grouped into a candidate group, for transform.

Transform may be performed in a horizontal/vertical direction. For example, one-dimensional transform may be performed in the horizontal direction by DCT-2, and one-dimensional transform may be performed in the vertical direction by DST-7. With the two-dimensional transform, pixel values may be transformed from the spatial domain to the frequency domain.

One fixed transform scheme may be adopted or a transform scheme may be selected adaptively according to an encoding setting. In the latter case, a transform scheme may be selected explicitly or implicitly. When a transform scheme is selected explicitly, information about a transform scheme or transform scheme set applied in each of the horizontal direction and the vertical direction may be generated, for example, at the block level. When a transform scheme is selected implicitly, an encoding setting may be defined according to an image type (I/P/B), a color component, a block size, a block shape, a block position, an intra-prediction mode, and so on, and a predetermined transform scheme may be selected according to the encoding setting.

Further, some transform may be skipped according to the encoding setting. That is, one or more of the horizontal and vertical units may be omitted explicitly or implicitly.

Further, the transform unit may transmit information required for generating a transform block to the encoding unit so that the encoding unit encodes the information, includes the encoded information in a bitstream, and transmits the bitstream to the decoder. Thus, a decoding unit of the decoder may parse the information from the bitstream, for use in inverse transform.

The quantization unit 215 may quantize an input signal. A signal obtained from the quantization are referred to as quantized coefficients. For example, the quantization unit 215 may obtain a quantized block with quantized coefficients by quantizing the residual block with residual transform coefficients received from the transform unit, and the input signal may be determined according to the encoding setting, not limited to the residual transform coefficients.

The quantization unit may quantize the transformed residual block by, not limited to, a quantization scheme such as dead zone uniform boundary value quantization, a quantization weighted matrix, or the like. The above quantization schemes may be changed and modified in various manners.

The quantization may be skipped according to the encoding setting. For example, the quantization (and dequantization) may be skipped according to the encoding setting (e.g., a quantization parameter of 0, that is, a lossless compression environment). In another example, when quantization-based compression performance is not exerted in view of the characteristics of an image, the quantization process may be omitted. The quantization may be skipped in the whole or partial region (M/2×N/2, M×N/2, or M/2×N) of the quantization block (M×N), and quantization skip selection information may be set explicitly or implicitly.

The quantization unit may transmit information required for generating a quantized block to the encoding unit so that the encoding unit encodes the information, includes the encoded information on a bitstream, and transmits the bitstream to the decoder. Thus, the decoding unit of the decoder may parse the information from the bitstream, for use in dequantization.

While the above example has been described on the assumption that a residual block is transformed and quantized by the transform unit and the quantization unit, a residual block with transform coefficients may be generated by transforming a residual signal and may not be quantized. The residual block may be subjected only to quantization without transform. Further, the residual block may be subjected to both transform and quantization. These operations may be determined depending on the encoding setting.

The dequantization unit 220 dequantizes the residual block quantized by the quantization unit 215. That is, the dequantization unit 220 generates a residual block with frequency coefficients by dequantizing a quantization frequency coefficient sequence.

The inverse transform unit 225 inversely transforms the residual block dequantized by the dequantization unit 220. That is, the inverse transform unit 225 inversely transforms the frequency coefficients of the dequantized residual block to generate a residual block with pixel values, that is, a reconstructed residual block. The inverse transform unit 225 may perform inverse transform by inversely performing the transform scheme used by the transform unit 210.

The add unit 230 reconstructs the target block by adding the prediction block predicted by the prediction unit 200 and the residual block recovered by the inverse transform unit 225. The reconstructed target block is stored as a reference picture (or reference block) in the coded picture buffer 240, for use as a reference picture when the next block to the target block, another block, or another picture is encoded later.

The filter unit 235 may include one or more post-processing filters such as a deblocking filter, a sample adaptive offset (SAO), and an adaptive loop filter (ALF). The deblocking filter may remove block distortion occurring at the boundary between blocks in a reconstructed picture. The ALF may perform filtering based on a value obtained by comparing the reconstructed image and the original image after the block is filtered through the deblocking filter. The SAO may reconstruct an offset difference at the pixel level between the original image and the residual block to which the deblocking filter is applied. These post-processing filters may be applied to a reconstructed picture or block.

The coded picture buffer 240 may store the block or picture reconstructed by the filter unit 235. The reconstructed block or picture stored in the coded picture buffer 240 may be provided to the prediction unit 200 that performs intra-prediction or inter-prediction.

The entropy encoding unit 245 scans the generated quantized frequency coefficient sequence in various scan methods to generate a quantized coefficient sequence, encodes the quantized coefficient sequence by entropy encoding, and outputs the entropy-encoded coefficient sequence. A scan pattern may be configured as one of various patterns such as zigzag, diagonal, and raster. Further, encoded data including encoding information received from each component may be generated and output in a bitstream.

FIG. 3 is a block diagram illustrating an image decoding apparatus according to an embodiment of the present disclosure.

Referring to FIG. 3, an image decoding apparatus 30 may be configured to include an entropy decoder 305, a prediction unit 310, a dequantization unit 315, an inverse transform unit 320, an add unit/subtraction unit 325, a filter 330, and a decoded picture buffer 335.

Further, the prediction unit 310 may be configured to include an intra-prediction module and an inter-prediction module.

When an image bitstream is received from the image encoding apparatus 20, the image bitstream may be transmitted to the entropy decoder 305.

The entropy decoder 305 may decode the bitstream to decoded data including quantized coefficients and decoding information to be transmitted to each component.

The prediction unit 310 may generate a prediction block based on the data received from the entropy decoder 305. Based on a reference image stored in the decoded picture buffer 335, a reference picture list may be made using a default configuration scheme.

The intra prediction unit may include a reference pixel construction unit, a reference pixel filter unit, a reference pixel interpolation unit, a prediction block generation unit and a prediction mode decoding unit and some may perform the same process as an encoder and some may inversely perform a derivation process.

The dequantization unit 315 may dequantize quantized transform coefficients that are provided in the bitstream and decoded by the entropy decoder 305.

The inverse transform unit 320 may generate a residual block by applying inverse DCT, inverse integer transform, or a similar inverse transform technique to the transform coefficients.

The dequantization unit 315 and the inverse transform unit 320 may reversely perform the processes of the transform unit 210 and the quantization unit 215 of the image encoding apparatus 20 described above, and may be implemented in various ways. For example, the dequantization unit 315 and the inverse transform unit 320 may use the same processes and inverse transform shared with the transform unit 210 and the quantization unit 215, and may reversely perform transform and quantization using information about the transform and quantization processes received from the image encoding apparatus 20 (e.g., a transform size, a transform shape, a quantization type, and so on).

The residual block that has been dequantized and inversely transformed may be added to the prediction block derived by the prediction unit 310, thus producing a reconstructed image block. This addition may be performed by the add unit/subtraction unit 325.

Regarding the filter 330, a deblocking filter may be applied to remove a blocking phenomenon from the reconstructed image block, when needed. To improve a video quality before and after the decoding process, other loop filters may be additionally used.

The reconstructed and filtered image block may be stored in the decoded picture buffer 335.

While not shown in the drawings, the image encoding/decoding apparatus may further include a block division unit.

The block division unit may divide into blocks of various units and sizes. The basic coding unit (or maximum coding unit. Coding Tree Unit. CTU) may refer to a basic (or starting) unit for prediction, transform, quantization, and so on in an image encoding process. In this case, the basic coding unit may be composed of one luminance basic coding block (maximum coding block or CTB) and two basic chrominance coding blocks according to a color format (YCbCr in this example), and the size of each block may be determined according to the color format. A coding block (CB) may be obtained according to the partitioning process. A CB may be understood as a unit which is not further sub-divided due to certain restrictions, and may be set as a starting unit for partitioning into sub-units. In the present disclosure, a block conceptually encompasses various shapes such as a triangle, a circle, and so on, not limited to a square.

While the following description is given in the context of one color component, it is also applicable to other color component with some modification, in proportion to a ratio according to the color format (for example, in case of YCbCr 4:2:0, the width-height length ratio of the luminance component and the chrominance component is 2:1). Further, although block partitioning dependent on other color component (e.g. depending on the block partitioning result of Y in Cb/Cr) is possible, it should be understood that block independent partitioning of each color component is also possible. Further, although one common block partitioning configuration (in consideration of being proportional to a length ratio) may be used, it is also necessary to consider and understand that an individual block partitioning configuration is used according to a color component.

In the block division unit, a block may be expressed as M×N, and the maximum and minimum values of each block may be obtained within the range. For example, if the maximum and minimum values of a block are 256×256 and 4×4, respectively, a block of size 2m×2n (m and n are integers of 2 to 8 in this example), a block of size 2m×2n (m and n are integers of 2 to 128 in this example), or a block of size m×m (m and n are integers of 4 to 256 in this example) may be obtained. Herein, m and n may be equal or different, and one or more ranges in which blocks are supported, such as the maximum value and the minimum value, may be generated.

For example, information about the maximum size and minimum size of a block may be generated, and information about the maximum size and minimum size of a block may be generated in some partitioning configuration. In the former case, the information may be range information about maximum and minimum sizes that may be produced in an image, whereas in the latter case, the information may be information about maximum and minimum sizes that may be produced according to some partitioning configuration. The partitioning configuration may be defined by an image type (I/P/B), a color component (YCbCr or the like), a block type (coding/prediction/transform/quantization), a partitioning type (index or type), and a partitioning scheme (quad tree (QT), binary tree (BT), and ternary tree (TT) as tree methods, and SI2, SI3, and SI4 as type methods).

Further, there may be a constraint on a width-height ratio available to a block (a block shape), and in this regard, a boundary value may be set. Only blocks less than or equal to/less than a boundary value k may be supported, where k may be defined according to a width-height ratio, A/B (A is the longer or equal value between the width and height, and B is the other value). k may be a real number equal to or larger than 1, such as 1.5, 2, 3, 4, or the like. As in the above example, a constraint on the shape of one block in an image may be supported, or one or more constrains may be supported according to a partitioning configuration.

In summary, it may be determined whether block partitioning is supported based on the above-described range and constraint and a later-described partitioning configuration. For example, when a candidate (child block) divided from a block (parent block) is satisfying a supported block condition, the partitioning may be supported, and otherwise, the partitioning may not be supported.

The block division unit may be configured in relation to each component of the image encoding apparatus and the image decoding apparatus, and the size and shape of a block may be determined in this process. Different blocks may be configured according to components. The blocks may include a prediction block for the prediction unit, a transform block for the transform unit, and a quantization block for the quantization unit. However, the present disclosure is not limited thereto, and block units may be additionally defined for other components. While the shape of each of an input and an output is described as a rectangular in each component in the present disclosure, the input and the output of some component may have any other shape (e.g., a triangle).

The size and shape of an initial (or starting) block in the block division unit may be determined from a higher unit. The initial block may be divide into smaller blocks. Once an optimal size and shape are determined according to the block partitioning, the block may be determined as an initial block for a lower unit. The higher unit may be a coding block, and the lower unit may be a prediction block or a transform block, to which the present disclosure is not limited. Rather, various modification examples are possible. Once the initial block of the lower unit is determined as in the above example, a partitioning process may be performed to detect a block of an optimal size and shape like the higher unit.

In summary, the block division unit may divide a basic coding block (or maximum coding block) into at least one coding block, and the coding block may be divide into at least one prediction block/transform block/quantization block. Further, the prediction block may be divide into at least one transform block/quantization block, and the transform block may be divide into at least one quantization block. Some blocks may be in a dependent relationship with other blocks (i.e., defined by a higher unit and a lower unit) or may have an independent relationship with other blocks. For example, the prediction block may be a higher unit above the transform block or may be a unit independent of the transform block. Various relationships may be established according to the types of blocks.

Depending on an encoding setting, whether to combine a higher unit and a lower unit may be determined. Combination between units means that a block of a higher unit is subjected to an encoding process of a lower unit (e.g., in the prediction unit, transform unit, inverse transform unit, and so on), without being divide into lower units. That is, it may mean that a partitioning process is shared between a plurality of units, and partitioning information is generated in one (e.g., a higher unit) of the units.

For example, (when a coding block is combined with a prediction block or a transform block), the coding block may be subjected to prediction, transform, and inverse transform.

For example, (when a coding block is combined with a prediction block), the coding block may be subjected to prediction, and a transform block equal to or smaller than the coding block in size may be subjected to transform and inverse transform.

For example, (when a coding block is combined with a transform block), a prediction block equal to or smaller than the coding block in size may be subjected to prediction, and the coding block may be subjected to transform and inverse transform.

For example, (when a prediction block is combined with a transform block), a prediction block equal to or smaller than the coding block in size may be subjected to prediction, transform, and inverse transform.

For example, (when there is no block combining), a prediction block equal to or smaller than a coding block in size may be subjected to prediction, and a transform block equal to or smaller than the coding block in size may be subjected to transform and inverse transform.

While various cases of a coding block, a prediction block, and a transform block have been described in the above examples, the present disclosure is not limited thereto.

For combination between units, a fixed configuration may be supported in an image, or an adaptive configuration may be supported in consideration of various encoding factors. The encoding factors include an image type, a color component, a coding mode (Intra/Inter), a partitioning configuration, a block size/shape/position, a width-height ratio, prediction-related information (e.g., intra-prediction mode, inter-prediction mode, or the like), transform-related information (e.g., transform scheme selection information or the like), quantization-related information (e.g., quantization region selection information and quantized transform coefficient coding information), and so on.

When a block of an optimal size and shape has been detected as described above, mode information (e.g., partitioning information) for the block may be generated. The mode information may be included in a bitstream along with information generated from a component to which the block belongs (e.g., prediction-related information and transform-related information) and transmitted to the decoder, and may be parsed at the same unit level by the decoder, for use in a video decoding process.

Now, a partitioning scheme will be described. While it is assumed that an initial block is shaped into a square, for the convenience of description, the present disclosure is not limited thereto, and the description is applicable in the same manner or a similar manner to a case in which the initial block is rectangular.

The block division unit may support various types of partitioning. For example, tree-based partitioning or index-based partitioning may be supported, and other methods may also be supported. In tree-based partitioning, a partition type may be determined based on various types of information (e.g., information indicating whether partitioning is performed, a tree type, a partitioning direction, and so on), whereas in index-based partitioning, a partitioning type may be determined using specific index information.

FIG. 4 is an exemplary diagram illustrating various partition types which may be obtained in a block division unit of the present disclosure. In this example, it is assumed that the partitioning types illustrated in FIG. 4 are obtained by one partitioning operation (or process), which should not be construed as limiting the present disclosure. The partition types may also be obtained in a plurality of partitioning operations. Further, an additional partition type which is not illustrated in FIG. 4 may also be available.

(Tree-Based Partitioning)

In tree-based partitioning of the present disclosure, QT, BT, and TT may be supported. If one tree method is supported, this may be referred to as single-tree partitioning, and if two or more tree methods are supported, this may be referred to as multi-tree partitioning.

In QT, a block is split into two partitions in each of the horizontal and vertical directions (n), whereas in BT, a block is split into two partitions in either the horizontal direction or the vertical direction (b to g). In TT, a block is split into three partitions in either the horizontal direction or the vertical direction (h to m).

In QT, a block may be split into four partitions by limiting the partitioning direction to one of the horizontal and vertical directions (o and p). Further, in BT, only split of a block into equal-sized partitions (b and c), only split of a block into partitions of different sizes (d to g), or both of the partition types may be supported. Further, in TT, split of a block into partitions concentrated only in a specific direction (1:1:2 or 2:1:1 in the direction of left→right or top→bottom) (h, j, k, and m), split of a block into partitions concentrated at the center (1:2:1) (i and l), or both the partition types may be supported. Further, split of a block into four partitions in each of the horizontal and vertical directions (i.e., a total of 16 partitions) may be supported (q).

Among the tree methods, split of a block into z partitions only in the horizontal direction (b, d, e, h, i, j, o), split of a block into z partitions only in the vertical direction (c, f, g, k, l, m, p), or both the partition types may be supported. Herein, z may be an integer equal to or greater than 2, such as 2, 3, or 4.

In the present disclosure, it is assumed that the partition type n is supported as QT, the partition types b and c are supported as BT, and partition types i and l are supported as TT.

One or more of the tree partitioning schemes may be supported according to an encoding setting. For example, QT, QT/BT, or QT/BT/TT may be supported.

In the above example, the basic tree partitioning scheme is QT, and BT and TT are included as additional partitioning schemes depending on whether other trees are supported. However, various modifications may be made. Information indicating whether other trees are supported (bt_enabled_flag, tt_enabled_flag, and bt_tt_enabled_flag, with 0 indicating not support and 1 indicating support) may be implicitly determined according to an encoding setting or explicitly determined in units such as sequence, picture, slice, tile group, tile, or brick.

Partitioning information may include information indicating whether partitioning is performed (tree_part_flag or qt_part_flag, bt_part_flag, tt_part_flag, and bt_tt_part_flag, which may have a value of 0 or 1 with 0 indicating not partition and 1 indicating partition). Further, depending on partitioning schemes (BT and TT), information about a partitioning direction (dir_part_flag, or bt_dir_part_flag, tt_dir_part_flag, and bt_tt_dir_part_flag, which have a value of 0 or 1 with 0 indicating <width/horizontal> and 1 indicating <height/vertical>) may be added. This may be information that may be generated when partitioning is performed.

When multi-tree partitioning is supported, various pieces of partitioning information may be configured. The following description is given of an example of how partitioning information is configured at one depth level (that is, although recursive partitioning is possible by setting one or more supported partitioning depths), for the convenience of description.

In Example 1, information indicating whether partitioning is performed is checked. If partitioning is not performed, the partitioning ends.

If partitioning is performed, selection information about a partition type (e.g., tree_idx. 0 for QT, 1 for BT, and 2 for TT) is checked. Partitioning direction information is additionally checked according to the selected partition type, and the procedure proceeds to the next step (if additional partitioning is possible for reasons such as when a partitioning depth has not reached a maximum value, the procedure starts again from the beginning, and if the additional partitioning is not possible, the partitioning procedure ends).

In Example 2, information indicating whether partitioning is performed in a certain tree scheme (QT) is checked and the procedure proceeds to the next step. If partitioning is not performed in the tree scheme (QT), information indicating whether partitioning is performed in another tree scheme (BT) is checked. In this case, if partitioning is not performed in the tree scheme, information indicating whether partitioning is performed in a third tree scheme (TT) is checked. If partitioning is not performed in the third tree scheme (TT), the partitioning procedure ends.

If partitioning is performed in the tree scheme (QT), the procedure proceeds to the next step. Further, partitioning is performed in the second tree scheme (BT), partitioning direction information is checked and the procedure proceeds to the next step. If partitioning is performed in the third tree scheme (TT), partitioning direction information is checked and the procedure proceeds to the next step.

In Example 3, information indicating whether partitioning is performed in a tree scheme (QT) is checked. If partitioning is not performed in the tree scheme (QT), information indicating whether partitioning is performed in other tree schemes (BT and TT) is checked. If partitioning is not performed, the partitioning procedure ends.

If partitioning is performed in the tree scheme (QT), the procedure proceeds to the next step. Further, partitioning is performed in the other tree schemes (BT and TT), partitioning direction information is checked and the procedure proceeds to the next step.

While tree partitioning schemes are prioritized (Example 2 and Example 3) or no priorities are assigned to the tree partitioning schemes (Example 1) in the above examples, various modification examples may also be available. Further, partitioning in a current step is not related to the partitioning result of the previous step in the above example. However, partitioning in the current step may be dependent on the partitioning result of the previous step.

In Example 1 to Example 3, if some tree partitioning scheme (QT) is performed in the previous step and thus the procedure proceeds to the current step, the same tree partitioning scheme (QT) may be supported in the current step, as well.

On the other hand, if the certain tree partitioning scheme (QT) was not performed and another tree partitioning scheme (BT or TT) was performed in the previous step, other tree partitioning schemes (BT and TT) except for the certain tree partitioning scheme (QT) may be supported in the current step and the following steps.

In the above case, a tree configuration supported for block partitioning may be adaptive, and thus the afore-mentioned partitioning information may also be configured differently. (The example to be described later is assumed to be Example 3). That is, if partitioning is not performed in the certain tree scheme (QT) in the previous step, the partitioning procedure may be performed with no regard to the tree scheme (QT) in the current step. In addition, partitioning information related to the certain tree scheme (e.g., information indicating whether partitioning is performed, information about a partitioning direction, and so on. In this example <QT>, information indicating whether partitioning is performed) may be removed.

The above example relates to an adaptive partitioning information configuration for the case where block partitioning is allowed (e.g., a block size is within a range between maximum and minimum values, the partitioning depth of each tree scheme has not reached a maximum depth (allowed depth), or the like). Even when block partitioning is restricted (e.g., the block size does not exist in the range between the maximum and minimum values, the partitioning depth of each tree scheme has reached the maximum depth, or the like), partitioning information may be configured adaptively.

As already mentioned, tree-based partitioning may be performed in a recursive manner in the present disclosure. For example, if a partition flag of a coding block with a partitioning depth of k is set to 0, coding block encoding is performed in the coding block with the partitioning depth of k. If the partition flag of the coding block with the partitioning depth of k is set to 1, coding block encoding is performed in N sub-coding blocks with a partitioning depth of k+1 according to a partitioning scheme (where N is an integer equal to or greater than 2, such as 2, 3, and 4).

The sub-coding block may be set as a coding block (k+1) and partitioned into sub-coding blocks (k+2) in the above procedure. This hierarchical partitioning scheme may be determined according to a partitioning setting such as a partitioning range and an allowed partitioning depth.

In this case, a bitstream structure representing partitioning information may be selected from among one or more scan methods. For example, the bitstream of the partitioning information may be configured based on an order of partitioning depths, or based on whether partitioning is performed.

For example, in the partitioning depth order-based case, partitioning information is obtained at a current depth level based on an initial block, and then partitioning information is obtained at the next depth level. In the case based on whether partitioning is performed, additional partitioning information is first obtained in a block split from an initial block, and other additional scan methods may be considered.

The maximum block size and minimum block size may have a common setting regardless of the tree type (or all trees), or may have individual settings for each tree, or may have a common setting for two or more trees. In this case, the maximum block size may be set equal to or less than the maximum coding block. If the maximum block size according to the predetermined first tree is not the same as the maximum coding block, partitioning is implicitly performed using a predetermined second tree method until the maximum block size of the first tree is reached.

In addition, regardless of the tree type, a common division depth may be supported, an individual division depth may be supported according to each tree, or a common division depth for two or more trees may be supported. Alternatively, a division depth may be supported for some trees, and a division depth may not be supported for the others trees.

An explicit syntax element for the setting information may be supported, and some setting information may be determined implicitly.

(Index-Based Division)

In index-based division of the present disclosure, a constant split index (CSI) scheme and a variable split index (VSI) scheme may be supported.

In the CSI scheme, k subblocks may be obtained through partitioning in a predetermined direction, and k may be an integer equal to or greater than 2, such as 2, 3, or 4. Specifically, the size and shape of a subblock may be determined based on k irrespective of the size and shape of a block. The predetermined direction may be one of or a combination of two or more of horizontal, vertical, and diagonal directions (top-left→bottom-right direction or bottom-left→top-right direction).

In the index-based CSI division scheme of the present disclosure, z candidates may be obtained through partitioning in either the horizontal direction or the vertical direction. In this case, z may be an integer equal to or greater than 2, such as 2, 3, or 4, and the subblocks may be equal in one of width and height and may be equal or different in the other one of width and height. The width or height length ratio of the subblocks are A1:A2 . . . AZ, and each of A1 to AZ may be an integer equal to or greater than 1, such as 1, 2, or 3.

Further, a candidate may be obtained by partitioning into x partitions and y partitions along the horizontal and vertical directions, respectively. Each of x and y may be an integer equal to or greater than 1, such as 1, 2, 3, or 4. However, a candidate with both x and y being 1s may be restricted (because a already exists). Although FIG. 4 illustrates cases where subblocks have the same width or height ratio, candidates having the different width ratio or height ratio may also be included.

Further, a candidate may be split into w partitions in one of diagonal directions, top-left→bottom-right and bottom-left→top-right. Herein, w may be an integer equal to or greater than 2, such as 2 or 3.

Referring to FIG. 4, partition types may be classified into a symmetrical partition type (b) and an asymmetric partition type (d and e) according to a length ratio of each subblock. Further, partition types may be classified into a partition type concentrated in a specific direction (k and m) and a centered partitioning type (k). Partition types may be defined by various encoding factors including a subblock shape as well as a subblock length ratio, and a supported partition type may be implicitly or explicitly determined according to an encoding setting. Thus, a candidate group may be determined based on the supported partition type in the index-based partitioning scheme.

In the VSI scheme, with the width w or height h of each subblock fixed, one or more subblocks may be obtained through partitioning in a predetermined direction. Herein, each of w and h may be an integer equal to or greater than 1, such as 1, 2, 4, or 8. Specifically, the number of subblocks may be determined based on the size and shape of a block, and the w or h value.

In the index-based VSI partitioning scheme of the present disclosure, a candidate may be partitioned into subblocks, each being fixed in one of the width and length. Alternatively, a candidate may be partitioned into subblocks, each being fixed in both the width and length. Since the width or height of a subblock is fixed, equal partitioning in the horizontal or vertical direction may be allowed. However, the present disclosure is not limited thereto.

In the case where a block is of size M×N prior to partitioning, if the width w of each subblock is fixed, the height h of each subblock is fixed, or both of the width w and height h of each subblock are fixed, the number of obtained subblocks may be (M*N)/w, (M*N)/h, or (M*N)/w/h.

Depending on an encoding setting, only one or both of the CSI scheme and the VSI scheme may be supported, and information about a supported scheme may be implicitly or explicitly determined.

The present disclosure will be described in the context of the CSI scheme being supported.

A candidate group may be constructed to include two or more candidates in the index-based partitioning scheme according to an encoding setting.

For example, a candidate group such as {a, b, c}, {a, b, c, n}, or {a to g and n} may be formed. The candidate group may be an example of including block types predicted to occur many times based on general statistical characteristics, such as a block divided into two partitions in the horizontal or vertical direction or in each of the horizontal and vertical directions.

Alternatively, a candidate group such as {a, b}, {a, o}, or {a, b, o}, or a candidate group such as {a, c}, {a, p}, or {a, c, p} may be constructed. The candidate group may be an example of including candidates each being partitioned into partitions and four partitions in the horizontal and vertical directions, respectively. This may be an example of configuring block types predicted to be partitioned mainly in a specific direction as a candidate group.

Alternatively, a candidate group such as {a, o, p} or {a, n, q} may be constructed. This may be an example of constructing a candidate group to include block types predicted to be partitioned into many partitions smaller than a block prior to partitioning.

Alternatively, a candidate group such as {a, r, s} may be constructed, and it may be an example of determining that the optimal partitions result that can be obtained in a rectangular shape through other method (tree method) from the block before being split, and constructing the non-rectangular shape as a candidate group.

As noted from the above examples, various candidate group constructions may be available, and one or more candidate group constructions may be supported in consideration of various encoding factors.

Once a candidate group is completely constructed, various partitioning information configurations may be available.

For example, regarding a candidate group including the candidate a which is not partitioned and the candidates b to s which are partitioned, index selection information may be generated.

Alternatively, information indicating whether partitioning is performed (information indicating whether the partitioning type is a) may be generated. If partitioning is performed (if the partitioning type is not a), index selection information may be generated regarding a candidate group including the candidates b to s that are partitioned.

The partitioning information may be configured in many other ways than described above. Except for the information indicating whether partitioning is performed, binary bits may be assigned to the index of each candidate in the candidate group in various manners such as fixed length binarization, variable length binarization, and so on. If the number of the candidate is 2, 1 bit may be assigned to the index selection information, and if the number of the candidates is 3, one or more bits may be assigned to the index selection information.

Compared to the tree-based partitioning scheme, partition types predicted to occur many times may be included in a candidate group in the index-based partitioning scheme.

Since the number of bits used to represent index information may increase according to the number of supported candidate groups, this scheme may be suitable for single-layer partitioning (e.g., the partitioning depth is limited to 0), instead of tree-based hierarchical partitioning (recursive partitioning). That is, a single partitioning operation may be supported, and a subblock obtained through index-based partitioning may not be further split.

This may mean that further partitioning into smaller blocks of the same type is impossible (e.g., a coding block obtained through index-based partitioning may not be further split into coding blocks), and also mean that further partitioning into different types of blocks may also be impossible (e.g., partitioning of a coding block into prediction blocks as well as coding blocks is not possible). Obviously, the present disclosure is not limited to the above example, and other modification examples may also be available.

Now, a description will be given of determination of a block partitioning setting mainly based on a block type among encoding factors.

First, a coding block may be obtained in a partitioning process. A tree-based partitioning scheme may be adopted for the partitioning process, and a partition type such as a(no split), n(QT), b, c(BT), i, or l(TT) of FIG. 4 may result according to a tree type. Various combinations of tree types, such as QT/QT+BT/QT+BT+TT may be available according to an encoding setting.

The following examples are processes of finally dividing a coding block obtained in the above procedure into prediction blocks and transform blocks. It is assumed that prediction, transform, and inverse transform are performed based on the size of each partition.

In Example 1, prediction may be performed by setting the size of a prediction block equal to that of a coding block, and transform and inverse transform may be performed by setting the size of a transform block equal to that of the coding block (or prediction block).

In Example 2, prediction may be performed by setting the size of a prediction block equal to that of a coding block. A transform block may be obtained by partitioning the coding block (or prediction block) and transform and inverse transform may be performed based on the size of the obtained transform block.

Here, a tree-based partitioning scheme may be adopted for the partitioning process, and a partition type such as a(no split), n(QT), b, c(BT), i, or l(TT) of FIG. 4 may result according to a tree type. Various combinations of tree types, such as QT/QT+BT/QT+BT+TT may be available according to an encoding setting.

Here, the partitioning process may be an index-based partitioning scheme. A partition type such as a (no split), b, c, or d of FIG. 4 may be obtained according to an index type. Depending on an encoding setting, various candidate groups such as {a, b, c} and {a, b, c, d} may be constructed.

In Example 3, a prediction block may be obtained by partitioning a coding block, and subjected to prediction based on the size of the obtained prediction block. For a transform block, its size is set to the size of the coding block, and transform and inverse transform may be performed on the transform block. In this example, the prediction block and the transform block may be in an independent relationship.

An index-based partitioning scheme may be used for the partitioning process, and a partitioning type such as a (no split), b to g, n, r, or s of FIG. 4 may be obtained according to an index type. Various candidate groups such as {a, b, c, n}, {a to g, n}, and {a, r, s}, may be constructed according to an encoding setting.

In Example 4, a prediction block may be obtained by partitioning a coding block, and subjected to prediction based on the size of the obtained prediction block. For a transform block, its size is set to the size of the prediction block, and transform and inverse transform may be performed on the transform block. In this example, the transform block may have a size equal to the size of the obtained prediction block or vice versa (the size of the transform block is set as the size of the prediction block).

A tree-based partitioning scheme may be used for the partitioning process, and a partition type such as a (no split), b, c (BT), i, l (TT), or n (QT) of FIG. 4 may be generated according to a tree type. Depending on an encoding setting, various combinations of tree types such as QT/BT/QT+BT may be available.

Here, an index-based partitioning scheme may be used for the partitioning process, and a partition type such as a (no split), b, c, n, o, or p of FIG. 4 may result according to an index type. Various candidate groups such as {a, b}, {a, c}, {a, n}, {a, o}, {a, b, c}, {a, o, p}, {a, b, c, n}, and {a, b, c, n, p} may be constructed depending on an encoding setting. Further, a candidate group may be constructed in the VSI scheme alone or the CSI scheme and the VSI scheme in combination, as the index-based partitioning scheme(s).

In Example 5, a prediction block may be obtained by partitioning a coding block, and subjected to prediction based on the size of the obtained prediction block. A transform block may also be obtained by partitioning the coding block and subjected to transform and inverse transform based on the size of the obtained transform block. In this example, each of a prediction block and a transform block may result from partitioning a coding block.

Here, a tree-based partitioning scheme and an index-based partitioning scheme may be used for the partitioning process, and a candidate group may be constructed in the same manner as or in a similar manner to in Example 4.

In this case, the above examples are cases that may occur depending on whether a process of partitioning each block type is shared, which should not be construed as limiting the present disclosure. Various modification examples may also be available. Further, a block partitioning setting may be determined in consideration of various encoding factors as well as a block type.

The encoding factors may include an image type (I/P/B), a color component (YCbCr), a block size/shape/position, a block width-height ratio, a block type (coding block, prediction block, transform block, or quantization block), a partition state, a coding mode (Intra/Inter), prediction-related information (intra-prediction mode or inter-prediction mode), transform-related information (transform scheme selection information), quantization-related information (quantization region selection information and quantized transform coefficient coding information).

(Description on a Relationship Between Blocks)

FIG. 5 is an example of a family tree for describing a genetic trait of a member in one family and characters in a blood relationship. For convenience of description, a horizontal and vertical relationship according to a specific gender (male) will be described.

In reference to FIG. 5, a target character (principal) may have a horizontal relationship (a) with an older brother and a younger brother and have a vertical relationship (b) with a grandfather, a father (an ancestor), a son and a grandson (a descendant). In this case, characters in a horizontal relationship may have a similar genetic factor such as an appearance, a physique, a personality, etc. Alternatively, some factors may be similar and some factors may not be similar. Whether all or part of the genetic factors are similar may be determined by various environmental factors, etc. (including a mother).

The explanation may be equally or similarly applied to a vertical relationship, as well. For example, there may be a case in which a genetic factor of a target character (an appearance, a physique, a personality) is similar to a father. Alternatively, some genetic factors of a target character (an appearance, a physique) may be similar to a father, but some genetic factors (a personality) may (be similar to a mother and) not be similar to a father.

In another example, a target character may be genetically similar to a grandfather (or a grandson) and a grandfather may be genetically similar to a grandson, but a level of similarity between characters may be determined based on a relationship between characters. In other words, similarity between a grandfather and a target character (a two-generation difference) may be high and similarity between a grandfather and a grandson (a four-generation difference) may be low.

Generally, a direct analysis may be a top priority to grasp a feature of a target character, but a direct analysis may be impossible when a target character is absent. In this case, it may be possible to approximatively grasp a feature of a target character through an indirect analysis of characters in various relationships as in the example. Of course, it may be required to analyze characters with high similarity with a target character.

The example described a relationship between characters based on a variety of blood relationships, which may be equally or similarly applied to encoding for image compression. In this case, block-based encoding will be used as an example. Information of a block (a relative block) in a variety of relationships with a target block may be used/referenced/consulted to encode a predetermined block (a target block).

Here, information of the relative block may be data based on a pixel value, data based on mode information used in an encoding process, or data based on setting information used in an encoding process. For example, it may be a pixel value in a spatial domain of the relative block or a coefficient value (or a quantized coefficient) in a frequency domain. Alternatively, it may be mode information generated in a process of encoding the relative block. Alternatively, it may be information (such as a reference candidate group) on a reference setting used in the encoding process of the relative block. Here, data based on a pixel value or data based on mode information may be information configuring the reference setting.

In the present invention, the relationship between blocks (a target block and a relative block. described with reference to the target block) may be defined as follows.

Horizontal relationship: in case that the target block does not have an overlapping area with the relative block (independent relationship between blocks)

Vertical relationship: in case that the target block is larger than the relative block and contains the relative block.

Or, in case that it is smaller than the relative block and included in the relative block (dependent relationship between blocks)

Here, in case of having a horizontal relationship, the relative block may be located regardless of the space to which the target block belongs. That is, the relative block may belong to the same space temporally as the target block, or may belong to a different space temporally from the target block.

Here, in the case of having a vertical relationship, the relative block may be located in a space to which the target block belongs. That is, the relative block does not belong to a space that is temporally different from the target block, but the relative block may have a vertical relationship based on a region corresponding to the target block in a temporally different space according to the encoding setting.

FIG. 6 shows examples of various arrangements of a relative block having a horizontal relationship with a target block. Referring to FIG. 6, a block placed in a horizontal relationship with a target block may be classified into a block belonging to a temporally same space (Curr) and a block belonging to a temporally different space (Diff).

Here, even if the relative block belongs to a color component different from that of the target block (X), it is regarded as belonging to the temporally same space, but some definition of the horizontal relationship is changed (a relative block having the same size and position as the target block exists). Here, blocks belonging to the same space may be classified into blocks (UL, U, UR, L, DL) adjacent (or closest) to the target block and blocks (F0, F1, F2) that are not adjacent (or distantly).

Among the blocks belonging to the same space, the block adjacent to the target block may be the block closest to the left, top, top-left, top-right, bottom-left, etc. This is the block that have already been encoded by considering a raster scan order (or Z-scan. In case of 2×2, top-left→top-right→bottom-left→bottom-right). That is, positions of adjacent blocks may be determined according to a predetermined scan order, and changes such as the removal of the block at the above position or the addition of the block at a new position (right, bottom, bottom-right, etc.) may occur according to the type of scan order (inverse Z scan <bottom-right→bottom-left→top-right→top-left>, clock-wise scan <top-left→top-right→bottom-right→bottom-left>, counter clock-wise scan<top-left→bottom-left→bottom-right→top-right>, etc.).

In addition, blocks that are not adjacent to the target block may be blocks that have already been encoded. In this case, it may belong to the same block unit (such as the maximum coding block) as the target block, or may belong to the same division unit (slice, tile, etc.). That is, limited settings such as placing a range (existing within the range of x_offset and y_offset in the horizontal and vertical directions based on the target block) for a region that is not adjacent but may be included as a relative block may be supported. In the present invention, it is assumed that the block having a horizontal relationship with the target block has already been encoded, but is not limited thereto.

For encoding of the target block, encoding information/reference setting of the relative block having a horizontal relationship may be used (referenced).

For example, a pixel value of a relative block may be used to generate a prediction value of the target block. In detail, in intra prediction, a prediction value of a target block may be obtained by applying a method such as extrapolation, interpolation, averaging, or a method such as block matching or template matching to a pixel value of the relative block. In addition, in inter prediction, the prediction value of the target block may be obtained by using a method such as block matching or template matching with the pixel value of the relative block. In this case, block matching or template matching may be defined as intra prediction (Mode_Intra) in terms of finding a prediction value in the same space, or may be defined as inter prediction (Mode_Inter) according to a prediction method, or it may be classified as other encoding mode that are additionally defined Here, only the pixel values in the spatial domain are targeted, but all or some of the coefficient values in the frequency domain of the relative block may be used as the prediction value of the target block (that is, used for prediction of the frequency component).

For example, mode information of a relative block may be used to encode mode information of a target block. Specifically, in intra prediction, prediction information (directional mode, non-directional mode, motion vector, etc.) of a relative block may be used for encoding (MPM, non-MPM, etc.) prediction information of a target block. In addition, in inter prediction, prediction information (motion vector, reference picture, etc.) of a relative block may be used for encoding prediction information of a target block.

Here, according to the prediction method of intra prediction, not only a relative block belonging to the temporally same space and the same color component as the target block may be targeted (prediction mode using extrapolation, interpolation, average, etc.), but also a relative block belonging to the temporally same space and the different color component as the target block may be targeted (prediction mode in which data of the different color component is copied).

Here, in the case of inter prediction, a motion vector and a reference picture are targeted as examples of prediction information, but various information such as a motion information encoding mode, a motion prediction direction, and a motion model may be included.

For example, for reference setting of a target block, reference setting of a relative block may be used. In detail, in intra prediction, the MPM candidate group of the relative block may be used as the MPM candidate group of the target block. In addition, in inter prediction, a motion prediction candidate group of a relative block may be used as a motion prediction candidate group of a target block. That is, even if the candidate group is constructed based on the relative block, it means that the candidate group of the relative block may be used as it is without going through a separate candidate group construction in the target block.

In the above example, the description has been made on the assumption that the relative block is one block having a horizontal relationship with the target block. However, numerous relative blocks may exist in an image, and at least one relative block to be used for encoding the target block must be specified. The following case classification is only an example, and it is necessary to understand that various case configurations and definitions are possible without being limited thereto.

Here, a block belonging to the same space and adjacent to the target block may be specified as a relative block (case 1). Alternatively, a block belonging to the same space and not adjacent to the target block may be specified as a relative block (case 2). Alternatively, a block belonging to a different space may be specified as a relative block (case 3). Alternatively, blocks belonging to all or some of (case 1) to (case 3) may be specified as relative blocks.

Here, in the case of (case 1), all or some of the top-left, top, top-left, top-right and bottom-left blocks (L, U, UL, UR, DL) adjacent to the target block may be specified as a relative block. In the case of (case 2), one or more of the blocks that are not adjacent to the target block may be specified as a relative block. In case of (case 3), all or some of the center, left, right, top, bottom, top-left, top-right, bottom-left, and bottom-right blocks (C, L, R, U, D, UL, UR, DL, DR) adjacent to the target block and one or more of blocks not adjacent to the target block may be specified as the relative blocks.

Various verification methods exist in order to specify a relative block. First, a block including coordinates of a predetermined position based on the target block may be specified as the relative block. First, it is assumed that the target block (m×n) has a range of (a+m−1, b+n−1) based on the top-left coordinates of (a, b).

(case 1 or case 3) The C block is described on the assumption that the target block and the position in each picture are the same. Therefore, descriptions of blocks having the same alphabet in the same image Curr and the different image Diff may be common. However, (in case of case 3), the position of the C block may not be the same as that of the target block in a picture, and in the example described later (i.e., a block belonging to Diff), the pixel position may be changed according to the position of the C block.

C block refers to a block including a pixel at a predetermined position among internal pixels of the target block such as (a, b), (a, b+n−1), (a+m−1, b), (a+m−1, b+n−1), (a+m/2−1, b+n/2−1), (a+m/2+1, b+n/2−1), (a+m/2−1, b+n/2+1), (a+m/2+1, b+n/2+1). And, L block refers to a block including a pixel at a predetermined position among pixels beyond the left boundary of the target block such as (a−1, b), (a−1, b+n−1), and U block refers to a block including a pixel at a predetermined position among pixels beyond the top boundary of the target block such as (a, b−1), (a+m−1, b−1). In addition, UL block refers to a block including a pixel at a predetermined position among pixels beyond the top left boundary of the target block, such as (a−1, b−1), UR block refers to a block including a pixel at a predetermined position among pixels beyond the top right boundary of the target block, such as (a+m, b−1), (a−1, b+n), and DL block refers to a block including a pixel at a predetermined position among pixels beyond the bottom left boundary of the target block such as (a−1, b+n). In the case of the right, bottom, and bottom-right directions, they are omitted because they may be derived from the above description.

In the above description, an example was given of specifying a block including a pixel at one position among pixels existing in a block of each direction as a relative block, but two or more relative blocks may be specified in all or some directions, and two or more pixel positions may be defined for this.

(case 2) Fk block (k is 0~2) may mean a block including a pixel separated by a predetermined length (off_x, off_y, etc.) in a predetermined direction of horizontal/vertical/diagonal line such as (a-off_x, b), (a, b-off_y), (a-off_x, b-off_y). Here, the predetermined length may be an integer of 1 or more, such as 4, 8, 16, etc., and may be set based on the horizontal and vertical lengths of the target block. Alternatively, it may be set based on the horizontal and vertical lengths of the maximum coding block, and various examples of modifications thereof may be possible. The predetermined length may be set implicitly as in the above example, or a related syntax element may be generated as an explicit value.

As another method of specifying the relative block, a block having mode information having the same/similarity as the encoding information of the target block may be specified as the relative block. In this case, the mode information refers not to information to be encoded (or use/prediction, candidate group construction, etc.) at the current stage, but information that has already been encoded or has a different property/meaning that has already been determined. The determined information may be information determined in a previous step in a mode determination process or information restored in a previous step in a decoding process.

For example, when a target block performs inter prediction using a non-translational motion model, a block encoded using the non-translational motion model among previously coded blocks may be specified as a relative block. In this case, motion vector information according to a non-translational motion model of the specified relative block may be used to construct a candidate group for motion vector prediction according to the non-translational motion model of the target block.

In the above example, the motion model information refers to information having different properties/meanings used to check the sameness/similarity with the target block, and the motion vector according to the motion model (non-translational motion model) of the relative block may be information used to construct a motion vector prediction candidate group according to the motion model of the target block. In this case, the relative block may or may not be adjacent to the target block. It can be useful when a block in a region not adjacent to the target block is also specified as a relative block and used/referenced, if there are few modes having the sameness/similarity with the target block.

A relative block used/referenced for encoding of the target block may be determined in consideration of the following.

A relative block may be determined based on information to be used/referenced for encoding of the target block. Here, the information to be used/referenced for encoding of the target block is pixel value information for prediction, mode information related to prediction/transform/quantization/in-loop filter/entropy encoding or the like, and reference candidate group information related to prediction/transform/quantization/in-loop filter/entropy encoding or the like.

In addition, the relative block may be determined based on state information of the target block and image information to which the target block belongs. Here, the state information of the target block may be defined based on a block size, a block shape, a horizontal/vertical length ratio of a block, a position in a unit such as picture/division unit (slice, tile, etc.)/maximum coding block. Here, image information to which the target block belongs may be defined based on an image type (I/P/B), a color component (Y/Cb/Cr), and the like.

Also, a relative block may be determined based on encoding information of the target block. In detail, the relative block may be determined based on whether or not it has information on which sameness/similarity with the target block exists. Here, the information referenced for sameness/similarity may be mode information related to prediction/transform/quantization/in-loop filter/entropy encoding, and the like.

In consideration of all or some of the factors mentioned in the above example, the category (the aforementioned case), the number, and the position of the relative block may be determined. In detail, which category is selected may be determined, and the number and position of relative blocks supported in the selected category may be determined. In this case, the number of blocks supported in each category may be m, n, o, and these may be integers of 0 or more, such as 0, 1, 2, 3, 5, etc.

Relative block (block position) may be determined in the direction such as left, right, top, bottom, top-left, top-right, bottom-left, bottom-right, center, etc. with the center of the target block (or a block corresponding to the target block in an image temporally different from the image to which the target block belongs). For example, a relative block may be determined from the block closest to the direction. Alternatively, a relative block may be determined among blocks additionally satisfying the direction and a certain range/condition. It may belong to a maximum coding block different from the maximum coding block to which the target block belongs, or may be a block at a position having a difference based on a horizontal or vertical length of the target block (e.g., left, top, top-left directions).

Further, the relative block may be determined based on a coding order, and in this case, the coding order may be defined by various scan methods such as raster scan and z-scan. As an example, a predetermined number of blocks may be included as relative blocks (based on the coding order being close), and the predetermined number may be an integer greater than or equal to 0, such as 0, 1, 2, 3, etc. That is, the relative block may be managed in a memory management method such as FIFO (First-in, First-out) according to the coding order, and it may be the example of determining (decision to be included in the candidate group) the relative block that can occur in (case 2).

When one relative block is supported, it may mean that only information of the corresponding block may be used/referenced. In addition, even if a plurality of relative blocks are supported, one piece of information may be derived based on the plurality of relative blocks according to an encoding setting. For example, in inter prediction, three relative blocks, such as left, top, and top-right blocks, are specified for motion vector prediction to support three motion vectors, but one motion vector may be derived through a method such as a median value (or average) of motion vectors of the three blocks according to the encoding setting to use as a motion vector prediction value of the target block.

In the case of the above example, it may be an encoding setting that can reduce occurrence of optimal candidate selection information generated by supporting two or more candidates. However, it can be difficult to expect that one candidate having high correlation with the encoding information of the target block is derived. Therefore, a method of constructing a candidate group with a plurality of candidates may be more efficient. Of course, as the number of candidates included in the candidate group increases, the amount of information for expressing this may increase, so it is important to construct an efficient candidate group.

Therefore, a relative block such as the above-described various examples may be supported, but it may be necessary to specify an optimal relative block in consideration of general image characteristics and the like, and to construct a candidate group based thereon. In the present invention, it is assumed that a candidate is constructed through two or more pieces of information from one or more relative blocks.

The following shows a candidate group construction based on a block having a horizontal relationship with the target block and encoding/decoding process.

A block referred to for encoding information of a target block is specified (1). The candidate group is constructed based on the encoding information of the specified block in a predetermined order (2). One candidate of the candidate group is selected based on the encoding information of the target block (3). An image encoding/decoding process is performed based on the selected candidate (4).

In (1), a relative block used for constructing a candidate group for encoding information of the target block is specified. In this case, the relative block may be a block having a horizontal relationship with the target block. It has already been described that the relative blocks of various categories as described above may be included, and that the relative block may be specified in consideration of various information such as state information of the target block in addition to encoding information of the target block.

In (2), a candidate group is constructed, according to a predetermined order, based on encoding information of the relative block specified through the above process. Here, information obtained based on encoding information of one relative block may be included in the candidate group, or information obtained based on encoding information of a plurality of relative blocks may be included in the candidate group. In this case, a fixed order may be supported for the candidate group construction order, or an adaptive order based on various coding elements (elements to be considered when specifying a relative block, etc.) may be supported.

In (3), one candidate of the candidate group is selected based on the encoding information of the target block, and in (4), an image encoding/decoding process may be performed based on this.

The flow chart may be a process that is checked and performed in block units. Here, in the case of some steps (1, 2), it may be a process that is checked and performed in an initial stage of encoding. Even if the content is not mentioned in the above (1) to (4), since it is possible to derive through the above-described various embodiments, a detailed description thereof will be omitted. In general, it is difficult to confirm in advance which block has a high correlation with the target block among blocks having a horizontal relationship. A method of confirming in advance what correlation it has with a target block among blocks having a horizontal relationship will be described later. In addition, although (3) describes a case where one candidate of the candidate group is selected, two or more pieces of information may be also selected according to the type of encoding information, encoding setting, etc., and this may be a description that is commonly applicable to the present invention.

The target block and the relative block may be one of units of encoding/prediction/transform/quantization/in-loop filter, and the like, and the target block and the relative block may be set in the same unit. For example, when the target block is a coding block, a relative block may also be a coding block, and the modification set in a different unit according to the encoding setting may also be possible.

FIG. 7 shows examples of various arrangements of a relative block in a vertical relationship with a target block.

FIG. 7 is a case in which recursive tree-based partitioning (QT) is performed, and a description will be given centering on X and A to C blocks. Blocks B(1), X(2), and A(3) may be obtained as the division depth increases starting from a basic coding block (CTU. C block) having a division depth of 0. Here, a block placed in a vertical relationship with the target block may be classified into a higher block (or ancestor block) and a lower block (or descendant block). In this case, the higher block of the target block X may be a B or C block, and the lower block may be an A block. Here, the target block and the relative block may be set as a higher block and a lower block, respectively, or may be set as a lower block and a higher block, respectively.

For example, in this example, if it has a larger value than the division depth (k) of the target block, the relative block may be a child (k+1) or grandchild (k+2) block, and if it has a smaller value, the relative block may be a father (k−1) or grandfather (k−2) block. That is, in addition to defining a vertical relationship between existing blocks, detailed relationships between blocks may be confirmed through the division depth.

Here, as in the above example, one tree method is supported and comparison through a common division depth may be possible. When multiple tree methods are supported and more than one division depth according to each tree method is supported, the detailed relationship may be checked by considering the number of divisions and each division depth, not simple classification as in the example above.

For example, if QT is performed 1 time in a 4M×4N block, a 2M×2N block may be obtained at (QT) division depth 1, but when BT is performed 2 times, a 2M×2N block may be obtained. However, the (BT) division depth is the same as what can be obtained at 2. In this case, 4M×4N block may be a father (QT) or grandfather (BT) block for a 2M×2N block, and conversely, may be a child (QT) or grandchild (BT) block, and detailed relationships may be determined based on the block division result.

In the above example, the starting unit of the division is the maximum coding unit (the highest ancestor block, the maximum size that a block can have. Here, it is assumed that it is a coding unit or block. When a block is a unit of prediction or transform, it can be understood as a maximum prediction block or a maximum transform block). It is impossible to have a vertical relationship that exceeds the maximum coding unit, but a block area having a vertical relationship can be freely designated according to the encoding setting separately from the block division setting such as the maximum coding unit. In the present invention, it is assumed that a vertical relationship does not deviate from the maximum coding unit. In addition, the relationship between blocks will be described later centering on the tree-based partitioning method, but it will be mentioned in advance that the same or similar application may be possible to the index-based partitioning method.

For encoding of the target block, encoding information/reference setting of the relative block having a vertical relationship may be used. For convenience of explanation, it is assumed that the target block is a lower block of the relative block. In this case, the higher block is not an independent unit that performs encoding, prediction, transform, and the like, and may be a temporary unit composed of a plurality of lower blocks. That is, it is necessary to understand that it is a starting unit or an intermediate unit of a block partitioning process for obtaining an independent unit (i.e., an encoding/prediction/transform block, etc. in which partitioning is no longer performed) that performs encoding.

For example, a reference pixel of a relative block may be used to generate a prediction value of the target block. In detail, in intra prediction, a prediction value of the target block may be obtained by applying a method such as extrapolation, interpolation, averaging, or template matching to the reference pixel of the relative block. In addition, in inter prediction, a prediction value of the target block may be obtained by using a method such as template matching with a reference pixel of a relative block.

Here, the reference pixel of the relative block is not a pixel located in the relative block, but refers to a pixel obtained by assuming that the relative block is a unit for performing intra prediction/inter prediction. That is, it means that the pixels of the block (e.g., closest to the left, top, top-left, top-right, bottom-left direction) having a horizontal relationship to the relative block (higher block) are used for intra prediction/inter prediction of the target block (lower block).

For example, for reference setting of a target block, reference setting of a relative block may be used. In detail, in intra prediction, the MPM candidate group of the relative block may be used as the MPM candidate group of the target block. In addition, in inter prediction, a motion prediction candidate group of a relative block may be used as a motion prediction candidate group of a target block. That is, even if the candidate group is constructed based on the relative block, it means that the candidate group of the relative block may be used as it is without going through a separate candidate group construction for the target block.

In the above example, a prediction value and a reference setting are determined based on a relative block rather than a target block, and thus a problem of performing encoding using information having poor correlation with the target block may occur. However, since related information is not obtained from completely spaced apart areas, it is likely that some degree of correlation exists. Since the process to be performed in each lower block unit is integrated into one common process in the higher block, complexity can be reduced. In addition, parallel processing of lower blocks belonging to a higher block may be possible.

In the above example, the description has been made on the assumption that the relative block is one block having a vertical relationship with the target block, but there may be numerous relative blocks in the image, and at least one relative block to be used for encoding the target block must be specified.

The following shows a description of a support condition/range that a block having a vertical relationship may have, and it may be determined based on all or some of the factors mentioned in the examples to be described later.

(case 1) The higher block may be smaller than or equal to a predetermined first threshold size. Here, the first threshold size may mean a maximum size that a higher block can have. Here, the first threshold size may be expressed in terms of width (W), height (H), W×H, W*H, and the like, and W and H may be integers of 8, 16, 32, 64 or more. Here, the block having the first threshold size may be set based on the size of the maximum coding block, the maximum prediction block, and the maximum transform block.

(case 2) The lower block may be greater than or equal to a predetermined second threshold size. Here, the second threshold size may mean a minimum size that a lower block can have. Here, the second threshold size may be expressed in terms of width (W), height (H), W×H, W*H, and the like, and W and H may be integers of 4, 8, 16, 32 or more. However, the second threshold size may be set to be smaller than or equal to the first threshold size. Here, the block having the second threshold size may be set based on the size of the minimum coding block, the minimum prediction block, and the minimum transform block.

(case 3) The minimum size of the lower block may be determined based on the size of the higher block. Here, the minimum size (e.g., W % p or H>>q, etc.) of the lower block may be determined by applying a predetermined division value (p) or a shift operation value (q. right shift operation) to at least one of the width (W) or the height (H) of the higher block. Here, the division value may be an integer of 2, 4, 8 or more, and the shift operation value q may be an integer of 1, 2, 3 or more.

(case 4) The maximum size of the higher block may be determined based on the size of the lower block. Here, the maximum size (e.g., W*r or H<<s, etc.) of the higher block may be determined by applying a predetermined multiplication value (r) or a shift operation value (s. left shift operation) to at least one of the width (W) or the height (H) of the lower block. Here, the multiplication value may be an integer of 2, 4, 8 or more, and the shift operation value s may be an integer of 1, 2, 3 or more.

(case 5) The minimum size of the lower block may be determined in consideration of the size and the partition setting of the higher block. Here, the division setting may be determined by a division type (tree type), division depth (common depth, individual depth for each tree), and the like. For example, if QT is supported in the higher block, the size of the block in which partitioning is performed m times may be determined as the minimum size of the lower block, and if BT (or TT) is supported, the size of the block in which partitioning is performed n times may be determined as the minimum size of the lower block, and if QT and BT (or TT) are supported, the size of the block in which partitioning is performed l time may be determined as the minimum size of the lower block. Here, m to l may be an integer of 1, 2, 3 or more. The division depth (m) of the tree divided into smaller blocks (or divided into a larger number) (due to one dividing operation) may be set to be less than or equal to the division depth (n) of the tree that is not. In addition, the division depth (l) when the tree division is mixed may be set to be greater than or equal to the division depth (m) of a tree divided into smaller blocks, and may be set to be less than or equal to the division depth (n) of a tree that is not.

Alternatively, the maximum size of the higher block may be determined in consideration of the size and division setting of the lower block. In this description, it may be derived from the above example in reverse, and a detailed description will be omitted.

A relative block used/referenced for encoding of the target block may be determined in consideration of the following.

A relative block may be determined based on information to be used/referenced for encoding of the target block. Here, information to be used/referenced for encoding of the target block may be pixel value information for prediction and reference candidate group information related to prediction/transform/quantization/in-loop filter/entropy encoding, and the like.

In addition, the relative block may be determined based on state information of the target block and image information to which the target block belongs. Here, the state information of the target block may be defined based on a block size, a block shape, a horizontal/vertical length ratio of a block, a position in a unit such as picture/division unit (slice, tile, etc.)/maximum coding block. Here, image information to which the target block belongs may be defined based on an image type (I/P/B), a color component (Y/Cb/Cr), and the like.

The number, size, position, etc. of the relative blocks may be determined in consideration of all or some of the factors mentioned in the above example. In detail, it is possible to determine whether to use/reference information of a block having a vertical relationship for encoding of a target block, and (when used/referenced) the position and size of the relative block may be determined. Here, the position of the relative block may be expressed in a predetermined coordinate within the block (e.g., top-left coordinate), and the size of the relative block may be expressed in terms of width (W) and height (H). The relative block may be specified by combining these.

For example, if there is no special range limitation for the lower block, all lower blocks (target blocks) belonging to the relative block may use/reference encoding information of the relative block. Alternatively, if the range for the lower block is limited, if it belongs to the relative block and is larger than the size for the lower block, encoding information of the relative block may be used/referenced. In addition, when two or more relative blocks are supported, selection information of the relative block may be additionally generated.

The following shows a candidate group construction based on a block having a vertical relationship with the target block and encoding/decoding processes.

A base block for specifying a block to be referenced is determined (1). A block to be referenced for encoding information of a target block is specified based on the determined base block (2). The candidate group is constructed, in a predetermined order, using the encoding information of the specified block (3). One candidate of the candidate group is selected based on the encoding information of the target block (4). An image encoding/decoding process is performed based on the selected candidate (5).

In (1), a block (base block) serving as a criterion for constructing a candidate group relating to encoding information of the target block is determined from among the target block or a first relative block. Here, the first relative block may be a block (here, a higher block) having a vertical relationship with the target block.

In (2), when a base block is determined through the above process, a second relative block used to construct a candidate group relating to encoding information of the target block is specified. Here, the second relative block may be a block having a horizontal relationship with the base block. In (3), the candidate group is constructed, in a predetermined order, using encoding information of the second relative block specified through the above process. A description of a block having a horizontal relationship will be omitted since it can be derived not only through a candidate group construction based on a block having a horizontal relationship and encoding/decoding processes, but also through various embodiments described above.

In (4), one candidate of the candidate group is selected based on the encoding information of the target block, and in (5), an image encoding/decoding process may be performed based on this.

In this case, when the higher block and the lower block are determined based on the vertical relationship setting between the blocks, since the process of constructing a candidate group based on the higher block is performed only once, the lower block may use/borrow them. That is, the flow chart may be a configuration that can be generated in a block in which encoding/decoding is performed first. If the construction of the candidate group based on the higher block has already been completed and the base block is determined as the relative block in some orders (2, 3), the already constructed candidate group may be simply used/borrowed.

In the above example, if a candidate group is constructed based on a higher block, the lower block is described as a simple use/borrowing configuration, but is not limited thereto.

For example, even if a candidate group is constructed based on the higher block, some candidates may be fixed regardless of the lower block, and the other candidates may be adaptive based on the lower block. That is, it means that some candidates can be deleted/added/changed based on the lower block. In this case, the deletion/addition/change may be performed based on the position and size of the lower block within the higher block.

That is, even if the base block is determined as a relative block in some steps (2, 3), a candidate group in which all or some of the modifications to the already constructed candidate group are reflected may be constructed.

The target block and the relative block may be one of units of encoding/prediction/transform/quantization/in-loop filter, and the like, and the target block may be the same unit as the relative block or an upper unit. For example, when the target block is a coding block, the relative block may be a coding block, and when the target block is a coding block, the relative block may be a prediction block or a transform block.

FIG. 8 shows various arrangement examples of a relative block having a vertical relationship and a horizontal relationship with a target block.

FIG. 8 shows a case in which recursive tree-based partitioning (quad tree) is performed, and will be described centering on X, A to G, and p to t blocks. Starting from a basic coding block (CTU) with a division depth of 0, as the division depth increases, q/r/t(1), p/D/E/F/s(2), A/B/C/G/X (3) blocks may be obtained. Here, it may be classified into a block having a vertical relationship with the target block and a block having a horizontal relationship with the target block. In this case, the relative blocks (higher block) having a vertical relationship with the target block X may be p and q blocks (excluding CTU), and the relative blocks having a horizontal relationship may be A to G blocks.

Here, in the case of some relative blocks, not only blocks having a smaller value but also blocks having a larger value than the division depth (k) of the target block exist. It is assumed that the present embodiment targets the block mentioned above and the target block has the largest division depth (that is, no more divisions).

In the block division, the division result is determined according to the characteristics of the image. The block division may be minimized in a flat portion such as a background or an area with little temporal change. The block division may be performed a lot in a portion with a complex pattern or an area with rapid temporal change.

Through the above-described example of the present invention, it has been mentioned that blocks having many horizontal relationships or vertical relationships may be used/referenced for encoding of a target block. Through an example to be described later, various examples of a method of more efficiently using them by considering a block having a horizontal relationship and a block having a vertical relationship around the target block will be presented. Therefore, it is premised that the description of the above-described horizontal and vertical relationships may be applied in the same or similar manner to the content to be described later.

Next, various cases of correlation between blocks placed in a horizontal relationship according to the type (method) of block division will be described. In this case, it is assumed that QT, BT, and TT are supported as the division scheme, BT is symmetrical division (SBT), and TT is divided in a 1:2:1 ratio. In addition, it is premised that blocks placed in a general horizontal relationship may have high or low correlations (general relationship). In each case, it is assumed that only one described tree method is supported.

FIG. 9 is an exemplary diagram of block division obtained according to a tree type. Here, p to r represent examples of block division of QT, BT, and TT. It is assumed that block division is performed when the encoding of the block itself is not efficient because the characteristics of some regions in the block are different.

In the case of QT(p), it is divided into two horizontally and vertically, respectively, and it can be seen that at least one of the four sub-blocks has different characteristics. However, since 4 sub-blocks are acquired, it is not possible to know which specific sub-block has different characteristics.

For example, blocks A to D may all have different characteristics, only one of the blocks A to D may have different characteristics and the rest may have the same characteristics. Blocks A and B have the same characteristics, and blocks C and D may have the same characteristics. Blocks A and C may have the same characteristics, and blocks B and D may have the same characteristics.

If blocks A and B, blocks C and D each have the same characteristics and BT is supported, horizontal division among BT may be performed. However, if it is divided by QT like p, it can be seen that blocks A and B, blocks C and D have different characteristics from each other. However, in this example, since it is assumed that only QT is supported, the correlation between the blocks cannot be accurately figured out.

If only QT is supported and performed for a higher block with a division depth of 1 difference around the target block (one of the sub-blocks), the correlation between the target block and the relative block (a block other than the target block among the sub-blocks) may be high or low.

BT(q) is divided into two in either a horizontal or vertical direction, and it can be seen that the two sub-blocks (E and F blocks) have different characteristics. It can be derived as the above definition under the assumption that it would not have been divided if the characteristics between sub-blocks were the same or similar. If only BT is supported and performed for a higher block having a division depth of 1 difference around the target block, the correlation between the target block and the relative block may be low.

In the case of TT(r), it is divided into three in either a horizontal or vertical direction, and it can be seen that at least one of the three sub-blocks has different characteristics. However, since 3 sub-blocks are obtained, it is not possible to know which specific sub-block has different characteristics.

For example, blocks G to I may all have different characteristics. Blocks G and H have the same characteristics while block I may have different characteristics. Blocks H and I have the same characteristics while block G may have different characteristics.

If blocks G and H have the same characteristics, block I has different characteristics, and BT (asymmetric) is also supported, vertical division (3:1) among BT may be performed, but if it is divided by TT like r, it can be seen that blocks G and H and block I have different characteristics. However, since it is assumed that only TT is supported in this example, the correlation between the blocks cannot be accurately figured out. If only TT is supported and performed for a higher block with a division depth of 1 difference around the target block, the correlation between the target block and the relative block may be high or low.

It has been described above that the correlation between blocks may be high or low in the case of QT and TT among the partitioning schemes. Assume that only the partitioning scheme (e.g., QT) is supported and encoding information of the remaining subblocks except for one is known (e.g., D block). If the encoding information of the remaining subblocks A to C except the D block is the same or similar, the D block may have different characteristics and thus may be divided by QT. In this way, it is also possible to identify the correlation information by checking the encoding information of the lower block belonging to the higher block. However, since the probability of occurrence is low and it may be a complex case, a description of this will only mention the possibility and a detailed description thereof will be omitted. For reference, in the above case, since the D block has a low correlation with a block having a horizontal relationship, the encoding information of the block having a vertical relationship, which refers to the candidate group construction information of the higher block of the D block (a block including A and D), may be used/referenced.

In the above example, correlation between sub-blocks has been described when one tree division is supported for the higher block. That is, when using/referencing the encoding information of a block having a horizontal relationship for encoding of the target block, the encoding information of the relative block is more efficiently used/referenced by checking the division state (path) between the target block and the relative block. For example, when constructing a candidate group, information on a block determined to have low correlation may be excluded or a low priority may be assigned to it. Alternatively, information and reference settings of a block having a vertical relationship may be used.

In this case, the case where one tree division is supported may include a case where only one tree method is supported for block division, and even if multiple tree divisions are supported, may also include a case where only one tree division is supported by the maximum value, the minimum value, the maximum division depth of a block according to each tree method, and a block division setting in which a tree not allowed at a previous division depth is not supported at a later division depth. That is, only QT is supported and may be divided using QT, and QT/BT/TT is supported, but only BT is possible at this stage, so it may be divided using BT.

The following will be described for the case of checking the correlation between each block when multiple tree divisions are supported.

FIG. 10 is an exemplary diagram of division obtained due to QT, BT, TT. In this example, it is assumed that the maximum coding block is 64×64 and the minimum coding block is 8×8. In addition, it is assumed that the maximum value of the block that supports QT is 64×64, the minimum value is 16×16, the maximum value of the block that supports BT is 32×32, the minimum value is 4 being one of the horizontal/vertical lengths of the block, and maximum division depth is 3. In this case, it is assumed that the division setting for TT is determined together with BT (they are used in a bundle). It is assumed that QT and BT (QT, BT) are supported for the higher blocks (A to M), asymmetric BT (ABT) is additionally supported for the bottom-left blocks (N to P) (QT, BT<or, SBT>, ABT), TT is additionally supported for the bottom-right blocks (Q to S) (QT, SBT, ABT, TT).

(Base Block: Block Including B, C, D, E)

Blocks B to E may be sub-blocks that may be obtained through QT (divide once), and may be sub-blocks that may be obtained through BT (once vertical division+twice horizontal division. Or once horizontal division+twice vertical division. Number of divisions 3 times).

Since the maximum block size that supports QT is 16×16, blocks B to E cannot be obtained through QT and may be sub-blocks divided through BT. In this example, horizontal division among BT is performed (B+C/D+E), and vertical division is performed in each area (B/C/D/E). Therefore, as described above, blocks B and C, blocks D and E obtained as BT from the same higher block (parent block, division depth difference of 1) may have low correlation.

In addition, since blocks B and D or blocks C and E are divided, the correlation between blocks B and D or blocks C and E may be low. This is because if the correlation is high, only vertical division among BT is performed, and division may not be performed in each region.

In the above example, it was mentioned that the correlation between sub-blocks acquired by BT is low, but this is limited to sub-blocks belonging to the same higher block (parent block, division depth difference of 1), but in this example, the correlation between blocks may be checked by expanding to the same higher block (grandparent block, division depth difference of 2).

(Base Block: Block Including J, K, L, M)

Blocks J to M may be sub-blocks that may be obtained through QT or sub-blocks that may be obtained through BT.

Since it is a range that both QT and BT can be supported, the tree method may be selected as the optimal division type. This is the example where QT is performed. It was mentioned that the correlation between sub-blocks obtained through QT may be high or low through the above example. However, in this example, the correlation between sub-blocks may be determined differently, because a plurality of tree divisions are supported.

Each of blocks J and K or blocks L and M may have low correlation, and each of blocks J and L or blocks K and M may have low correlation. This is because if the correlation between blocks adjacent to the horizontal and vertical directions among blocks J to M is high, even if QT is not performed and BT is performed, a region with high correlation may not be divided.

In the above example, it was mentioned that the correlation between sub-blocks acquired by QT may be high or low, but this was a case where a single tree method was supported, and in this example, when a plurality of tree methods are supported, the correlation between blocks may be checked based on the number of various cases of block division.

(Base Block: Block Including N, O, P)

Blocks N to P may be sub-blocks (2:1:1 ratio) obtained through BT (once horizontal division+once horizontal division).

(when only symmetrical BT<SBT> is supported) N and O blocks may have high or low correlation. In the case of the N block, since it is acquired from the higher block through BT, the correlation with the region where the O and P blocks are bound may be low. However, it cannot be said that the N block has a low correlation with the O and P blocks. Of course, N block may have a low correlation with O and P blocks. Alternatively, the N block may have a high correlation with the O block, and may have a low correlation with the P block, and vice versa.

In this example, the asymmetric BT<ABT> may be supported. If the N and O blocks have a high correlation, the region of the N and O blocks are grouped, and the horizontal division of the asymmetric BT in a 3:1 ratio may be performed. However, since BT (SBT) is performed twice, the correlation between the N and O blocks may be low.

(Base Block: Block Including Q, R, S)

The Q to S blocks may be sub-blocks obtained through TT (once horizontal division).

(when only TT is supported) The Q and S blocks may have a high or low correlation. In this example, asymmetric BT may be supported. If the correlation between the Q and R blocks is high, the region of the Q and R blocks are grouped, and the horizontal division of the asymmetric BT in a 3:1 ratio may be performed. However, since TT is performed, the correlation between Q and R blocks may be low.

As in the above example, a correlation between a target block and a relative block having a horizontal relationship with the target block may be estimated based on the supported division method and division setting. Let's look at various cases regarding the correlation between blocks through the following.

FIGS. 11A to 11H are exemplary diagrams for checking the correlation between blocks based on a division method and division setting.

Figure 11B:
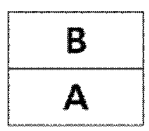
Figure 11C:
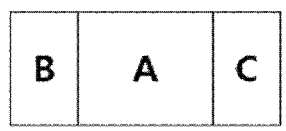

FIGS. 11A to 11C are cases in which QT, BT, and TT are respectively performed, and only QT, BT, and TT may be supported for the higher block. As described above, in the case of QT and TT, the correlation between adjacent blocks (A and B or A and C) in a horizontal or vertical direction may be high or low. This is called as a general relationship. Meanwhile, in the case of BT, the correlation between blocks A and B adjacent in a horizontal or vertical direction may be low. This is called as a special relationship.

Figure 11D:
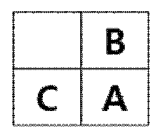

FIG. 11D is a case where QT is performed and may be a case where QT and BT can be supported. In this example, the correlation between blocks (A and B or A and C) adjacent in the horizontal or vertical direction may be a low special relationship. If the correlation is high, BT may have been applied instead of QT.

Figure 11E:
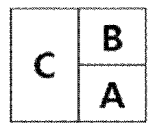

FIG. 11E is a case where BT is performed (once vertical division+once horizontal division), and may be a case where QT and BT can be supported. In the case of A and B, since they are divided from the same higher block through BT, it may be a special relationship with low correlation. In the case of A and C, if the regions below A and C are highly correlated, they may be grouped together and division may be performed. However, it may be the case divided into c because of the encoding cost. Of course, because it may be other cases, A and C may be a general relationship with high or low correlation.

Figure 11F:
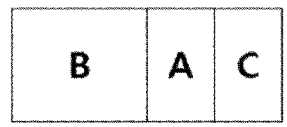

FIG. 11F is a case in which BT is performed (once vertical division+once vertical division), and may be a case where BT and TT can be supported. In the case of A and C, since they are divided from the same higher block through BT, it may be a special relationship with low correlation. In the case of A and B, there is a case where A and B are grouped together and division is performed (a part corresponding to 2 of the 1:2:1 area of TT), but additional division of the left area occurs due to TT. In this case, since it is difficult to accurately determine the correlation, A and B may have a general relationship with a high or low correlation.

Figure 11G:

FIG. 11G is a case in which TT is performed (once vertical division) and may be a case in which BT (or SBT), ABT, and TT can be supported. In this example, the correlation between blocks (A and B or A and C) adjacent in the horizontal or vertical direction may be a low special relationship. If the correlation is high, ABT may have been applied instead of TT.

Figure 11H:
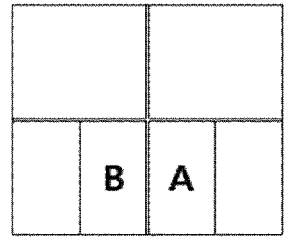

FIG. 11H is a case where QT and BT are performed (twice vertical division based on BT), and QT and BT can be supported<1>, and may be a case where additional TT can be supported<2>. In the case of A and B, in the situation of <1>, there is no case where the base block is divided in a state where A and B are tied, so the correlation may be a high or low general relationship. However, in the situation of <2>, there is a case where the base block is divided in a state where A and B are tied (after BT horizontal division, BT vertical division on the top side, TT vertical division on the bottom side), but nonetheless, it was divided using QT and BT. Therefore, it may be a special relationship with a low correlation. In this example, in order to check the relationship between blocks, the number of cases regarding block division that can be obtained from the same higher block (difference of 2 in this example) having a difference of 1 or more may be checked.

Through the various examples described above, it has been confirmed that the correlation between blocks is measured in order to use/reference a relative block having a horizontal relationship with the target block. In this case, a relative block belonging to the same space as the target block and adjacent to the target block may be targeted. In particular, the target block and the relative block may be blocks adjacent to each other in a horizontal or vertical direction.

The correlation between blocks may be grasped/estimated based on various information. For example, it is possible to check the correlation between blocks based on state information (size, shape, position, etc.) of the target block and the relative block.

Here, as an example of determining the correlation based on the size of the block, if a predetermined length (horizontal length or vertical length) of a relative block adjacent to a boundary (horizontal or vertical) in contact with the target block is greater than or equal to the predetermined length of the target block, the correlation between blocks may be very high or somewhat low, and this is referred to as a general relation A. If the predetermined length of the relative block is less than the predetermined length of the target block, the correlation between blocks may be somewhat higher or very lower, and this is referred to as a general relation B. In this case, the horizontal length of each block may be compared when touching the horizontal boundary (block on the top side) and the vertical length of each block may be compared when touching the vertical boundary (block on the left side).

Here, as an example of determining the correlation based on the shape of the block, when the target block has a rectangular shape, the correlation with the relative block adjacent to the longer boundary of the horizontal and vertical lengths is the general relation A, and the correlation with the relative block adjacent to the shorter boundary may be a general relationship B.

The above description may be some examples of determining a correlation between blocks based on state information of the block, and various examples of modifications may be possible. It may be possible to grasp the correlation between blocks based on not only the state information of the block but also various information.

The following describes the process of checking the correlation with the relative block having a horizontal relationship with the target block.

(Check Block Division Setting within Image)

<1> Various setting information about block division within an image may be checked. Supported range information, such as a maximum block size, a minimum block size, etc. of a unit such as encoding/prediction/transform (assuming that the target block is a coding unit in this example) is checked. As an example, it may be checked that the maximum coding block is 128×128 and the minimum coding block is 8×8.

<2> The supported division schemes is checked, and conditions such as the maximum block size, the minimum block size, and the maximum division depth supported by each division scheme is checked. For example, the maximum size of a block supporting QT may be 128×128, the minimum size may be 16×16, the maximum size of a block supporting BT and TT may be 128×128 and 64×64, respectively, the minimum size may be 4×4 in common, and the maximum division depth may be 4.

<3> The setting to be assigned to the division scheme, such as the priority, is checked. For example, if divided by QT, QT may be supported for a lower block (subblock) thereof, and if not divided by QT and divided by a different scheme, QT may not be supported for the lower block.

<4> When multiple division schemes are supported, conditions in which some division are prohibited may be checked in order to avoid overlapping results according to the division schemes. For example, after TT is performed, vertical division of BT may be prohibited for the center region. That is, in order to prevent overlapping division results that may occur according to each division scheme, setting information for the prohibited division in advance is checked.

By checking all or some of <1> to <4> and additional other setting information, it is possible to check block candidates that may be obtained in the image. This may be referred to identify block candidates that may be obtained according to the target block and the relative block to be described later.

(Check Information of Block)

The status information, such as the size, shape, position, etc. of the target block and the relative block, may be checked. Here, it is checked whether the position of the block is located at the boundary of a unit, such as a picture, slice, tile group, tile, brick, or block, or is located inside.

The block among the units may be set as the maximum coding block, and the maximum coding block may be a higher block (highest ancestor block) of the target block, but is a unit that is collectively partitioned in a picture unit rather than a form obtained according to characteristics of an image. Therefore, if it belongs to the maximum coding block different from the maximum coding block to which the target block belongs, the correlation between the blocks cannot be checked, so a process of checking whether it belongs to the boundary is required.

In addition, since other units such as a picture and a slice are composed of an integer multiple of the maximum coding block or have a setting that cannot be referenced, a process of checking the correlation may be performed only when it is not a boundary. In other words, the correlation may be checked only when it is not a boundary.

The size, shape, and position of the target block and the relative block may be used to check the division state of each block or the division path from which each block is obtained. A detailed description of this will be described later.

(Check Partition Status and Check Common Higher Block)

The division status of the target block and the relative block may be checked. Here, the division state may mean a division path from which each block is obtained. A process of checking a higher block of each block may be performed by checking the division status, wherein the higher block may mean a block having a vertical relationship with each block. A process of checking the higher block obtained based on state information such as size, shape, and position of each block and a division path is performed.

For example, the state information, such as (32, 32) for a target block position (on the top-left), 8×8 for width and height, p for division depth, and (QT/1-BT/h/0-BT/v/1) for division path, may be obtained. The state information, such as (24, 32) for a relative block position, 8×8 for width and height, q for division depth, and (QT/1-BT/h/0-BT/v/0) for division path, may be checked. Here, the division path may be expressed as a division scheme/division direction (h is horizontal, v is vertical, omitted if not present)/division position (0 to 3 for QT, 0 to 1 for BT, etc.).

In this example, the state information, such as (24, 32) for a position of the higher block (parent block, division depth difference of 1) of the target block, 16×8 for width and height, p−1 for division depth, and (QT/1-BT/h/0) for division path, may be obtained. In this example, the higher block (division depth of q−1) of the relative block may be the same as the higher block of the target block.

For example, the status information, such as (128, 64) for the target block position, 16×32 for width and height, p for division depth, and (QT/3-QT/2-BT/v/1) for division path, may be obtained. The state information, such as (120, 64) for the relative block position, 8×32 for width and height, q for division depth, (QT/3-QT/2-BT/v/0-BT/v/1) for division path, may be obtained.

In this example, the state information, such as (112, 64) for a position of the higher block of the target block (parent block, division depth difference of 1), 32×32 for width and height, p−1 for dividing depth, and (QT/3-QT/2) for dividing path, may be obtained.

On the other hand, the state information, such as a position (112, 64) of the higher block of the relative block (parent block, division depth difference of 1), a width and a height of 16×32, a division depth of q−1, and a division path of (QT/3-QT/2-BT/v/0), may be obtained. The state information, such as (112, 64) for a position of the higher block of the relative block (grandparent block, division depth difference of 2), 32×32 for width and height, q−2 for dividing depth, and (QT/3-QT/2) for dividing path, may be obtained, it can be seen that this is the same higher block as the higher block (parent block) of the target block.

As in the above example, a process of checking a higher block of each block may be performed based on the division state, and a process of checking a common higher block may be performed.

In summary, it is possible to check a higher block having a division depth difference of 1 or more from the target block and the relative block. As an example, a higher block having a division depth difference of c from the target block may be the same as a higher block having a division depth difference of d from the relative block. In this case, c and d may be integers of 1, 2 or more, and c and d may or may not be the same.

Here, it may be unnecessary to check the higher block having a large division depth difference because it is difficult to grasp the complexity or correlation. For example, when a higher block is common in the maximum coding block, it may be difficult to check the correlation between blocks.

To this end, a predetermined first threshold value (maximum value) for c and d may exist, and the first threshold value may be an integer of 1, 2 or more. Alternatively, a predetermined second threshold value relating to the sum of c and d may exist, and the second threshold value may be an integer of 2, 3 or more. That is, when the threshold value condition is not satisfied, the correlation between blocks is not checked.

There may be various methods for checking whether the target block and the relative block have the same higher block. For example, it may be checked by information about a predetermined position of the higher block or information on the width and the height of the block. In detail, it is possible to check whether the higher block is the same based on the top-left coordinate of the higher block and information on the width and the height of the block.

(Check Candidate that can be Obtained)

When a common higher block for the target block and the relative block is obtained, the number of cases of various block divisions that can be obtained from the corresponding higher block may be checked. This may be checked based on the block division setting and the division state of the higher block. Since this has been mentioned through various examples described above, a detailed description will be omitted.

(Check Correlation)

To check the correlation between blocks, the following may be checked in this example. In this example, it is assumed that the maximum value of the division depth difference is 2 for each block.

<1> If the higher block has a division depth difference of 1 from the target block and the relative block, the division schemes that can be supported is checked.

When only one division scheme is available, the correlation may be determined according to the division scheme. If it is QT or TT, it may be set as a general relationship (the correlation may be high or low), and if it is BT, it may be set as a special relationship.

If multiple division schemes are available, it is checked whether it is divided in a form in which the target block and the relative block are combined. If it is, it is set as a special relationship, and if it is not, it is set as a general relationship.

<2> In the case where the higher block has the division depth difference of 2 from at least one of the target block and the relative block, the division schemes that can be supported is checked.

If only one division scheme is available, it may be set as a general relationship regardless of the division scheme.

If multiple division schemes are available, it is checked whether it is divided in a form in which the target block and the relative block are combined. If it is, it is set as a special relationship, and if it is not, it is set as a general relationship.

The above examples are some cases for checking the correlation between blocks, and are not limited thereto, and various modifications and additions may be possible. It may be used/referenced for encoding of the target block by referring to the correlation between blocks checked through the above process.

In summary, in order to determine the correlation between the target block and the relative block, all or some of processes, such as (Check block division within image), (Check information of block), (Check division status and check common higher block), (Check candidate that can be obtained), (Check correlation), etc. may be used, and a process of determining the correlation may be performed in various orders instead of the order listed above. In addition, it is not limited to the above-mentioned ones, and the correlation may be determined by changing some components or combining additional components. Alternatively, a process of determining correlations of other configurations may be performed, and information of the relative block may be used/referenced for encoding of the target block based on the correlation between blocks determined through the above process.

The correlation determined through the above process may not be an absolute fact about the characteristics between blocks, and may be predictive information that estimates the correlation between blocks in consideration of block division and the like. Therefore, since it may be information that is referenced for the constructing of a candidate group for encoding information of the target block, the relative block having the low correlation may be not included in the candidate group. In consideration of the possibility that the determined correlation is not accurate, it may be to set the priority on the candidate group construction as a lower priority or the candidate group information of the higher block having a vertical relationship may be borrowed. Further, in the above example, although it is assumed that the correlation between blocks is classified into two types, two, three or more classification categories may be supported.

Whether to use/reference the correlation between blocks for encoding (construction of the candidate group, etc.) of the target block may be explicitly determined in units such as sequence, picture, slice, tile group, tile, brick, block, etc., or may be implicitly determined based on the encoding setting. Next, examples of various pieces of information constituting the encoding setting will be described.

Here, whether to refer to a correlation between blocks may be determined according to information to be used/referenced for encoding the target block. For example, the correlation between blocks may be considered for constructing an intra prediction mode candidate group, and the correlation between blocks may not be considered for constructing a candidate group for a motion vector prediction representing a non-translational motion model among inter predictions.

Here, whether to refer to a correlation between blocks may be determined based on state information of the target block and image information to which the target block belongs. Here, the state information of the target block may be defined based on a block size, a block shape, a horizontal/vertical length ratio of a block, a position in a unit such as a picture/division unit (slice, tile, etc.)/a maximum coding block. Here, image information to which the target block belongs may be defined based on an image type (I/P/B), a color component (Y/Cb/Cr), and the like. For example, a correlation between blocks may be referenced only when it has the size of a block belonging to a predetermined range, and a correlation between blocks may not be referenced when the size of a block is out of the predetermined range. In this case, the predetermined range may be defined by the first threshold size (minimum value) and the second threshold size (maximum value), and each threshold size may be expressed as W, H, W×H, W*H, based on width (W) and height (H). W and H may be integers of 1 or more, such as 4, 8, 16.

Here, whether to refer to the correlation between blocks may be determined according to the category of the relative block (which can be derived from a description of the position of the relative block having a horizontal relationship). For example, the relative block may belong to the same space as the target block and may be an adjacent block. Even if it belongs to the same space as the target block, in the case of a non-adjacent relative block, the correlation may not be referred.

The encoding setting may be defined in consideration of all or some of the factors mentioned in the above example, and accordingly, whether to refer to the correlation between blocks may be implicitly determined.

The following shows a candidate group construction based on a block having a horizontal relationship with the target block and the encoding/decoding process.

The correlation between the target block and the block in which the reference possibility exists is checked (1). A block referenced for encoding information of a target block is specified based on the correlation (2). A candidate group is constructed, in a predetermined order, using the specified encoding information (3). One candidate of the candidate group is selected based on the encoding information of the target block (4). An image encoding/decoding process is performed based on the selected candidate (5).

In (1), the correlation between the target block and the block that can be considered as a relative block is checked. In (2), a block to be used for constructing a candidate group for the encoding information of the target block is specified based on the correlation checked through (1). That is, it may mean determining whether to include as a relative block based on the checked correlation result. Of course, the contents describing the specification of the relative block having a horizontal relationship as described above may be considered together in this example.

In (3), a candidate group is constructed, according to a predetermined order, using encoding information of a relative block specified through the above process. In this case, an adaptive order that considers a relative block included or not included through (2) may be supported. In (4), one candidate of the candidate group is selected based on the encoding information of the target block, and in (5), an image encoding/decoding process may be performed based on this.

In the flowchart, a block determined to have low correlation based on a correlation may not be included as a relative block.

The following shows another example of a candidate group construction based on a block having a horizontal relationship with the target block and the encoding/decoding process.

A block to be referred to for encoding information of a target block is specified (1). The correlation between the target block and the specified block is checked (2). A predetermined order is determined based on the encoding information of the target block and the correlation checked through (2), and a candidate group is constructed accordingly (3). One candidate of the candidate group is selected based on the encoding information of the target block (4). An image encoding/decoding process is performed based on the selected candidate (5).

In (1), a relative block to be used for constructing a candidate group for encoding information of the target block is specified. In (2), the correlation between the target block and the relative block is checked. In (3), the order of inclusion of candidates may be determined based on the correlation checked through (2).

For example, if the correlation is high or low, the predefined order may be applied. If the correlation is high, the order in which the relative block has a high priority may be applied, and if the correlation is low, the order in which the relative block has a low priority may be applied.

Subsequently, in (3), after the order of constructing the candidate group is determined through the above process, the candidate group may be constructed according to the order. In (4), one candidate of the candidate group is selected based on the encoding information of the target block, and in (5), an image encoding/decoding process may be performed based on this.

In the flowchart, the order of including candidates may be adaptively set based on the correlation.

The following shows an example of a candidate group construction based on a block having a horizontal or vertical relationship with the target block and the encoding/decoding process. Here, it is assumed that the base block for specifying the referenced block is set as the target block.

The correlation between the target block and the block in which the reference possibility exists is checked (1).

(The number of blocks judged to have the low correlation with the target block is less than/the predetermined number or less)

A block referenced for encoding information of a target block is specified based on the correlation (2A). A candidate group is constructed, in a predetermined order, using the specified encoding information (3A).

(The number of blocks judged to have the low correlation with the target block exceeds/the predetermined number or greater)

The base block for specifying the referenced block is changed to a predetermined higher block (2B). A block referenced for encoding information of the target block is specified based on the changed base block (3B). A candidate group is constructed, in a predetermined order, using the encoding information of the specified block (4B).

One of the candidate groups is selected based on the encoding information of the target block (5). An image encoding/decoding process is performed based on the selected candidate group (6).

In the flowchart, one of the order (P) of 1-2A-3A-5-6 or the order (Q) of 1-2B-3B-4-5-6 may be determined according to the correlation determination result. Specifically, when there are few blocks determined to have the low correlation with the target block, the remaining block except for the corresponding block are specified as the relative block, and when there are many blocks determined to have the low correlation with the target block, a block having a horizontal relationship of the higher block is specified as a relative block by changing the base block of the candidate group construction to a higher block than the target block.

In the case of the P-order, a detailed description is omitted since some of the above-described flowchart in which the block determined to have the low correlation is not included in the relative block is the same. The Q-order may be a configuration combined with a candidate group construction based on a block having a vertical relationship. It may be an example of constructing the candidate group by changing a block unit that is the basis for the candidate group construction when the block adjacent to the target block is composed of a block with the low correlation. In the following description, redundant descriptions from the previous ones are omitted and it is focused on the differences.

In (2B), the block serving as the candidate group criterion is changed to the first relative block. Here, the first relative block may be a block (here, a higher block) having a vertical relationship with the target block.

In (3B), a second relative block used for constructing a candidate group for encoding information of the target block is specified. Here, the second relative block may be a block having a horizontal relationship with the base block, and the base block is a higher block. In (4B), the candidate group is constructed, in a predetermined order, using the encoding information of the second relative block specified through the above process Here, the criterion for determining that the correlation with the target block is low is a case of dividing by the number of blocks in the flowchart, but various criteria to be determined may be set.

Various relationships between blocks were described through the above various examples, and a case in which encoding/decoding is performed using this was described. When describing the algorithm based on the relationship between the above-described blocks in various encoding/decoding processes to be described later, it should be understood that even if a detailed description is not added, the settings suggested through the various embodiments described above may be applied in the same or similar manner.

(Inter Prediction)

In an image encoding method according to an embodiment of the present disclosure, inter prediction may be configured as follows. Inter prediction in a prediction unit may include a reference picture construction stage, a motion estimation stage, a motion compensation stage, a motion information determination stage and a motion information encoding stage. In addition, an image encoding device may be configured to include a reference picture construction unit, a motion estimation unit, a motion compensation unit, a motion information determination unit and a motion information encoding unit which implement a reference picture construction stage, a motion estimation stage, a motion compensation stage, a motion information determination stage and a motion information encoding stage. Some of the above-mentioned processes may be omitted or other process may be added, and it may be changed in other order, not in the above-mentioned order.

In an image decoding method according to an embodiment of the present disclosure, inter prediction may be configured as follows. Inter prediction in a prediction unit may include a motion information decoding stage, a reference picture construction stage and a motion compensation stage. In addition, an image decoding device may be configured to include a motion information decoding unit, a reference picture construction unit and a motion compensation unit which implement a motion information decoding stage, a reference picture construction stage and a motion compensation stage. Some of the above-mentioned processes may be omitted or other process may be added, and it may be changed in other order, not in the above-mentioned order.

As a reference picture construction unit and a motion compensation unit of an image decoding device play the same role as a configuration corresponding to an image encoding device, a detailed description is omitted and a motion information decoding unit may be performed by inversely using a method used in a motion information encoding unit. In this case, a prediction block generated in a motion compensation unit may be transmitted to an add unit.

FIG. 12 is an exemplary diagram showing a variety of cases in which a prediction block is obtained by inter prediction.

In reference to FIG. 12, unidirectional prediction may obtain a prediction block (A. forward prediction) from a reference picture which is previously encoded (T−1, T−2) or may obtain a prediction block (B. Backward prediction) from a reference picture which is subsequently encoded (T+1, T+2). Bidirectional prediction may generate a prediction block (C, D) from a plurality of reference pictures (T−2 to T+2) which are previously encoded. Generally, an image type P may support unidirectional prediction and an image type B may support bidirectional prediction.

As in the example, a picture referenced for encoding of a current picture may be obtained from a memory. A reference picture list may be configured to include, based on the current picture (T), a reference picture having a temporal order or a display order before the current picture and a reference picture having a temporal order or a display order after the current picture.

Inter prediction(E) may be performed in a current image as well as in an image before or after a current image. When inter prediction is performed in a current image, it may be referred to as Non-directional prediction. It may be supported in an image type I or in an image type P/B, and a supported image type may be determined according to an encoding setting. Performing inter prediction using a current image is different from performing inter prediction using other image to use a temporal correlation because it is to generate a prediction block by using a spatial correlation, but a prediction method (e.g., a reference image, a motion vector, etc.) between them may be the same.

In this case, it is assumed that an image type which may perform inter prediction is P and B, but it may be also applied to other various image types which are added or substituted. For example, a predetermined image type may not support intra prediction and may support only inter prediction, and may support only inter prediction in a predetermined direction (backward) and only inter prediction in a predetermined direction.

A reference picture construction unit may configure and manage a reference picture used to encode a current picture through a reference picture list. At least one reference picture list may be configured according to an encoding setting (e.g., an image type, a prediction direction, etc.) and a prediction block may be generated from a reference picture included in a reference picture list.

For unidirectional prediction, inter prediction may be performed using at least one reference picture included in a reference picture list 0(L0) or in a reference picture list1 (L1). In addition, for bidirectional prediction, inter prediction may be performed using at least one reference picture included in a combined list(LC) generated by combining L0 and L1.

For example, unidirectional direction may be classified into forward prediction (Pred_L0) using a forward reference picture list (L0) and backward prediction (Pred_L1) using a backward reference picture list (L1). Bidirectional prediction (Pred_BI) may use both a forward reference picture list (L0) and a backward reference picture list (L1).

Alternatively, performing two or more forward predictions by copying a forward reference picture list (L0) to a backward reference picture list (L1) to may be included in bidirectional prediction. Performing two or more backward predictions by copying a backward reference picture list (L1) to a forward reference picture list (L0) may be included in bidirectional prediction.

The prediction direction may be represented by flag information (e.g., inter_pred_idc. It is assumed that this value may be adjusted by predFlagL0, predFlagL1, predFlagBI) indicating a corresponding direction. predFlagL0 represents whether forward prediction is performed and predFlagL1 represents whether backward prediction is performed. Whether bidirectional prediction is performed may be represented by predFlagBI or by activating predFlagL0 and predFlagL1 at the same time (e.g., when each flag is 1).

In the present disclosure, a case of unidirectional prediction of forward prediction using a forward reference picture list is mainly described, but it may be also applied to the other case equally or with modification.

Generally, a method in which an optimum reference picture for a picture to be encoded is determined in an encoder and information on the corresponding reference picture is explicitly transmitted to a decoder may be used. For it, a reference picture construction unit may perform management on a picture list referenced for inter prediction of a current picture and set a rule for reference picture management by considering a limited memory size.

The transmitted information may be defined as RPS (Reference Picture Set), and a picture selected from RPS may be classified as a reference picture and stored in a memory (or DPB) and pictures not selected from RPS may be classified as a non-reference picture and removed from a memory after a certain time period. The preset number of pictures (e.g., 14, 15, 16, or more pictures) may be stored in a memory and a memory size may be set according to a level and image resolution.

FIG. 13 is an exemplary diagram configuring a reference picture list according to an embodiment of the present disclosure.

In reference to FIG. 13, generally, a reference picture (T−1, T−2) which exists before a current picture may be assigned to L0 and managed and a reference picture (T+1, T+2) which exists after a current picture may be assigned to L1 and managed. A reference picture of L1 may be assigned when the allowable number of reference pictures of L0 is not reached in configuring L0. Similarly, a reference picture of L0 may be assigned when the allowable number of reference pictures of L1 is not reached in configuring L1.

In addition, a current picture may be included in at least one reference picture list. For example, a current picture may be included in L0 or L1, and L0 may be configured by adding a reference picture (or a current picture) whose temporal order is T to a reference picture before a current picture and L1 may be configured by adding a reference picture whose temporal order is T to a reference picture after a current picture.

A reference picture list configuration may be determined according to an encoding setting.

A current picture may be managed in a separate memory distinguished from a reference picture list without being included in a reference picture list or a current picture may be managed by being included in at least one reference picture list.

For example, it may be determined by a signal (curr_pic_ref_enabled_flag) indicating whether a current picture is included in a reference picture list. In this case, the signal may be information which is implicitly determined or explicitly generated.

In detail, when the signal is deactivated (e.g., curr_pic_ref_enabled_flag=0), a current picture may not be included as a reference picture in all of reference picture list and when the signal is activated (e.g., curr_pic_ref_enabled_flag=1), whether a current picture is included in a predetermined reference picture list may be implicitly determined (e.g., it may be added only to L0, only to L1 or to L0 and L1 at the same time) or may be explicitly determined by generating a related signal (e.g., curr_pic_ref_from_l0_flag, curr_pic_ref_from_l1_flag). The signal may be supported in a unit of a video, a sequence, a picture, a slice, a tile group, a tile, a brick, etc.

In this case, a current picture may be positioned at the first or the last of a reference picture list as in FIG. 13 and an arrangement order in a list may be determined according to an encoding setting (e.g., image type information, etc.) For example, it may be positioned first in case of an I type and it may be positioned last in case of a P/B type, and an example for other modifications may be possible without being limited thereto.

Alternatively, a separate reference picture memory may be supported according to a signal (ibc_enabled_flag) indicating whether block matching (or template matching) is supported in a current picture. In this case, the signal may be information which is implicitly determined or explicitly generated.

In detail, when the signal is deactivated (e.g., ibc_enabled_flag=0), it may mean that block matching is not supported in a current picture and when the signal is activated (e.g., ibc_enabled_flag=1), block matching may be supported in a current picture and a reference picture memory therefor may be supported. In this example, it is assumed that an additional memory is provided, but it may be also set to directly support block matching in the existing memory supported for a current picture without providing an additional memory.

A reference picture construction unit may include a reference picture interpolation unit and whether an interpolation process for a pixel in a decimal unit is performed may be determined according to interpolation precision of inter prediction. For example, when having interpolation precision in an integer unit, a reference picture interpolation process may be omitted and when having interpolation precision in a decimal unit, a reference picture interpolation process may be performed.

An interpolation filter used in a reference picture interpolation process may be determined according to an encoding setting, and one preset interpolation filter {e.g., DCT-IF (Discrete Cosine Transform Based Interpolation Filter), etc.} may be used or one of a plurality of interpolation filters may be used, and for the former, selection information on an interpolation filter may be implicitly omitted and for the latter, selection information on an interpolation filter may be included in a unit of a video, a sequence, a picture, a slice, a tile group, a tile, a brick, etc. For the latter, information on an interpolation filter (e.g., filter coefficient information, etc.) may be also information which may be explicitly generated.

The same type of filter may be used according to an interpolation position (e.g., a decimal unit such as ½, ¼, ⅛). For example, filter coefficient information may be obtained, from one filter equation, according to an interpolation position. Alternatively, a different type of an interpolation filter may be used according to an interpolation position. For example, a 6-tap Wiener filter may be applied to a ½ unit, a 8-tap Kalman filter may be applied to a ¼ unit and a linear filter may be applied to a ⅛ unit.

Interpolation precision (the maximum precision that interpolation is performed) may be determined according to an encoding setting and it may be one precision of an integer unit or a decimal unit (e.g., ½, ¼, ⅛, 1/16, 1/32, etc.) In this case, interpolation precision may be determined according to an image type, a reference picture setting, a supported inter prediction method, etc.

For example, interpolation precision may be set as an integer unit in an image type I and may be set as a decimal unit in an image type P/B. Alternatively, when a current picture is included in reference pictures, it may be set as one of an integer unit or a decimal unit according to a picture to be referenced. Alternatively, when block matching or template matching is supported for a current picture, it may be set as one of an integer unit or a decimal unit and otherwise, it may be set as a decimal unit.

Alternatively, an interpolation process may be performed by selecting one of a plurality of interpolation precision and when an interpolation process according to adaptive interpolation precision is supported (e.g., when adaptive_ref_resolution_enabled_flag is 0, preset interpolation precision is used and when adaptive_ref_resolution_enabled_flag is 1, one of a plurality of interpolation precision is used), precision selection information (e.g., ref_resolution_idx) may be generated.

The interpolation precision-related setting and information (e.g., whether adaptive interpolation precision is supported, precision selection information, etc.) may be implicitly determined or explicitly generated and the setting and information may be included in a unit of a video, a sequence, a picture, a slice, a tile group, a tile, a brick, etc. Alternatively, whether adaptive interpolation precision is supported, precision selection information, a precision candidate group, etc. may be determined based on an encoding setting defined by one or more encoding elements of an image type, a reference picture setting, a supported intra prediction method, a supported motion model, etc.

A motion estimation and compensation process may be performed according to interpolation precision and a representation unit and a storage unit for a motion vector may be also determined based on interpolation precision.

For example, when interpolation precision is a ½ unit, a motion estimation and compensation process may be performed in a ½ unit and a motion vector may be represented in a ½ unit and may be used in an encoding process. In addition, a motion vector may be stored in a ½ unit and referenced in a motion information encoding process of other block.

Alternatively, when interpolation precision is a ⅛ unit, a motion estimation and compensation process may be performed in a ⅛ unit and a motion vector may be represented in a ⅛ unit, used in an encoding process and stored in a ⅛ unit.

In addition, a motion estimation and compensation process and a motion vector may be performed, represented and stored in a unit different from interpolation precision such as a ½ unit, a ¼ unit, etc. and it may be adaptively determined according to an inter prediction method/setting (e.g., a motion estimation/compensation method, a motion model, a motion information encoding mode<the after-mentioned content>, etc.)

In an example, when it is assumed that interpolation precision is a ⅛ unit, for a translation motion model, a motion estimation and compensation process may be performed in a ¼ unit and a motion vector may be represented in a ¼ unit (This example assumes a unit in an encoding process) and stored in a ⅛ unit. For a non-translation motion model, a motion estimation and compensation process may be performed in a ⅛ unit and a motion vector may be represented in a ¼ unit and stored in a ⅛ unit.

In an example, when it is assumed that interpolation precision is a ⅛ unit, for block matching, a motion estimation and compensation process may be performed in a ¼ unit and a motion vector may be represented in a ¼ unit and stored in a ⅛ unit. For template matching, a motion estimation and compensation process may be performed in a ⅛ unit and a motion vector may be represented in a ⅛ unit and stored in a ⅛ unit.

In an example, when it is assumed that interpolation precision is a 1/16 unit, for a competition mode, a motion estimation and compensation process may be performed in a ¼ unit and a motion vector may be represented in a ¼ unit and stored in a 1/16 unit. For a merge mode, a motion estimation and compensation process may be performed in a ⅛ unit and a motion vector may be represented in a ¼ unit and stored in a 1/16 unit. For a skip mode, a motion estimation and compensation process may be performed in a 1/16 unit and a motion vector may be represented in a ¼ unit and stored in a 1/16 unit.

In summary, motion estimation and compensation and a representation and storage unit of a motion vector may be adaptively determined based on an inter prediction method or setting and interpolation precision. In detail, it may be general that motion estimation and compensation and a representation unit of a motion vector are adaptively determined based on an inter prediction method or setting and a storage unit of a motion vector is determined based on interpolation precision, but an example for various modifications may be possible without being limited thereto. In addition, the example according to one category (e.g., a motion model, a motion estimation/compensation method, etc.), but it may be also possible to mix two or more categories and determine the setting.

In addition, as mentioned above, interpolation precision information has a preset value or is selected as one of a plurality of precision, but inversely, reference picture interpolation precision may be determined according to a motion estimation and compensation setting supported according to an inter prediction method or setting. For example, when a translation motion model supports up to a ⅛ unit and a non-translation motion model supports up to a 1/16 unit, an interpolation process may be performed according to a precision unit of a non-translation motion model with the highest precision.

In other words, reference picture interpolation may be performed according to a setting on precision information supported for a translation motion model, a non-translation motion model, a competition mode, a merge mode, a skip mode, etc. In this case, the precision information may be implicitly or explicitly determined and when related information is explicitly generated, it may be included in a unit of a video, a sequence, a picture, a slice, a tile group, a tile, a brick, etc.

A motion estimation unit performs a process of estimating (or searching) which block of which reference picture has a high correlation with a target block. A size and a shape (M×N) of a target block that prediction is performed may be obtained from a block partition unit. In an example, a target block may be determined in a range of 4×4 to 128×128. It may be general that inter prediction is performed in a unit of a prediction block, but it may be performed in a unit of a coding block, a transform block, etc. according to a setting of a block partition unit. At least one motion estimation method may be used while performing estimation in an available range of a reference region. An estimation order and condition, etc. in a unit of a pixel may be defined in a motion estimation method.

Motion estimation may be performed based on a motion estimation method. For example, a region to be compared for a motion estimation process may be a target block in case of block matching and may be a predetermined region (template) which is set based on a base block in case of template matching. For the former, a block with the highest correlation with a target block may be found in an available range of a reference region and for the latter, a region with as the highest correlation with a template defined according to an encoding setting may be found in an available range of a reference region.

In this case, the template may be set in one or more of adjacent blocks such as a left, a top, a top-left, a top-right, a bottom-left block, etc. based on a base block. The adjacent block may be a block which has been encoded. In an example, when a base block is M×N, M×h and v×N may be configured as a template in a top and a left of a base block, respectively. In this case, a template may have a setting such as one predefined fixed region (for the example, a left and a top block) and length (w, h), etc. or may have an adaptive setting according to an encoding setting. In this case, an encoding setting may be defined by a size, a shape, a position, an aspect ratio, an image type, a color component, etc. of a base block. Alternatively, information on the template region, length, etc. may be explicitly generated in a unit of a video, a sequence, a picture, a slice, a tile group, a tile, a brick, etc. or may be implicitly determined according to an encoding setting.

In this case, block matching may be one of methods which explicitly generate all or some of motion information and template matching may be one of methods which implicitly obtain all or some of motion information. Motion information (or a motion information type) which is explicitly or implicitly generated or obtained in the motion estimation method may be determined by an inter prediction setting and an inter prediction setting may be defined by a motion model, a motion information encoding mode, etc. In this case, for template matching, information based on an estimation start position, modification information (related to a x and y vector) of a motion vector that final estimation is completed, etc. may be implicitly determined, but related information may be explicitly generated.

Information on a supportable range of template matching may be explicitly generated or implicitly determined according to an encoding setting. In this case, the encoding setting may be defined by one or more elements of a size, a shape, a position, an image type, a color component, etc. of a target block. In an example, template matching may be supported in a range of A×B to C×D, and A to D may be an integer such as 4, 8, 16, 32, 64, or more, and A and B may be smaller than or the same as C and D. respectively. In addition, a support range of template matching may belong to a support range of block matching or an exceptional configuration (e.g., when the minimum size of a block is smaller) is enabled.

When a plurality of motion estimation methods are supported (e.g., when adaptive_motion_comp_enabled_flag. is 0, one preset motion estimation method is used and when adaptive_motion_comp_enabled_flag. is 1, one of a plurality of motion estimation methods is used), motion estimation method selection information may be generated and it may be included in a unit of a block. For example, when motion_comp_idx is 0 in a predetermined partition unit of a picture, a slice, etc., only block matching is supported and when motion_comp_idx is 1, block matching and template matching are supported. Alternatively, in case of being 0 in a unit of a block, block matching is supported, and in case of being 1 in a unit of a block, template matching is supported. As above, a plurality of related selection information may be generated according to an unit, But a candidate indicated by the corresponding information may have a different meaning)

The above example may be a configuration in which classification (selection) of a motion estimation method is preceded in a unit of a block. In an example, when template matching is selected, there may be no information to be additionally confirmed or a merge mode, a competition mode may be supported as a candidate for a motion information encoding mode. In this case, when a merge mode is selected, a motion vector that final estimation is completed may be set as a motion vector of a target block and when a competition mode is selected, offset information for modifying a motion vector obtained by final estimation in a horizontal or vertical direction is additionally generated, and a motion vector resulting from adding offset information to the motion vector obtained by final estimation may be set as a motion vector of the target block.

Alternatively, template matching may be supported by being included as some of inter prediction configurations. In an example, a motion information encoding mode on template matching may be supported and it may be supported by being included as a candidate in a motion information prediction candidate group configured in a predetermined motion information encoding mode. For the former, it may be a configuration that template matching is performed by classification (selection) of a motion information encoding mode and for the latter, it may be a configuration that template matching is performed by selecting one candidate of a motion information prediction candidate group for representing the optimum motion information in a predetermined motion information encoding mode.

A template in the above example may be set based on a base block and a base block may be a coding block or a prediction block (or a transform block). It was described that when a coding block is determined by a block partition unit, it may be set as a prediction block as it is or it may be partitioned into two or more prediction blocks. In this case, when a coding block is not partitioned or is partitioned into two or more prediction blocks (e.g., a non-square or a right-angled triangle) to perform inter prediction, it is referred to as inter prediction in a unit of a sub-block. In other words, a base block may be set as a coding block or a prediction block and a template may be set based on a base block.

In addition, a base block for a template setting besides the above-mentioned unit may be supported. In an example, a block in a vertical relationship or in a horizontal relationship with a base block may be a target.

In detail, it may be assumed that a coding block is a target block and a higher block with a vertical relationship with a coding block is a relative block<1>. Alternatively, it may be assumed that a coding block is a target block and a block with a horizontal relationship with a coding block is a relative block. In this case, the coding block may be changed into a prediction block and applied. In addition, it may be assumed that a prediction block is a target block and a coding block is a relative block. In the after-mentioned example, a case in <1> is assumed.

A method of configuring a template by setting a base block among a plurality of candidate blocks may be explicitly determined by information on whether to support in a unit of a sequence, a picture, a slice, a tile group, a tile, a brick, a block, etc. (for 0, no support and for 1, support) and when the corresponding information is not confirmed, a predefined value (0 or 1) may be assigned to it. Alternatively, whether to support may be implicitly determined and it may be determined based on an encoding setting. In this case, the encoding setting may be defined by one or more elements of status information such as a size, a shape, a position, etc. of a block (a target block), an image type(I/P/B), a color component, whether inter prediction in a unit of a sub-block is applied, etc.

For example, when a size of a target block is greater than or the same as the predetermined first threshold value, a method of setting a base block among a plurality of candidate blocks may be supported. Alternatively, when a size of a target block is smaller than or the same as the predetermined second threshold value, the method may be supported. In this case, a threshold size may be represented as W, H, W×H, W*H with a width (W) and a height (H), and as a pre-promised value in an encoding/decoding device, W and H may be an integer equal to or greater than 1 such as 4, 8, 16. When it is represented as a sum of a width and a height, W*H may be an integer such as 16, 32, 64, or more. The first threshold size is smaller than or the same as the second threshold size. In this case, when the method is not supported, it means that a base block is set as a predefined block (a target block).

When a plurality of candidate blocks are supported, a candidate block (a relative block) may be variously defined.

(When a coding block is a target block) A relative block (e.g., a higher block) may be a block whose partition depth is smaller than that of a coding block by 1 or more. Alternatively, it may be a block with a predetermined width (C) and height (D) at a predetermined top-left coordinate (e.g., positioned at a left or a top of a top-left coordinate of a target block). In this case, C and D may be an integer such as 8, 16, 32, or more and may be greater than or the same as a width and a height of a target block. In addition, C and D may be determined based on information on a block size (e.g., the maximum size of a transform block, the maximum size of a coding block, etc.)

When a plurality of candidate blocks are supported, candidate selection information may be explicitly generated and the corresponding candidate block may be set as a base block. Alternatively, a base block may be implicitly determined and it may be based on an encoding setting.

For example, when a plurality of candidate blocks are determined to be supported by an encoding setting (the first category), a relative block may be set as a base block and otherwise (the second category), a target block may be set as a base block.

Alternatively, when belonging to the first category by an encoding setting, a target block may be set as a base block, and when belonging to the second category, the first relative block (e.g., a higher block) may be set as a base block, and when belonging to the third category, the second relative block (e.g., an adjacent block) may be set as a base block. In addition, when some of the categories are substituted or added, information selecting one of a target block and a relative block may be generated.

The encoding setting may be defined by one or more elements of status information such as a size, a shape, an aspect ratio, a position, etc. of a target block, an image type, a color component, whether inter prediction in a unit of a sub-block is applied, etc.

In summary, a base block may be set among a variety of candidate blocks including a target block and it may be explicitly or implicitly determined. The example describes that a base block for a template setting may be variously set, but it may be applied to a variety of cases for inter prediction. In other words, the description may be equally or similarly applied to a base block setting for a configuration of a motion information prediction candidate group, etc. in the after-mentioned inter prediction. But, it should be understood that a definition on a base block or a support range, etc. in the example may be equally or differently set.

Motion estimation may be performed based on a motion model. Motion estimation and compensation may be performed by using an additional motion model besides a translation motion model considering only parallel translation. For example, motion estimation and compensation may be performed by using a motion model considering a motion such as rotation, perspective, zoom-in/out, etc. as well as parallel translation. It may be supported to improve encoding performance by generating a prediction block where the various types of motions generated according to a regional feature of an image are reflected.

FIG. 14 is a conceptual diagram showing a non-translation motion model according to an embodiment of the present disclosure. In reference to FIG. 14, as some of examples on an affine model, an example in which motion information is represented based on motion vectors $V_0$ and $V_1$ at a predetermined position is described. Because a motion may be represented based on a plurality of motion vectors, accurate motion estimation and compensation may be possible.

As in the example, inter prediction may be performed based on a predefined motion model, but inter prediction based on an additional motion model may be also supported. In this case, it is assumed that a predefined motion model is a translation motion model and an additional motion model is an affine model, but various modifications may be possible without being limited thereto.

A translation motion model may represent motion information (assuming unidirectional prediction) based on one motion vector, and it is assumed that a control point (a base point) for representing motion information is a top-left coordinate, but it is not limited thereto.

A non-translation motion model may be represented by motion information of various configurations. This example assumes a configuration which is represented by additional information in addition to one motion vector (based on a top-left coordinate). Some of motion estimation and compensation mentioned in the after-mentioned example may not be performed in a unit of a block and may be performed in a predetermined unit of a sub-block. In this case, a predetermined size and position of a sub-block may be determined based on each motion model.

FIG. 15 is an exemplary diagram showing motion prediction in a unit of a sub-block according to an embodiment of the present disclosure. In detail, motion prediction in a unit of a sub-block according to an affine model (2 motion vectors) is described.

For a translation motion model, a motion vector in a unit of a pixel included in a target block may be the same. In other words, it may have a motion vector applied equally in a unit of a pixel and perform motion estimation and compensation by using one motion vector ($V_0$).

For a non-translation motion model (an affine model), a motion vector in a unit of a pixel included in a target block may not be the same and a separate motion vector in a unit of a pixel may be needed. In this case, a motion vector in a unit of a pixel or in a unit of a sub-block may be derived based on motion vectors ($V_0$, $V_1$) at a predetermined control point position of a target block and motion estimation and compensation may be performed by using the derived motion vectors.

For example, a motion vector in a unit of a sub-block or a pixel in a target block {e.g., ($V_x$, $V_y$)} may be derived by an equation according to $V_x=(V_{1x}-V_{0x})\times x/M-(V_{1y}-V_{0y})\times y/N+V_{0x}$, $V_y=(V_{1y}-V_{0y})\times x/M+(V_{1x}-V_{0x})\times y/N+V_{0y}$. In the Equation, $V_0$ {($V_{0X}$, $V_{0Y}$} in this example) is a motion vector at a top-left of a target block and $V_1$ {($V_{1X}$, $V_{1Y}$} in this example) is a motion vector at a top-right of a target block. Motion estimation and motion compensation of a non-translation motion model may be performed in a unit of a sub-block by considering complexity.

In this case, a size of the sub-block (M×N) may be determined according to an encoding setting and may have a fixed size or may be set as an adaptive size. In this case, M and N may be an integer such as 2, 4, 8, 16, or more and M and N may be the same or not. A size of the sub-block may be explicitly generated in a unit of a sequence, a picture, a slice, a tile group, a tile, a brick, etc. Alternatively, it may be implicitly determined by a common promise between an encoder and a decoder or may be determined by an encoding setting.

In this case, an encoding setting may be defined by one or more elements of status information such as a size, a shape, a position, etc. of a target block, an image type, a color component, inter prediction setting information (e.g., a motion information encoding mode, reference picture information, interpolation precision, a motion model<type>, etc.), etc.

The above example described a process in which a size of a sub-block according to some non-translation motion models is derived and motion estimation and compensation are performed based on it. As in the example, motion estimation and compensation in a unit of a sub-block or a pixel according to a motion model may be performed and a detailed description thereon is omitted.

Next, a variety of examples on motion information configured according to a motion model will be described.

In an example, a motion model representing a rotation motion may represent a translation motion of a block with one motion vector and may represent a rotation motion with rotation angle information. Rotation angle information may be measured based (0 degrees) on a predetermined position (e.g., a top-left coordinate) and may be represented by k candidates (k is an integer such as 1, 2, 3, or more) with a predetermined interval (e.g., an angle difference value is 0 degrees, 11.25 degrees, 22.25 degrees, etc.) in a predetermined angle range (e.g., between −90 degrees and 90 degrees).

In this case, rotation angle information may be encoded as it is in a motion information encoding process or may be encoded (e.g., prediction+difference value information) based on motion information (e.g., a motion vector, rotation angle information) of an adjacent block.

Alternatively, a translation motion of a block may be represented by one motion vector and a rotation motion of a block may be represented by one or more additional motion vectors. In this case, the number of additional motion vectors may be an integer such as 1, 2, or more, and a control point of an additional motion vector may be determined among a top-right, bottom-left or bottom-right coordinates or other coordinate in a block may be set as a control point.

In this case, an additional motion vector may be encoded as it is in a motion information encoding process or may be encoded (e.g., prediction+difference value information) based on motion information (e.g., a motion vector according to a translation motion model or a non-translation motion model) of an adjacent block or may be encoded (e.g., prediction+difference value information) based on other motion vector in a block representing a rotation motion.

In an example, for a motion model representing a size adjustment or scaling motion such as a zoom-in/out situation, it may represent a translation motion of a block with one motion vector and may represent a size adjustment motion with scaling information. Scaling information may be represented by scaling information representing an expansion or a reduction of a horizontal or vertical direction based on a predetermined position (e.g., a top-left coordinate).

In this case, scaling may be applied in at least one of a horizontal or a vertical direction. In addition, scaling information applied in each of horizontal and vertical directions may be supported or scaling information commonly applied may be supported. A position for motion estimation and compensation may be determined by adding a width and a height of the scaled block to a predetermined position (a top-left coordinate).

In this case, scaling information may be encoded as it is in a motion information encoding process or may be encoded (e.g., prediction+difference value information) based on motion information (e.g., a motion vector, scaling information) of an adjacent block.

Alternatively, a translation motion of a block may be represented by one motion vector and size adjustment of a block may be represented by one or more additional motion vectors. In this case, the number of additional motion vectors may be an integer such as 1, 2, or more, and a control point of an additional motion vector may be determined among top-right, bottom-left or bottom-right coordinates or other coordinate in a block may be set as a control point.

In this case, an additional motion vector may be encoded as it is in a motion information encoding process or may be encoded (e.g., prediction+difference value information) based on motion information (e.g., a motion vector according to a translation motion model or a non-translation motion model) of an adjacent block or may be encoded (e.g., prediction+difference value information) based on a predetermined coordinate (e.g., a bottom-right coordinate) in a block.

The above example described a case on representation for representing some of motions and it may be represented as motion information for representing a plurality of motions.

For example, for a motion model representing various or complex motions, it may represent a translation motion of a block with one motion vector, represent a rotation motion with rotation angle information and represent size adjustment with scaling information. A description on each motion may be derived by the above-mentioned example, so a detailed description is omitted.

Alternatively, it may represent a translation motion of a block with one motion vector and represent other motion of a block with one or more additional motion vectors. In this case, the number of additional motion vectors may be an integer such as 1, 2, or more, and a control point of an additional motion vector may be determined among top-right, bottom-left or bottom-right coordinates or other coordinate in a block may be set as a control point.

In this case, an additional motion vector may be encoded as it is in a motion information encoding process or may be encoded (e.g., prediction+difference value information) based on motion information (e.g., a motion vector according to a translation motion model or a non-translation motion model) of an adjacent block or may be encoded (e.g., prediction+difference value information) based on other motion vector of a block representing various motions.

The description may be about an affine model and a case in which the number of additional motion vectors is 1 or 2 is mainly described. In summary, the usage number of motion vectors according to a motion model may be 1, 2, 3 and it is assumed that it may be considered as an individual motion model according to the number of motion vectors used to represent motion information. In addition, when the number of motion vectors is 1, it is assumed that it is a predefined motion model.

A plurality of motion models for inter prediction may be supported and may be determined by a signal (e.g., adaptive_motion_mode_enabled_flag) indicating support for an additional motion model. In this case, when the signal is 0, a predefined motion model may be supported and when the signal is 1, a plurality of motion models may be supported. The signal may be generated in a unit of a video, a sequence, a picture, a slice, a tile group, a tile, a brick, a block, etc., but when separate confirmation for the signal is impossible, a value of the signal may be assigned according to a predefined setting. Alternatively, whether to support may be implicitly determined based on an encoding setting. Alternatively, a case of being implicit or explicit may be determined according to an encoding setting. In this case, an encoding setting may be defined by one or more elements of an image type, an image category (e.g., for 0, a general image and for 1, a 360-degree image), a color component, etc.

Whether a plurality of motion models are supported may be determined in the above process. Next, it is assumed that two or more motion models are additionally supported and a plurality of motion models are determined to be supported in a unit of a sequence, a picture, a slice, a tile group, a tile, a brick, etc., but there may be some exceptional configurations. In the after-mentioned example, it is assumed that motion models A, B, C may be supported, and A is a motion model which is basically supported and B and C are a motion model which may be additionally supported.

Configuration information on a supported motion model may be generated in the above unit. In other words, a supported motion model configuration such as {A, B}, {A, C}, {A, B, C} may be possible.

For example, an index (0~2) may be assigned to a candidate of the configuration and selected. When an index of 2 is selected, a motion model configuration that {A, C} are supported may be determined and when an index of 3 is selected, a motion model configuration that {A, B, C} are supported may be determined.

Alternatively, information representing whether a predetermined motion model is supported may be separately supported. In other words, a flag on whether B is supported or a flag on whether C is supported may be generated. When both two flags are 0, it may be a case in which only A may be supported. This example may be an example in which it is processed without generating information representing whether a plurality of motion models are supported.

As in the above example, when a candidate group of a supported motion model is configured, one motion model of the candidate group may be explicitly determined and used or may be implicitly used in a unit of a block.

Generally, a motion estimation unit may be a configuration which exists in an encoding device, but it may be a configuration which may be included in a decoding device according to a prediction method (e.g., template matching, etc.). For example, for template matching, it is because motion information of a target block may be obtained by performing motion prediction based on an adjacent template of a target block in a decoder. In this case, information related to motion estimation (e.g., a motion estimation range, a motion estimation method<a scanning order>, etc.) may be implicitly determined or explicitly generated and may be included in a unit of a video, a sequence, a picture, a slice, a tile group, a tile, a brick, etc.

A motion compensation unit performs a process for obtaining data of some blocks of some reference pictures determined in a motion estimation process as a prediction block of a target block. In detail, a prediction block of a target block may be generated from at least one region (or block) of at least one reference picture based on motion information (e.g., reference picture information, motion vector information, etc.) obtained in a motion estimation process.

Motion compensation may be performed based on a motion compensation method as follows.

For block matching, data in a region corresponding to the right by M and to the bottom by N based on a coordinate $(P_x+V_x, P_y+V_y)$ obtained by a motion vector $(V_x, V_y)$ of a target block (M×N) which is explicitly obtained in a reference picture and a top-left coordinate $(P_x, P_y)$ of a target block may be compensated as a prediction block of a target block.

For template matching, data in a region corresponding to the right by M and to the bottom by N based on a coordinate $(P_x+V_x, P_y+V_y)$ obtained by a motion vector $(V_x, V_y)$ of a target block (M×N) which is implicitly obtained in a reference picture and a top-left coordinate $(P_x, P_y)$ of a target block may be compensated as a prediction block of a target block.

In addition, motion compensation may be performed based on a motion model as follows.

For a translation motion model, data in a region corresponding to the right by M and to the bottom by N based on a coordinate $(P_x+V_x, P_y+V_y)$ obtained by one motion vector $(V_x, V_y)$ of a target block (M×N) which is explicitly obtained in a reference picture and a top-left coordinate $(P_x, P_y)$ of a target block may be compensated as a prediction block of a target block.

For a non-translation motion model, data in a region corresponding to the right by M/m and to the bottom by N/n based on a coordinate $(P_{mx}+V_{nx}, P_{my}+V_{ny})$ obtained by motion vectors $(V_{mx}, V_{my})$ of m×n sub-blocks which is implicitly obtained by a plurality of motion vectors $(V_{0x}, V_{0y})$, $(V_{1x}, V_{1y})$ of a target block (M×N) which is explicitly obtained in a reference picture and a top-left coordinate $(P_{mx}, P_{ny})$ of each sub-block may be compensated as a prediction block of a target block. In other words, it is possible to make compensation with a prediction block of a target block by collecting prediction blocks of the sub-blocks.

In a motion information determination unit, a process for selecting the optimum motion information of a target block may be performed. Generally, the optimum mode information may be determined in terms of an encoding expense by using block distortion {e.g., Distortion of a target block and a reconstructed block. SAD (Sum of Absolute Difference), SSD (Sum of Square Difference), etc.} and a rate-distortion method that the amount of generated bits according to the corresponding motion information is considered. A prediction block generated based on motion information determined in the above process may be transmitted to a subtraction unit and an add unit. In addition, it may be a configuration which may be included in a decoding device according to some prediction methods (e.g., template matching, etc.) and in this case, it may be determined based on block distortion.

For the motion information determination unit, setting information related to inter prediction such as a motion compensation method, a motion model, etc. may be considered. For example, when a plurality of motion compensation methods are supported, motion compensation method selection information and a resulting motion vector, reference picture information, etc. may be the optimum motion information. Alternatively, when a plurality of motion models are supported, motion model selection information and a resulting motion vector, reference picture information, etc. may be the optimum motion information.

In a motion information encoding unit, motion information of a target block obtained in the motion information determination process may be encoded. In this case, motion information may be configured with information on an image and a region referenced for prediction of a target block. In detail, it may be configured with information on a referenced image (e.g., reference image information, etc.) and information on a referenced region (e.g., motion vector information, etc.).

In addition, setting information related to inter prediction (or, selection information, etc. e.g., a motion estimation/compensation method, selection information of a motion model, etc.) may be also included in motion information of a target block. Information on the referenced image and region (e.g., the number of motion vectors, etc.) may be configured based on a setting related to inter prediction.

Motion information may be encoded by configuring information on a referenced image and a referenced region as one combination and a combination of information on a referenced image and a referenced region may be configured as a motion information encoding mode.

In this case, information on a referenced image and a referenced region may be obtained based on an adjacent block or predetermined information (e.g., an image which is encoded before or after a current picture, a zero motion vector, etc.) and an adjacent block may be a block (a relative block) with a horizontal relationship with a base block. In other words, when a category is classified into <inter_blk_A> of a block which belongs to the same space as a base block and is most adjacent to a target block, <inter_blk_B> of a block which belongs to the same space as a base block and is far adjacent and <inter_blk_C> of a block which does not belong to the same space as a base block, a block belonging to one or more categories of them may be specified as a relative block.

For example, motion information of a target block may be encoded based on motion information or reference picture information of a relative block and motion information of a target block may be encoded based on information derived from motion information or reference picture information of a relative block (or information through an intermediate value, a transform process, etc.) In other words, for motion information of a target block, prediction may be performed from a neighboring block to encode information thereon.

Motion information of a target block may be predicted and encoded or motion information itself may be encoded, and it may be based on a signal indicating whether prediction of motion information is performed (e.g., when mvp_enabled_flag is 0, motion information is encoded as it is and when mvp_enabled_flag is 1, motion information is predicted and encoded. In other words, only for 1, the after-mentioned motion information encoding mode such as a skip mode, a merge mode, a competition mode, etc. may be used). In the present disclosure, it is described on the assumption that the signal is 1. In other words, in the after-mentioned example, it is premised that all or some of motion information of a target block is encoded based on prediction.

In the above description, a base block may be set among a target block and a block with a horizontal relationship or a vertical relationship with a target block. In detail, it means that it is possible to variously set a block which becomes a standard when motion information of a target block is encoded based on (by predicting) reference picture information or motion information of a relative block. As a content thereon may be derived from the above-mentioned various examples, a detailed description is omitted.

In summary, a target block may be a block which is an interested party with motion information to be encoded and a base block may be a block which becomes a standard when a motion information prediction candidate group is configured (e.g., a block which becomes a standard when an adjacent block in a left, top direction is specified). In this case, a base block may be set as a target block or may be set as a relative block (a block in a vertical/horizontal relationship). A base block mentioned in the after-mentioned example may be derived from the above-mentioned various examples of the present disclosure including the example.

In the present disclosure, motion information of a target block may be encoded based on one or more motion information encoding modes. In this case, a motion information encoding mode may be variously defined and may include one or more of a skip mode, a merge mode, a competition mode (Comp mode), etc.

It may be combined with the motion information encoding mode based on the above-mentioned template matching (tmp) or may be supported as a separate motion information encoding mode or may be included in all or some of detailed configurations of the motion information encoding modes. It is premised that template matching is determined to be supported in a higher unit (e.g., a picture, a slice, etc.), but a flag on whether to support may be considered as a partial element for an inter prediction setting.

It may be combined with the motion information encoding mode based on a method of performing block matching in the above-mentioned current picture (ibc) or may be supported as a separate motion information encoding mode or may be included in all or some of detailed configurations of the motion information encoding modes. It is premised that block matching is determined to be supported for a current picture in a higher unit, but a flag on whether to support may be considered as a partial element for an inter prediction setting.

It may be combined with the motion information encoding mode based on the above-mentioned motion model (affine) or may be supported as a separate motion information encoding mode or may be included in all or some of detailed configurations of the motion information encoding modes. It is premised that a non-translation motion model is determined to be supported in a higher unit, but a flag on whether to support may be considered as a partial element for an inter prediction setting.

For example, a separate motion information encoding mode such as temp_inter, temp_tmp, temp_ibc, temp_affine may be supported. Alternatively, a combined motion information encoding mode such as temp_inter_tmp, temp_inter_ibc, temp_inter_affine, temp_inter_tmp_ibc, etc. may be supported. Alternatively, it may be configured by including a template-based candidate, a candidate based on a method of performing block matching in a current picture, an affine-based candidate among the motion information prediction candidate group configuring temp.

In this case, temp may mean a skip mode(skip), a merge mode(merge), a competition mode(comp). In an example, a motion information encoding mode such as skip_inter, skip_tmp, skip_ibc, skip_affine may be supported for a skip mode, a motion information encoding mode such as merge_inter, merge_tmp, merge_ibc, merge_affine may be supported for a merge mode and a motion information encoding mode such as comp_inter, comp_tmp, comp_ibc, comp_affine, etc. may be supported for a competition mode.

When a skip mode, a merge mode and a competition mode are supported and a candidate considering the above element is included in a motion information prediction candidate group of each mode, one mode may be selected by a flag identifying a skip mode, a merge mode and a competition mode. In an example, when a flag representing whether it is a skip mode is supported and has a value of 1, a skip mode may be selected, and when a flag representing whether it is a merge mode when having a value of 0 is supported and has a value of 1, a merge mode may be selected, and when having a value of 0, a competition mode may be selected. And, a candidate based on inter, tmp, ibc, affine may be included in a motion information prediction candidate group of each mode.

Alternatively, when a plurality of motion information encoding modes are supported in one common mode, an additional flag identifying a detailed mode of a selected mode may be supported besides a flag for selecting one of a skip mode, a merge mode and a competition mode. In an example, when a merge mode is selected, it means that a flag for selecting among detailed modes on a merge mode such as merge_inter, merge_tmp, merge_ibc, merge_affine, etc. is additionally supported. Alternatively, a flag representing whether it is merge_inter is supported and when it is not merge_inter, a flag for selecting among merge_tmp, merge_ibc, merge_affine, etc. may be additionally supported.

All or some of the motion information encoding mode candidates may be supported according to an encoding setting. In this case, an encoding setting may be defined by one or more elements of status information such as a size, a shape, an aspect ratio, a position, etc. of a base block (e.g., a target block), an image type, an image category, a color component, an inter prediction support setting (e.g., whether template matching is supported, whether block matching is supported in a current picture, a non-translation motion model support element, etc.), etc.

In an example, a supported motion information encoding mode may be determined according to a size of a block. In this case, for a size of a block, a support range may be determined by the first threshold size (the minimum value) or the second threshold size (the maximum value) and each threshold size may be represented as W, H, W×H, W*H with a width (W) and a height (H) of a block. For the first threshold size, W and H may be an integer such as 4, 8, 16, or more and W*H may be an integer such as 16, 32, 64, or more. For the second threshold size, W and H may be an integer such as 16, 32, 64, or more and W*H may be an integer such as 64, 128, 256, or more. The range may be determined by one of the first threshold size or the second threshold size or may be determined by using both of them.

In this case, the threshold size may be fixed or may be adaptive according to an image (e.g., an image type, etc.). In this case, the first threshold size may be set based on a size of the minimum coding block, the minimum prediction block, the minimum transform block, etc. and the second threshold size may be set based on a size of the maximum coding block, the maximum prediction block, the maximum transform block, etc.

In an example, a supported motion information encoding mode may be determined according to an image type. In this case, for an image type I, at least one of a skip mode, a merge mode, a competition mode may be included. In this case, a separate motion information encoding mode on a method of performing block matching (or template matching) in a current picture and an affine model (hereinafter, referred to as a term, 'element') may be supported or a motion information encoding mode may be supported by combining two or more elements. Alternatively, an element according to a predetermined motion information encoding mode may be configured in a motion information prediction candidate group.

For an image type P/B, at least one of a skip mode, a merge mode or a competition mode may be included. In this case, a separate motion information encoding mode on general inter prediction, template matching, block matching in a current picture, and an affine model (hereinafter, referred to as a term, 'element') may be supported or a motion information encoding mode may be supported by combining two or more elements. Alternatively, an element according to a predetermined motion information encoding mode may be configured in a motion information prediction candidate group.

Next, a definition and a configuration according to a motion information encoding mode is described.

A skip mode, a merge mode and a competition mode may use/refer to motion information of a relative block (a candidate block) which is set based on a base block for motion information encoding of a target block. In other words, motion information (e.g., a reference image or a reference region) may be derived from a relative block and motion information (prediction motion information) obtained based on it may be predicted as motion information of a target block.

In this case, difference information between a motion vector and a prediction motion vector of a target block may not be generated in a skip mode and a merge mode and difference information may be generated in a competition mode. In other words, it may mean that a prediction motion vector is used as a motion vector of a target block as it is in a skip mode and a merge mode, but a modification that difference information is generated may be possible in a merge mode.

In this case, information on a reference image of a target block may be used as prediction reference image information as it is in a skip mode and a merge mode and information on a reference image of a target block may be encoded as reference image information without prediction or based on prediction reference image information (e.g., a difference value is encoded after prediction) in a competition mode.

In this case, a residual component of a target block may not be generated in a skip mode and a residual component of a target block may be generated in a merge mode and a competition mode. In other words, it means that a residual component may be generated in a merge mode and a competition mode and a process therefor (transform, quantization, an inverse process thereon) may be performed (e.g., it may not be performed by confirming whether there is a residual signal in a block such as coded_block_flag), but a modification that a residual component is not generated may be possible in a merge mode.

A motion information prediction candidate group of the motion information encoding mode may be variously configured. In an example, a skip mode and a merge mode may commonly configure a candidate group and a competition mode may configure a separate candidate group. A candidate group configuration setting may be determined based on a motion information encoding mode.

In this case, a candidate group configuration setting may be defined by candidate group number, a category and a position of a candidate block (a relative block), a candidate configuration method, etc.

The candidate group number may be k and k may be an integer from 1 to 6, or more. In this case, when the candidate group number is 1, it means that candidate group selection information is not generated and motion information of a predefined candidate block is set as prediction motion information and when the candidate group number is equal to or greater than 2, candidate group selection information may be generated.

A category of the candidate block may be one or more of inter_blk_A, inter_blk_B, inter_blk_C. In this case, inter_blk_A may be a category which is basically included and other categories may be a category which is additionally supported, but it is not limited thereto.

For inter_blk_A or inter_blk_C, a position of the candidate block may be adjacent in a left, a top, a top-left, a top-right, a bottom-left direction of a base block and may be derived from a description on FIG. 6. For inter_blk_B, it may be specified as a block having mode information with identity/similarity with encoding information of a target block and a related description may be derived from a part of specifying a block with the above-mentioned horizontal relationship. In an example, motion information of a block having the same mode may be included in a candidate group when a motion information prediction candidate group is configured in a motion information encoding mode based on a motion model.

As in the description, a position of a candidate block which is referenced to configure a motion information prediction candidate group was described. Next, a method of obtaining prediction motion information based on the corresponding candidate block will be described.

A candidate block used to configure a motion information prediction candidate group for inter prediction may mean a relative block in a relationship between the above-mentioned blocks. In other words, a block specified among a lot of relative blocks based on a base block may be referred to as a candidate block and a motion information prediction candidate group may be configured based on motion information of a candidate block, etc. In the after-mentioned example, it should be understood that a candidate block may mean a relative block.

FIG. 16 is an exemplary diagram on an arrangement of a block which is spatially or temporally adjacent to a base block according to an embodiment of the present disclosure. In detail, it may be an exemplary diagram on an arrangement of a block (a relative block or a candidate block) with a horizontal relationship with a base block belonging to a category of inter_blk_A and inter_blk_C. In the after-mentioned example, a block belonging to inter_blk_A is referred to as a spatial candidate and a block belonging to inter_blk_C is referred to as a temporal candidate.

In reference to FIG. 16, a block which is adjacent in a left, a top, a top-left, a top-right, a bottom-left direction, etc. based on a base block and a block which is adjacent in a central, a left, a right, a top, a bottom, a top-left, a top-right, a bottom-left, a bottom-right direction, etc. based on a block corresponding to a base block in a space (Col_Pic) which is temporally different may be configured as a candidate block for predicting motion information of a target block.

In addition, a block adjacent in the above direction may be partitioned (classified) in one or more units of sub-blocks (e.g., a L block in a left direction may be partitioned into 10, 11, 12, 13 sub-blocks), and FIG. 16 is an example in which a block adjacent in each direction is configured with 4 sub-blocks (the center of a corresponding block is configured with 16), but it may be partitioned into a variety of p sub-blocks without being limited thereto. In this case, p may be an integer such as 1, 2, 3, 4, or more. In addition, p may be adaptively determined based on a position (direction) of an adjacent block.

In this case, Col_Pic may be an image (e.g., when an interval between images is 1) which is adjacent before or after a current image and a corresponding block may be set to have the same position in an image as a base block.

Alternatively, Col_Pic may be an image (e.g., an interval between images is z. z is an integer such as 1, 2, 3) that an interval between images is predefined based on a current image, and a corresponding block may be set to have a position moved by a predetermined disparity vector on a predetermined coordinate (e.g. a top-left) of a base block and a disparity vector may be set as a predefined value.

Alternatively, Col_Pic may be set based on motion information of an adjacent block (e.g., a reference image) and the disparity vector may be set based on motion information of an adjacent block (e.g., a motion vector) to determine a position of a corresponding block.

In this case, k adjacent blocks may be referenced and k may be an integer such as 1, 2, or more. When k is equal to or greater than 2, Col_Pic and a disparity vector may be obtained based on an operation such as the maximum value, the minimum value, an intermediate value, a weighted average value, etc. of motion information of an adjacent block (e.g., a reference image or a motion vector). For example, the disparity vector may be set as a motion vector of a left or a top block and may be set as an intermediate value or an average value of a motion vector of a left and bottom-left blocks.

The above setting of a temporal candidate may be determined based on a motion information configuration setting, etc. For example, a position of Col_Pic, a position of a corresponding block, etc. may be determined according to whether motion information which is to include motion information in a unit of a block or motion information in a unit of a sub-block in a motion information prediction candidate group is configured in a unit of a block or in a unit of a sub-block. In an example, when motion information in a unit of a sub-block is obtained, a block at a position moved by a predetermined disparity vector may be set to have a position of a corresponding block.

The above example represents a case in which information on a position of a block corresponding to Col_Pic is implicitly determined and related information may be explicitly generated in a unit of a sequence, a picture, a slice, a tile group, a tile, a brick, etc.

The above-mentioned motion information (a spatial candidate and a temporal candidate, respectively) of a spatially or temporally adjacent block (or a candidate block) may be included in a motion information prediction candidate group according to a motion information encoding mode.

In an example (1), singular motion information as it is may be included in a candidate group. In other words, all or some of a singular motion vector, a singular reference picture, a singular prediction direction, etc. may be used as a prediction value of all or some of a motion vector, a reference picture, a prediction direction, etc. of a target block without a change.

In this case, singular motion information may be obtained from one candidate block of a spatial candidate or a temporal candidate. In the after-mentioned example, it is assumed that a candidate obtained in this example is a spatial candidate. In addition, it may be a case which is applied to all of a skip mode, a merge mode and a competition mode.

In an example (2), singular motion information may be included in a candidate group after an adjustment (or transform) process. This example also assumes a case in which singular motion information is obtained from one candidate block. In detail, an adjustment process on motion information of a candidate block (e.g., a motion vector) may be performed based on a distance interval between a current picture and a reference picture and a distance interval between a picture to which a candidate block belongs and a reference picture of a candidate block.

In other words, a motion vector of a candidate block may be adjusted in a scaling process based on a distance interval between a current picture and a reference picture. And, an adjusted motion vector of a candidate block may be included in a candidate group. For motion information of a reference picture or a prediction direction, etc., reference picture or prediction direction information of a candidate block may be included in a candidate group without a change or may be included in a candidate group based on a distance interval of the reference picture. Alternatively, information which is set based on predefined information (e.g., a reference picture is a picture before or after a current picture <a reference picture index is 0>, a prediction direction is one of a forward direction, a backward direction, a bidirectional direction, etc.) or reference picture or prediction direction information of a target block may be included in a candidate group.

In this case, singular motion information may be a temporal candidate. In the after-mentioned example, it is assumed that a candidate obtained in this example is a temporal candidate. In addition, it may be a case which is applied to all or some of a skip mode, a merge mode and a competition mode. For example, it may be applied to a skip mode, a merge mode and a competition mode or it may not be applied to a skip mode and a merge mode and may be applied to a competition mode.

In an example (3), a plurality of motion information may be included in a candidate group after a combination process. The combination process may be performed for all or some of a motion vector, a reference image and a prediction direction. The combination process means a process of an intermediate value, a weighted average value, etc. of motion information. In detail, q motion information obtained based on an intermediate value, a weighted average value, etc. of p motion information may be included in a candidate group. In this case, p may be an integer such as 2, 3, 4, or more and q may be an integer such as 1, 2, or more. In an example, p and q may be 2 and 1, respectively. In this case, for the average value, the same weight (e.g., 1:1, 1:1:1, etc.) may be applied to motion information or a different weight (e.g., 1:2, 1:3, 2:3, 1:1:2, 1:2:3, etc.) may be applied.

The plurality of motion information may be obtained from a plurality of candidate blocks. In this case, it is assumed that one motion information is obtained from one candidate block, but it is not limited thereto. Motion information of a candidate block (an input value of a combination process) may be information which is limited to one of (1) or (2) or belongs to both (1) and (2).

In addition, a plurality of motion information may be derived from any one of a spatial candidate or a temporal candidate and may be derived from both a spatial candidate and a temporal candidate. For example, a combination process may be performed by using a spatial candidate or a combination process may be performed by using a temporal candidate. Alternatively, a combination process may be performed by using one or more spatial candidates and one or more temporal candidates.

The plurality of motion information may be obtained from a pre-included candidate of a candidate group. In other words, a plurality of candidate motion information (e.g., a spatial candidate or a temporal candidate) which is included before in a candidate group configuration process may be used as an input value of a combination process. In this case, candidate motion information used as an input value of the combination process may be derived from any one of a spatial candidate or a temporal candidate and may be derived from both a spatial candidate and a temporal candidate.

The description may be a case which is applied to all or some of a skip mode, a merge mode and a competition mode. For example, it may be applied to a skip mode, a merge mode, and a competition mode or it may be applied to a skip mode and a merge mode and may not be applied to a competition mode.

For motion information obtained in the combination process, motion information derived from a spatial candidate or a temporal candidate is referred to as a spatial derivation candidate or a temporal derivation candidate and motion information derived from a spatial candidate and a temporal candidate is referred to as a spatial and temporal derivation candidate. In the following example, a process of deriving the candidate will be described.

As an example on a spatial derivation candidate, a spatial derivation candidate may be obtained by applying a process of obtaining a weighted average value or an intermediate value based on motion vectors of all or some of blocks in a left, a top, a top-left, a top-right, a bottom-left direction of a base block. Alternatively, a spatial derivation candidate may be obtained by applying a process of obtaining a weighted average value or an intermediate value based on all or some of spatial candidates already included in a candidate group. Next, it is assumed that motion vectors of l3, t3, tl, tr, bl is considered as an input value of a process of obtaining a weighted average value or an intermediate value in Curr_Pic of FIG. 16.

For example, a x-component of a motion vector may be derived from avg(l3_x, t3_x, tl_x, tr_x, bl_x) and a y-component of a motion vector may be derived from avg(l3_y, t3_y, tl_y, tr_y, bl_y), and it is assumed that avg is a function calculating an average of motion vectors in a bracket. Alternatively, a x-component of a motion vector may be derived from median(l3_x, t3_x, tl_x, tr_x, bl_x) and a y-component of a motion vector may be derived from median(l3_y, t3_y, tl_y, tr_y, bl_y), and it is assumed that median is a function calculating an intermediate value of motion vectors in a bracket.

As an example on a temporal derivation candidate, a temporal derivation candidate may be obtained by applying a process of obtaining a weighted average value or an intermediate value based on motion vectors of all or some of blocks in a left, a right, a top, a bottom, a top-left, a top-right, a bottom-left, a bottom-right, a central direction of a block corresponding to a base block. Alternatively, a temporal derivation candidate may be obtained by applying a process of obtaining a weighted average value or an intermediate value based on all or some of temporal candidates already included in a candidate group. Next, it is assumed that motion vectors of br, r2, b2 is considered as an input value of a process of obtaining a weighted average value or an intermediate value in Col_Pic of FIG. 16.

For example, a x-component of a motion vector may be derived from avg(br_x, r2_x, b2_x) and a y-component of a motion vector may be derived from avg(br_y, r2_y, b2_y). Alternatively, a x-component of a motion vector may be derived from median(br_x, r2_x, b2_x) and a y-component of a motion vector may be derived from median(br_y, r2_y, b2_y).

As an example on a spatial and temporal derivation candidate, a spatial and temporal derivation candidate may be obtained by applying a process of obtaining a weighted average value or an intermediate value based on motion vectors of all or some of a spatially adjacent block of a base block and a block corresponding to it. Alternatively, a spatial and temporal derivation candidate may be obtained by applying a process of obtaining a weighted average value or an intermediate value based on all or some of spatial or temporal candidates already included in a candidate group. An example thereon is omitted.

Motion information obtained in the above process may be added to (included in) a motion information prediction candidate group of a target block.

The embodiments in the (1) to (3) described an example in which a spatial candidate or a temporal candidate is included in a motion information prediction candidate group without a change or a spatial derivation candidate, a temporal derivation candidate and a spatial and temporal derivation candidate obtained based on a plurality of spatial or temporal candidates are included. In other words, the embodiments in (1) and (2) may be a description on a spatial or temporal candidate and an embodiment in (3) may be a description on a spatial derivation candidate, a temporal derivation candidate and a spatial and temporal derivation candidate.

The above-mentioned example may be a case in which a motion vector in a unit of a pixel is the same in a target block. As an example on a case in which a motion vector in a unit of a pixel or in a unit of a sub-block is different in a target block, an affine model was described above. In the after-mentioned example, there is a partial change of a motion vector in a unit of a sub-block in a target block, but an example on a case in which it is represented as a candidate based on a spatial or temporal correlation will be described.

Next, a case in which a prediction value of motion information is obtained in a unit of a sub-block based on one or more motion information is described. It may be an example which goes through a process similar to that of obtaining motion information based on a plurality of motion information (3), but obtains motion information in a unit of a sub-block (4). Motion information obtained in a process of (4) may be included in a motion information prediction candidate group. An embodiment (4) is described later by using a spatial derivation candidate, a temporal derivation candidate and a spatial and temporal derivation candidate, which are terms used in the example.

When a prediction value of motion information in a unit of a sub-block is obtained, a base block may be limited to a target block. In addition, when a candidate group is configured by mixing motion information in the unit of a sub-block and motion information in a unit of a block, it is assumed that a base block is limited to a target block.

As an example on a spatial derivation candidate, one motion information of a spatially adjacent block (in this example, a variety of blocks in Curr_Pic of FIG. 16. A block used in this example is at a left, a right and a top-right position adjacent to a target block based on a sub-block) which is obtained based on a sub-block in a target block (in this example, it is configured with 4 sub-blocks <c0+c1+c4+c5/c2+c3+c6+c7/c8+c9+c12+c13/c10+c11+c14+c1 are referred to as D0, D1, D2, D3, respectively, in Curr_Pic of FIG. 16>) may be obtained as a spatial derivation candidate or a spatial derivation candidate may be obtained through a weighted average value or an intermediate value based on a plurality of motion information. The obtained spatial derivation candidate may be added to a motion information prediction candidate group of a target block.

For example, for a sub-block D0, l1, t1, t2 (a bottom region of a left block, a right region of a top block, a top-left block based on a sub-block), for a sub-block D1, l1, t3, for a sub-block D2, l3, t1, t2 and for a sub-block D3, l3, t3, tr may be a spatially adjacent block of the corresponding sub-block. In this case, what is added to a motion information prediction candidate group of a target block is a spatial derivation candidate (This example assumes that one is supported), but motion information derived hereupon may be derived in a unit of each sub-block (in this example, as many as 4 sub-blocks). In other words, when a decoder parses information of selecting a spatial derivation candidate, a motion information prediction value of each sub-block may be obtained as in the above process.

As an example on a temporal derivation candidate, one motion information of a temporally adjacent block (in this example, a variety of blocks in Col_Pic of FIG. 16. A block used in this example is at a central, a bottom-right, a right or a bottom position adjacent to a corresponding sub-block) which is obtained based on a sub-block in a target block may be obtained as a temporal derivation candidate or a temporal derivation candidate may be obtained through a weighted average value or an intermediate value based on a plurality of motion information. The obtained temporal derivation candidate may be added to a motion information prediction candidate group of a target block.

For example, for a sub-block D0, c10, c6, c9 (a bottom-left block, a bottom region of a right block, a right region of a bottom block based on a corresponding sub-block), for a sub-block D1, r2, r1, c11, for a sub-block D2, b2, c14, b1 and for a sub-block D3, br, r3, b3 may be a temporally adjacent block of the corresponding sub-block. What is added as in the example is a temporal derivation candidate, but motion information derived hereupon may be derived in a unit of each sub-block.

As an example on a spatial and temporal derivation candidate, a weighted average value or an intermediate value, etc. of motion information of a spatially or temporally adjacent block (A block used in this example is at a left and a top position which is spatially adjacent and at a bottom-right position which is temporally adjacent based on a sub-block) which is obtained based on a sub-block in a target block may be obtained as a spatial and temporal derivation candidate and may be added to a motion information prediction candidate group of a target block.

For example, for a sub-block D0, l1, t1, c10, for a sub-block D1, l1, t3, r2, for a sub-block D2, l3, t1, b2 and for a sub-block D3, l3, t3, br may be an adjacent block of the corresponding sub-block.

In summary, motion information obtained based on one or more motion information in an embodiment (4) may be included in a candidate group. In detail, q motion information obtained based on an intermediate value, a weighted average value, etc. of p motion information may be included in a candidate group. In this case, p may be an integer such as 1, 2, 3, or more and q may be an integer such as 1, 2, or more. In this case, for the average value, the same weight (e.g., 1:1, 1:1:1, etc.) may be applied to motion information or a different weight (e.g., 1:2, 1:3, 2:3, 1:1:2, 1:2:3, etc.) may be applied. An input value in the above process may be information which is limited to one of (1) or (2) or belongs to both (1) and (2).

A size of the sub-block may be m×n and m and n may be an integer such as 4, 8, 16, or more and m and n may be the same or not. A size of the sub-block may have a fixed value or may be adaptively set based on a size of a target block. In addition, a size of the sub-block may be implicitly determined according to an encoding setting or related information may be explicitly generated in a variety of units. In this case, for a definition on an encoding setting, the above-mentioned various examples may be referenced.

The description may be a case which is applied to all or some of a skip mode, a merge mode and a competition mode. For example, it may be applied to a skip mode, a merge mode, and a competition mode or it may be applied to a skip mode and a merge mode and may not be applied to a competition mode.

For whether the embodiment in (3) and (4) is supported, related information may be explicitly generated in a unit of a sequence, a picture, a slice, a tile group, a tile, a brick, etc. Alternatively, whether to support may be determined based on an encoding setting. In this case, an encoding setting may be defined by one or more elements of status information such as a size, a shape, an aspect ratio, a position, etc. of a base block (e.g., a target block), an image type, an image category, a color component, a setting related to inter prediction (e.g., a motion information encoding mode, whether template matching is supported, whether block matching is supported in a current picture, a non-translation motion model support element, etc.), etc.

For example, whether a candidate group of an embodiment in (3) or (4) is supported may be determined according to a size of a block. In this case, for a size of a block, a support range may be determined by the first threshold size (the minimum value) or the second threshold size (the maximum value) and each threshold size may be represented as W, H, W×H, W*H with a width (W) and a height (H) of a block. For the first threshold size, W and H may be an integer such as 4, 8, 16, or more and W*H may be an integer such as 16, 32, 64, or more. For the second threshold size, W and H may be an integer such as 16, 32, 64, or more and W*H may be an integer such as 64, 128, 256, or more. The range may be determined by one of the first threshold size or the second threshold size or may be determined by using both of them.

In this case, the threshold size may be fixed or may be adaptive according to an image (e.g., an image type, etc.). In this case, the first threshold size may be set based on a size of the minimum coding block, the minimum prediction block, or the minimum transform block, etc. and the second threshold size may be set based on a size of the maximum coding block, the maximum prediction block, or the maximum transform block, etc.

For an affine model, motion information of a spatially or temporally adjacent block (a candidate block) may be included in a motion information prediction candidate group according to a motion information encoding mode. In this case, a position of a spatially or temporally adjacent block may be the same as or similar to a previous embodiment.

In this case, a candidate group configuration may be determined according to a motion model of a candidate block.

For example, when a motion model of a candidate block is an affine model, a motion vector set configuration of a candidate block may be included in a candidate group without a change.

Alternatively, when a motion model of a candidate block is a translation motion model, it may be included as a candidate of a motion vector at a position of a control point based on a relative position of a target block. In an example, when a top-left, a top-right and a bottom-left coordinates are used as control points, a motion vector of a top-left control point may be predicted based on a motion vector (e.g., for a translation motion model) of a left, a top, or a top-left block of a base target block and a motion vector of a top-right control point may be predicted based on a motion vector (e.g., for a translation motion model) of a top or a top-right block of a base block and a motion vector of a bottom-left control point may be predicted based on a motion vector of a left or a bottom-left block of a base block.

In summary, when a motion model of a candidate block is an affine model, a motion vector set of the corresponding block may be included in a candidate group (A) and when a motion model of a candidate block is a translation motion model, it may be considered as a candidate of a motion vector of the predetermined control point of a target block and a motion vector set obtained according to a combination of each control point may be included in a candidate group (B).

In this case, a candidate group may be configured by using only one of a method A or B or a candidate group may be configured by using both a method A and B. And, a method A may be configured first and a method B may be configured subsequently, but it is not limited thereto.

Next, a method in which a motion information prediction candidate group is configured according to a motion information encoding mode.

For convenience of description, a merge mode and a competition mode are described on the assumption that a skip mode has the same as a candidate group configuration of a merge mode, but some elements of a candidate group configuration of a skip mode may be different from a merge mode.

(Merge_Inter Mode)

A motion information prediction candidate group for a merge mode (hereinafter, a merge mode candidate group) may include k candidates and k may be an integer such as 2, 3, 4, 5, 6, or more. A merge mode candidate group may include at least one of a spatial candidate or a temporal candidate.

A spatial candidate may be derived from at least one of blocks which are adjacent in a left, a top, a top-left, a top-right, a bottom-left direction, etc. based on a base block. There may be a priority for configuring a candidate group and a priority such as left-top-bottom-left-top-right-top-left, left-top-top-right-bottom-left-top-left, top-left-bottom-left-top-left-top-right, etc. may be set. In an example, it may be set in an order of l3-t3-bl-tr-tl in Curr_Pic of FIG. 16.

All or some of the candidates may be included in a candidate group based on the priority, availability of each candidate block (e.g., it is judged based on an encoding mode, a position of a block, etc.) and the maximum allowable number of spatial candidates (p. an integer between 1 and the merge mode candidate group number). According to the maximum allowable number and availability, it may not be included in a candidate group in an order of tl tr-bl-t3-l3, and when the maximum allowable number is 4 and availability of a candidate block is entirely true, motion information of t1 may not be included in a candidate group and when availability of some candidate blocks is false, motion information of t1 may be included in a candidate group.

A temporal candidate may be derived from at least one of blocks which are adjacent in a central, a left, a right, a top, a bottom, a top-left, a top-right, a bottom-left, a bottom-right direction, etc. based on a block corresponding to a base block. There may be a priority for configuring a candidate group and a priority such as central-bottom-left-right-bottom, bottom-left-central-top-left, etc. may be set. In an example, it may be set in an order of cl0-br in Col_Pic of FIG. 16.

All or some of the candidates may be included in a candidate group based on the priority, availability of each candidate block and the maximum allowable number of temporal candidates (q. an integer between 1 and the merge mode candidate group number). When the maximum allowable number is 1 and availability of c10 is true, motion information of c10 may be included in a candidate group and when availability of c10 is false, motion information of br may be included in a candidate group.

In this case, a motion vector of a temporal candidate may be obtained based on a motion vector of a candidate block and a reference image of a temporal candidate may be obtained based on a reference image of a candidate block or may be obtained as a predefined reference image (e.g., a reference picture index is 0).

For a priority included in a merge mode candidate group, a spatial candidate—a temporal candidate may be set and vice versa, and a priority that a spatial candidate and a temporal candidate are mixed and configured may be supported. This example assumes a case of being a spatial candidate—a temporal candidate.

In addition, motion information (a statistical candidate) of a block which belongs to the same space and is far adjacent or a derivation candidate in a unit of a block (a spatial derivation candidate, a temporal derivation candidate, a spatial and temporal derivation candidate) may be additionally included in a merge mode candidate group. A statistical candidate and a derivation candidate in a unit of a block may be configured after a spatial candidate and a temporal candidate, but a variety of priorities may be possible without being limited thereto. In the present disclosure, it is assumed that a candidate group is configured in an order of a statistical candidate—a derivation candidate in a unit of a block, but the inverse may be possible without being limited thereto. In this case, a derivation candidate in a unit of a block may use only any one of a spatial derivation candidate or a temporal derivation candidate or a spatial and temporal derivation candidate or may use all of them. This example assumes a case in which a spatial derivation candidate is used.

A statistical candidate in this example is motion information of a block which is far away from a base block (or a block which is not most adjacent), and it may be limited to a block with the same encoding mode as a target block. In addition, it may be limited to a block with motion information in a unit of a block (when it is not motion information in a unit of a sub-block).

For a statistical candidate, up to n motion information may be managed by a method such as FIFO and z motion information of them may be included in a merge mode candidate group as a statistical candidate. Z may be variable according to a candidate configuration which is already included in a merge mode candidate group, may be an integer such as 0, 1, 2, or more and may be smaller than or the same as n.

A derivation candidate in a unit of a block may be derived by combining n candidates which are already included in a merge mode candidate group and n may be an integer such as 2, 3, 4, or more. The number of the combined candidates (n) may be information which is explicitly generated in a unit of a sequence, a picture, a slice, a tile group, a tile, a brick, a block, etc. Alternatively, it may be implicitly determined according to an encoding setting. In this case, an encoding setting may be defined based on one or more elements of a size, a shape or a position of a base block, an image type, a color component, etc.

In addition, the number of the combined candidates may be determined based on the number of candidates which are not filled in a merge mode candidate group. In this case, the number of candidates which are not filled in a merge mode candidate group may be a difference value between the number of a merge mode candidate group and the number of candidates which are already filled. In other words, when a configuration of a merge mode candidate group is already completed, a derivation candidate in a unit of a block may not be added. When a configuration of a merge mode candidate group is not completed, a derivation candidate in a unit of a block may be added, but when a candidate filled in a merge mode candidate group is equal to or less than 1, a derivation candidate in a unit of a block is not added.

When the number of unfilled candidates is 1, a derivation candidate in a unit of a block may be added based on 2 candidates and when the number of unfilled candidates is equal to or greater than 2, a derivation candidate in a unit of a block may be added based on 3 or more candidates.

A position of the n combined candidates may be a preset position in a merge mode candidate group. For example, an index (e.g., 0 to <k−1>) may be assigned per candidate belonging to a merge mode candidate group. In this case, k means the number of a merge mode candidate group. In this case, a position of n combined candidates may correspond to an index 0 to an index (n−1) in a merge mode candidate group. In an example, a derivation candidate in a unit of a block may be obtained according to an index combination of (0, 1)-(0, 2)-(1, 2)-(0, 3).

Alternatively, the n combined candidates may be determined by considering a prediction direction of each candidate belonging to a merge mode candidate group. In an example, among candidates belonging to a merge mode candidate group, only a bidirectional prediction candidate may be selectively used or only a unidirectional prediction candidate may be selectively used.

A configuration of a merge mode candidate group may be completed or may not be completed through the above process. When it is not completed, a configuration of a merge mode candidate group may be completed by using a zero motion vector.

In the candidate group configuration process, posterior motion information redundant with a candidate which is already included in a candidate group may not be included in a candidate group, but an exceptional case in which redundant motion information is included may be generated without being limited thereto. In addition, the redundancy means that a motion vector, a reference picture and a prediction direction are the same, but an exceptional configuration that a predetermined error range (e.g., a motion vector) is allowed may be also possible.

In addition, a merge mode candidate group may be configured based on a correlation between blocks. For example, for a spatial candidate, a low priority may be assigned to motion information of a candidate block which is judged to have a low correlation with a base block.

For example, it is assumed that a priority for configuring a candidate group of a spatial candidate is left-top-bottom-left-top-right-bottom-left. When it is confirmed that a left block has a low correlation with a base block according to a correlation between blocks, a priority may be changed to place a left block as a posterior order. In an example, it may be changed into an order of top-bottom-left-top-right-bottom-left-left.

Alternatively, it is assumed that a priority for configuring a candidate group of a derivation candidate in a unit of a block is an order of (0, 1)-(0, 2)-(1, 2)-(0, 3). When a candidate corresponding to No. 1 index in a candidate group is motion information of a left block (a spatial candidate), a priority may be changed to place a candidate corresponding to No. 1 index as a posterior order. In an example, it may be changed into an order of (0, 2)-(0, 3)-(0, 1)-(1, 2).

When a merge mode candidate group is configured based on the correlation between blocks, a candidate group may be effectively configured and encoding performance may be improved.

(Comp_Inter Mode)

A motion information prediction candidate group for a competition mode (hereinafter, a competition mode candidate group) may include k candidates and k may be an integer such as 2, 3, 4, or more. A merge mode candidate group may include at least one of a spatial candidate or a temporal candidate.

A spatial candidate may be derived from at least one of blocks which are adjacent in a left, a top, a top-left, a top-right, a bottom-left direction, etc. based on a base block. Alternatively, at least one candidate may be derived from a block which is adjacent in a left direction (a left, a bottom-left block) and a block which is adjacent in a top direction (a top-left, a top, a top-right block) and it is described later by assuming this setting.

There may be two or more priorities for configuring a candidate group. A priority of bottom-left-left may be set in a region which is adjacent in a left direction and a priority of top-right-top-top-left may be set in a region which is adjacent in a top direction.

The above example may be a configuration that a spatial candidate is derived only from a block with the same reference picture as a target block, and a spatial candidate may be derived through a scaling process(next, marked with *) based on a reference picture of a target block. In this case, a priority of left-bottom-left-left*-bottom-left* or left-bottom-left-bottom-left*-left* may be set in a region which is adjacent in a left direction and a priority of top-right-top-top-left-top-right*-top*-top-left* or top-right-top-top-left-top-left*-top*-top-right* may be set in a region which is adjacent in a top direction.

A temporal candidate may be derived from at least one of blocks which are adjacent in a central, a left, a right, a top, a bottom, a top-left, a top-right, a bottom-left, a bottom-right direction, etc. based on a block corresponding to a base block. There may be a priority for configuring a candidate group and a priority such as central-bottom-left-right-bottom, bottom-left-central-top-left, etc. may be set. In an example, it may be set in an order of c10-br in Col_Pic of FIG. 16.

When having a setting that a sum of the maximum allowable number of spatial candidates and the maximum allowable number of temporal candidates is smaller than the number of a competition mode candidate group, a temporal candidate may be included in a candidate group regardless of a candidate group configuration of a spatial candidate.

All or some of the candidates may be included in a candidate group based on the priority, availability of each candidate block and the maximum allowable number of temporal candidates (q. an integer between 1 and the competition mode candidate group number).

In this case, when the maximum allowable number of spatial candidates is set the same as the number of a merge mode candidate group, a temporal candidate may not be included in a candidate group and when the maximum allowable number is not filled based on a spatial candidate, a temporal candidate may be included in a candidate group. This example assumes a case for the latter.

In this case, a motion vector of a temporal candidate may be obtained based on a motion vector of a candidate block and a distance interval between a current image and a reference image of a target block and a reference image of a temporal candidate may be obtained based on a distance interval between a current image and a reference image of a target block or may be obtained based on a reference image of a temporal candidate or may be obtained as a predefined reference image (e.g., a reference picture index is 0)

A configuration of a competition mode candidate group may be completed or may not be completed through the above process. When it is not completed, a competition mode candidate group may be configured by using a zero motion vector.

In the candidate group configuration process, posterior motion information redundant with a candidate which is already included in a candidate group may not be included in a candidate group, but an exceptional case in which redundant motion information is included may be generated without being limited thereto. In addition, the redundancy means that a motion vector, a reference picture and a prediction direction are the same, but an exceptional configuration that a predetermined error range (e.g., a motion vector) is allowed may be also possible.

In addition, a competition mode candidate group may be configured based on a correlation between blocks. For example, for a spatial candidate, motion information of a candidate block which is judged to have a low correlation with a base block may be excluded from a candidate group.

For example, it is assumed that a priority for configuring a candidate group of a spatial candidate is left-bottom-left-left*-bottom-left* in a block which is adjacent in a left direction and top-right-top-top-left-top-right*-top*-top-left* in a block which is adjacent in a top direction. When it is confirmed that a top block has a low correlation with a base block according to a correlation between blocks, a candidate on a top block may be removed from a priority. In an example, it may be changed into an order of top-right-top-left-top-right*-top-left*.

When a competition mode candidate group is configured based on the correlation between blocks, a candidate group may be effectively configured and encoding performance may be improved.

Next, a process of performing inter prediction according to a motion information encoding mode will be described.

A motion information encoding mode of a target block is derived (1). A block referenced according to a derived motion information encoding mode is specified (2). A motion information prediction candidate group with motion information obtained based on a specified reference block and a motion information encoding mode is configured (3). Motion information of a target block is derived from a motion information prediction candidate group (4). Inter prediction may be performed by using motion information of a target block.

In (1), flag information on a motion information encoding mode of a target block may be signaled. In this case, a motion information encoding mode may be determined as one of a skip mode, a merge mode and a competition mode and the signaled flag may be configured with one or two or more information according to a determined mode. In addition, additional flag information for selecting one of detailed categories of a determined mode may be signaled.

In (2), a block referenced according to a derived a motion information encoding mode is specified. A position of a block referenced according to a motion information encoding mode may be differently configured. In (3), which motion information will be derived from a specified reference block may be determined based on a motion information encoding mode and derived motion information may be included in a candidate group.

In (4), motion information corresponding to a corresponding index in a candidate group may be derived based on candidate selection information of a target block. In this case, a derived motion information configuration may be determined according to a motion information encoding mode. In an example, for a skip mode or a merge mode, information on a motion vector, a reference image and a prediction direction may be derived based on one candidate selection information. Alternatively, for a competition mode, information on a motion vector may be derived based on one candidate selection information and information on a reference image and a prediction direction may be derived based on other predetermined flag. In (5), inter prediction may be performed by using motion information of a target block.

A prediction block may be generated by using motion information obtained through the above process. A target block may be reconstructed by adding a residual component of a target block. In this case, a residual component may be derived by performing at least one of dequantization or inverse transform for a residual coefficient signaled from a bitstream.

Next, a difference motion vector, a difference value between a motion vector and a prediction motion vector of a target block, will be described later and it may be a description corresponding to a competition mode.

A difference motion vector (In this example, it is described based on an absolute value of a difference motion vector) may be represented according to motion vector precision (In this example, it is assumed that motion vector precision is determined according to reference picture interpolation precision. For the above-mentioned content<i.e., an example in which a motion vector, not a difference motion vector, is encoded without a change>, when motion vector precision is adaptively determined, it does not correspond to this example)

For example, when motion vector precision is a ¼ unit, a motion vector of a target block is (2.5, −4) and a prediction motion vector is (3.5, −1), a difference motion vector may be (−1, −3).

When difference motion vector precision is the same as motion vector precision (i.e., a ¼ unit), a x-difference component may need a codeword and a negative sign according to No. 4 index and a y-difference component may need a codeword and a positive sign according to No. 12 index.

In addition, precision for a difference motion vector besides motion vector precision may be supported. In this case, difference motion vector precision may have precision which is smaller than or the same as motion vector precision as a candidate group.

A difference motion vector may be variously represented according to difference motion vector precision.

For example, when motion vector precision is a ¼ unit, a motion vector of a target block is (7.75, 10.25) and a prediction motion vector is (2.75, 3.25), a difference motion vector may be (5, 7).

When fixed difference motion vector precision is supported (i.e., when difference motion vector precision is the same as motion vector precision. In this example, a ¼ unit), a x-difference component may need a codeword and a positive sign according to No. 20 index and a y-difference component may need a codeword and a positive sign according to No. 28 index. This example may be an example according to fixed difference motion vector precision.

When adaptive difference motion vector precision is supported (i.e., when difference motion vector precision is the same as or different from motion vector precision. In other words, when one of a plurality of precision is selected. In this example, it is assumed that it is a unit of an integer(1)), a x-difference component may need a codeword and a positive sign according to No. 5 index and a y-difference component may need a codeword and a positive sign according to No. 7 index.

When it is assumed that the same codeword is assigned to an index order regardless of precision in the example (e.g., a binarization method for a difference motion vector is the same), a long codeword such as a codeword according to No. 20 index and No. 28 index (in this example, it is assumed that a short bit is assigned in case of having a small index and a long bit is assigned in case of having a large index) is assigned to a x-difference component and a y-difference component when a fixed difference motion vector is supported, but a short codeword such as a codeword according to No. 5 index and No. 7 index may be assigned to a x-difference component and a y-difference component when an adaptive difference motion vector is supported.

The above example may be a case in which difference motion vector precision is supported for one difference motion vector. Alternatively, a case in which one difference motion vector precision is supported for a x and y-difference component configuring one difference motion vector may be as follows.

For example, when a difference motion vector is (5, −1.75) and adaptive difference motion vector precision (in this example, a unit of an integer(1), a ¼ unit) is supported, the following configuration may be possible.

For a unit of an integer(1), a x-difference component may need a codeword and a positive sign according to No. 5 index and for a ¼ unit, a y-difference component may need a codeword and a negative sign according to No. 7 index. This example may be the optimum case, and difference motion vector precision selection information of a x-difference component may be determined in an integer unit and difference motion vector precision selection information of a y-difference component may be determined in a ¼ unit.

As in the above example, precision commonly applied to a difference motion vector may be supported or precision separately applied to a component of a difference motion vector may be supported, and it may be determined according to an encoding setting.

Additionally, as a description on a bitstream configuration, for the former, adaptive difference motion vector precision may be supported when at least one difference component is not 0.

abs_mvd_x
if(abs_mvd_x)
mvd_sign_x
abs_mvd_y
if(abs_mvd_y)
mvd_sign_y
if((abs_mvd_x∥abs_mvd_y) && adaptive_mvd_precision_enabled_flag)
mvd_precision_flag For the latter, adaptive difference motion vector precision may be supported when each difference component is not 0.

abs_mvd_x
if(abs_mvd_x)
mvd_sign_x
abs_mvd_y
if(abs_mvd_y)
mvd_sign_y
if(abs_mvd_x && adaptive_mvd_precision_enabled_flag)
mvd_precision_flag_x
if(abs_mvd_y && adaptive_mvd_precision_enabled_flag)
mvd_precision_flag_y In summary, difference motion vector precision may be determined according to an encoding setting and may be one precision of an integer unit and a decimal unit. It may have one preset difference motion vector precision or one precision of a plurality of difference motion vector precision. For the former, it may be an example determined based on reference picture interpolation precision.

When a plurality of difference motion vector precision is supported (e.g., adaptive_mvd_precision_enabled_flag. If it is 0, preset difference motion vector precision is used and if it is 1, one of a plurality of difference motion vector precision is used), difference motion vector precision selection information (e.g., mvd_precision_flag) may be generated. In this case, a precision candidate group may be configured with precision in a 4, 2, 1, ½, ¼, ⅛ or 1/16 unit. In other words, the number of a candidate group may be an integer such as 2, 3, 4, 5, or more.

While motion vector precision and difference motion vector precision of in the example among the above-mentioned embodiments were classified according to a motion information encoding setting and were described, they may have the same or similar configuration in that they have fixed or adaptive precision for motion information to be encoded.

In the present disclosure, it is described on the assumption that a motion vector to be encoded is configured with a difference motion vector and sign information thereon.

Among the encoding modes, a skip mode and a merge mode obtain prediction information and immediately use it as motion information of a corresponding block without generating difference information, so adaptive difference motion vector precision is not supported and when at least one difference motion vector is not 0 in a competition mode, adaptive difference motion vector precision may be supported.

Motion information is stored because a target block may be also referenced in encoding motion information of a subsequent block after it is encoded as motion information of a neighboring block is used to encode motion information of a target block. It is described under a setting that precision of a motion vector storage unit is determined according to reference picture interpolation precision. In other words, it is described on the assumption that a representation unit for a motion vector is set to be different from a storage unit and the after-mentioned example assumes a case in which an adaptive difference motion vector precision setting is supported.

As mentioned above, precision (assuming it is a ⅛ unit) representing a motion vector may be the same as precision storing a motion vector. A case in which they are not the same was also described, but for convenience of description, in this example, it is described on the assumption that they are the same and a content thereon may be expanded and applied to a case in which they are not the same.

In an example, a motion vector may be stored according to a preset motion vector storage unit because a difference component is not generated in a skip mode (or a merge mode). In other words, as precision of a prediction motion vector (because prediction is performed by a stored motion vector of a neighboring block) is the same as preset motion vector precision, a prediction motion vector may be considered as a reconstructed motion vector and stored without a change (as a motion vector of a target block).

In an example, a difference component is generated in a competition mode and difference motion vector precision may be the same or not as a preset motion vector storage unit, so a motion vector may be stored according to a preset motion vector storage unit. In other words, as precision of a prediction motion vector may be the same or not as that of a difference motion vector, a process of matching precision of a difference motion vector with that of a prediction motion vector may be performed before storing it in a memory.

Difference motion vector precision is the same as or lower than motion vector precision, so in this case, a process of matching it with precision of a prediction motion vector (e.g., multiplication, division, rounding off/rounding down/rounding up, shift operation, etc. In this example, a shift operation to the left) may be needed. In this example, it is assumed that integer (1), ¼, ⅛ units are included as a candidate of difference motion vector precision.

It is assumed that each candidate has the following setting.

```
mvd_pres_idx = 0 (a 1/1 unit) -> mvd_shift = 3 (the number of shifts)
mvd_pres_idx = 1 (a 1/2 unit) -> mvd_shift = 2 (the number of shifts)
mvd_pres_idx = 2 (a 1/8 unit) -> mvd_shift = 0 (the number of shifts)
A motion vector may be stored in a memory through the following process.
if( adaptive_mvd_precision_enabled_flag == 0 )
{
mv_x = mvp_x + mvd_x
_y = mvp_y + mvd_y
}
else
{
mv_x = mvp_x + (mvd_x << mvd_shift_x)
mv_y = mvp_y + (mvd_y << mvd_shift_y)
}
```

In the example, my means a reconstructed motion vector, mvp means a prediction motion vector and mvd means a difference motion vector. _x and _y follow mvd_shift are for classification under a precision setting separately applied to a difference motion vector configuration component and it may be removed and represented in a precision setting commonly applied to a difference motion vector. In addition, for a fixed difference motion vector precision setting, a reconstructed motion vector may be obtained by adding a prediction motion vector and a difference motion vector. This example may be a case in which a motion estimation and compensation process, a representation unit (precision) and a storage unit of a motion vector are fixed as one precision (e.g., it is unified in a ¼ unit and used, and only difference motion vector precision is adaptively determined).

In summary, when having adaptive precision, a process of matching precision may be performed before storing a motion vector.

Additionally, it was described above that motion vector precision may be different from precision to be stored, and in that case, a motion vector may be stored in a memory through the following process. In this example, it is described by assuming a case in which a motion estimation and compensation process, a representation unit and a storage unit of a motion vector are determined as a plurality of precision (as it is set differently according to a motion information encoding mode, this example describes a case in which a skip mode, a merge mode and a competition mode are mixed and used).

```
if( cu_skip_flag || merge_flag )
{
mv_x = mvp_x
mv_y = mvp_y
}
```

```
    else
    {
    if( adaptive_mvd_precision_enabled_flag == 0 )
    {
    mv_x = mvp_x + (mvd_x << diff_prec)
    mv_y = mvp_y + (mvd_y << diff_prec)
    }
    else
    {
    mv_x = mvp_x + {(mvd_x << mvd_shift_x) << diff_prec}
    mv_y = mvp_y + {(mvd_y << mvd_shift_y) << diff_prec}
    }
    }
```

In the example, a skip mode (in this case, cu_skip_flag=1) and a merge mode (in this case, merge_flag=1) assume a case in which precision in a motion estimation and compensation process is a 1/16 unit and motion vector precision is a 1/4 unit and a storage unit is a 1/16 unit and a competition mode assumes a case in which precision in a motion estimation and compensation process is a 1/4 unit and motion vector precision is a 1/4 unit and a storage unit is a 1/16 unit. As in the example, a process for matching a motion vector storage unit may be additionally performed.

In the example, mvp is a prediction motion vector obtained from a neighboring block and it refers to stored motion vector information of a neighboring block, so it is already set as a motion vector storage unit (1/16). For mvd, although a process of matching motion vector precision of a target block (in this example, 1/4) and difference motion vector precision (in this example, assuming it is an integer unit) is performed, a precision adjustment process with mvp (in this example, 1/16) may remain. In other words, a process of matching precision with a motion vector storage unit (in this example, a left shift operation by diff_prec) may be performed.

As the above example was described under some assumptions (e.g., precision of a motion information encoding mode is differently set, etc.), it may be described by deriving information which is equally or similarly applied by the example even when it is changed by a variety of assumptions.

Alternatively, a difference motion vector precision candidate group may be determined according to interpolation precision (or motion vector precision). For example, a difference motion vector which may be generated when interpolation precision is an integer unit may configure a candidate group in an integer unit of 1 or more (e.g., a 1, 2, 4 unit) and in case of a decimal unit, it may configure a candidate group in a unit equal to or greater than interpolation precision (e.g., 2, 1, 1/4, 1/8 unit. This example assumes that 1/8 is interpolation precision)

The methods according to the present disclosure may be recorded in a computer readable medium after being embodied in a form of a program instruction which may be performed by a variety of computer means. A computer readable medium may include a program instruction, a data file, a data structure, etc. alone or in combination. A program instruction recorded in a computer readable medium may be especially designed and configured for the present disclosure or may be available after being notified to a person skilled in computer software.

An example for a computer readable medium may include a hardware device such as ROM, RAM, Flash memory, etc. which is especially configured to store and perform a program instruction. An example for a program instruction may include a high-level language code which may be run by a computer with an interpreter, etc. besides a machine language code which is made by a compiler. The above-mentioned hardware device may be configured to operate as at least one software module to perform the motion of the present disclosure, and vice versa.

In addition, the above-mentioned method or device may be embodied after all or part of such configurations or functions are combined or separated.

While it was described above by referring to the desirable embodiment of the present disclosure, a person skilled in the relevant field of technology may understand that the present disclosure may be variously modified and changed within a range which is not beyond the idea and region of the present disclosure entered in the following claim.

INDUSTRIAL APPLICABILITY

The present disclosure may be used to encode/decode a video signal.

What is claimed is:

1. An inter prediction method performed by an image decoding apparatus, comprising:
   determining a motion vector prediction candidate from motion vectors of a reference block in case that the reference block is predicted by an affine mode;
   determining a motion vector prediction candidate group comprising the motion vector prediction candidate;
   deriving a prediction motion vector of the target block for the affine mode from the motion vector prediction candidate group;
   determining a difference motion vector precision among a plurality of precision candidates based on difference motion vector precision information;
   determining a difference motion vector of the target block;
   scaling the difference motion vector of the target block based on a precision difference between the difference motion vector precision and a motion vector precision of the prediction motion vector;
   deriving the motion vector of the target block based on the prediction motion vector of the target block and the scaled difference motion vector of the target block; and
   performing inter prediction by using the motion vector of the target block for the affine mode.

2. The method of claim 1, wherein the affine mode is determined to be used for the target block by a predetermined first flag.

3. The method of claim 2, wherein the first flag additionally derives a second flag which classifies a detailed mode.

4. The method of claim 3, wherein the second flag is generated when motion information encoding mode is determined to be a skip mode or a merge mode.

5. An inter prediction method performed by an image encoding apparatus, comprising:
   deriving motion vectors of a target block for an affine mode;
   performing inter prediction by using the motion vectors of the target block for the affine mode;
   specifying a reference block of the target block according to the affine mode;
   determining a motion vector prediction candidate from motion vectors of the reference block in case that the reference block is predicted by the affine mode;
   determining a motion vector prediction candidate group comprising the motion vector prediction candidate; and
   deriving a prediction motion vector of the target block from the motion vector prediction candidate group;

determining a difference motion vector of the target block based on the prediction motion vector of the target block;

determining a difference motion vector precision among a plurality of precision candidates;

scaling the difference motion vector of the target block based on a precision difference between the difference motion vector precision and a motion vector precision of the prediction motion vector; and encoding the motion vector of the target block based on the prediction motion vector of the target block and the scaled difference motion vector of the target block and encoding difference motion vector precision information indicating the difference motion vector precision.

6. A non-transitory computer readable recording medium storing a bitstream that is generated by an inter prediction method performed by an image encoding apparatus, the method comprising:

deriving motion vectors of a target block for an affine mode;

performing inter prediction by using the motion vectors of the target block for the affine mode;

specifying a reference block of the target block according to the affine mode;

determining a motion vector prediction candidate from motion vectors of the reference block in case that the reference block is predicted by the affine mode;

determining a motion vector prediction candidate group comprising the motion vector prediction candidate; and deriving a prediction motion vector of the target block from the motion vector prediction candidate group;

determining a difference motion vector of the target block based on the prediction motion vector of the target block;

determining a difference motion vector precision among a plurality of precision candidates;

scaling the difference motion vector of the target block based on a precision difference between the difference motion vector precision and a motion vector precision of the prediction motion vector; and encoding the motion vector of the target block based on the prediction motion vector of the target block and the scaled difference motion vector of the target block and encoding difference motion vector precision information indicating the difference motion vector precision.

* * * * *